US011675476B2

(12) United States Patent
Dascola et al.

(10) Patent No.: US 11,675,476 B2
(45) Date of Patent: Jun. 13, 2023

(54) USER INTERFACES FOR WIDGETS

(71) Applicant: Apple Inc., Cupertino, CA (US)

(72) Inventors: Jonathan R. Dascola, San Francisco, CA (US); Nathan De Vries, San Francisco, CA (US); Heena Ko, San Francisco, CA (US); Richard R. Dellinger, San Jose, CA (US); Alan C. Dye, San Francisco, CA (US); Stephen O. Lemay, Palo Alto, CA (US); Brandon Walkin, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/737,372

(22) Filed: Jan. 8, 2020

(65) Prior Publication Data
US 2020/0348822 A1 Nov. 5, 2020

Related U.S. Application Data

(60) Provisional application No. 62/843,507, filed on May 5, 2019.

(51) Int. Cl.
*G06F 3/04817* (2022.01)
*G06F 3/0483* (2013.01)
(Continued)

(52) U.S. Cl.
CPC .......... *G06F 3/04817* (2013.01); *G06F 3/048* (2013.01); *G06F 3/0482* (2013.01);
(Continued)

(58) Field of Classification Search
CPC .................................................. G06F 3/0483
See application file for complete search history.

(56) References Cited

U.S. PATENT DOCUMENTS 4,355,380 A 10/1982 Huguenin et al.
4,899,136 A 2/1990 Beard et al.
(Continued)

FOREIGN PATENT DOCUMENTS

AU 2012202140 A1 5/2012
AU 2015100115 A4 3/2015
(Continued)

OTHER PUBLICATIONS

Office Action received for Australian Patent Application No. 2019210673, dated Jul. 28, 2020, 4 pages.
(Continued)

*Primary Examiner* — Cesar B Paula
*Assistant Examiner* — Sajeda Muhebbullah
(74) *Attorney, Agent, or Firm* — DLA Piper LLP (US)

(57) ABSTRACT

Techniques for displaying widgets are described. In some examples, while displaying a first plurality of application icons, an electronic device detects a first user input. In response to detecting the first user input, in accordance with a determination that the first user input includes movement in a first direction, the electronic device ceases display of the first plurality of application icons, and displays a second plurality of application icons. In response to detecting the first user input, in accordance with a determination that the first user input includes movement in a second direction, the electronic device modifies display of the first plurality of application icons to change a distance between a first application icon and a second application icon of the first plurality of application icons, and concurrently displays the modified first plurality of application icons and the first set of one or more user interface elements.

39 Claims, 45 Drawing Sheets

(51) Int. Cl.
  *G06F 3/0488* (2022.01)
  *G06F 3/0485* (2022.01)
  *G06F 9/451* (2018.01)
  *G06F 3/048* (2013.01)
  *G06F 3/04842* (2022.01)
  *G06F 3/0482* (2013.01)
  *G06F 3/04886* (2022.01)

(52) U.S. Cl.
  CPC .......... *G06F 3/0483* (2013.01); *G06F 3/0485* (2013.01); *G06F 3/0488* (2013.01); *G06F 3/04842* (2013.01); *G06F 3/04886* (2013.01); *G06F 9/451* (2018.02)

(56) References Cited

U.S. PATENT DOCUMENTS

| | | |
|---|---|---|
| 5,051,736 A | 9/1991 | Bennett et al. |
| 5,124,959 A | 6/1992 | Yamazaki et al. |
| 5,146,556 A | 9/1992 | Hullot et al. |
| 5,196,838 A | 3/1993 | Meier et al. |
| 5,237,679 A | 8/1993 | Wang et al. |
| 5,312,478 A | 5/1994 | Reed et al. |
| 5,452,414 A | 9/1995 | Rosendahl et al. |
| 5,491,778 A | 2/1996 | Gordon et al. |
| 5,497,454 A | 3/1996 | Bates et al. |
| 5,515,486 A | 5/1996 | Amro et al. |
| 5,544,295 A | 8/1996 | Capps |
| 5,546,529 A | 8/1996 | Bowers et al. |
| 5,572,238 A | 11/1996 | Krivacic |
| 5,598,524 A | 1/1997 | Johnston, Jr. et al. |
| 5,610,653 A | 3/1997 | Abecassis |
| 5,612,719 A | 3/1997 | Beernink et al. |
| 5,621,878 A | 4/1997 | Owens et al. |
| 5,625,818 A | 4/1997 | Zarmer et al. |
| 5,642,490 A | 6/1997 | Morgan et al. |
| 5,644,739 A | 7/1997 | Moursund |
| 5,657,049 A | 8/1997 | Ludolph et al. |
| 5,671,381 A | 9/1997 | Strasnick et al. |
| 5,678,015 A | 10/1997 | Goh |
| 5,726,687 A | 3/1998 | Belfiore et al. |
| 5,736,974 A | 4/1998 | Selker |
| 5,745,096 A | 4/1998 | Ludolph et al. |
| 5,745,116 A | 4/1998 | Pisutha-arnond |
| 5,745,718 A | 4/1998 | Cline et al. |
| 5,745,910 A | 4/1998 | Piersol et al. |
| 5,754,179 A | 5/1998 | Hocker et al. |
| 5,754,809 A | 5/1998 | Gandre |
| 5,757,371 A | 5/1998 | Oran et al. |
| 5,760,773 A | 6/1998 | Berman et al. |
| 5,774,119 A | 6/1998 | Alimpich et al. |
| 5,796,401 A | 8/1998 | Winer |
| 5,801,699 A | 9/1998 | Hocker et al. |
| 5,801,704 A | 9/1998 | Oohara et al. |
| 5,812,862 A | 9/1998 | Smith et al. |
| 5,825,352 A | 10/1998 | Bisset et al. |
| 5,825,357 A | 10/1998 | Malamud et al. |
| 5,835,079 A | 11/1998 | Shieh |
| 5,835,094 A | 11/1998 | Ermel et al. |
| 5,838,326 A | 11/1998 | Card et al. |
| 5,861,885 A | 1/1999 | Strasnick et al. |
| 5,870,683 A | 2/1999 | Wells et al. |
| 5,870,734 A | 2/1999 | Kao |
| 5,877,765 A | 3/1999 | Dickman et al. |
| 5,877,775 A | 3/1999 | Theisen et al. |
| 5,880,733 A | 3/1999 | Horvitz et al. |
| 5,880,743 A | 3/1999 | Moran et al. |
| 5,900,876 A | 5/1999 | Yagita et al. |
| 5,914,716 A | 6/1999 | Rubin et al. |
| 5,914,717 A | 6/1999 | Kleewein et al. |
| 5,923,327 A | 7/1999 | Smith et al. |
| 5,923,908 A | 7/1999 | Schrock et al. |
| 5,934,707 A | 8/1999 | Johnson |
| 5,943,679 A | 8/1999 | Niles et al. |
| 5,956,025 A | 9/1999 | Goulden et al. |
| 5,963,204 A | 10/1999 | Ikeda et al. |
| 5,995,106 A | 11/1999 | Naughton et al. |
| 6,005,579 A | 12/1999 | Sugiyama et al. |
| 6,012,072 A | 1/2000 | Lucas et al. |
| 6,043,818 A | 3/2000 | Nakano et al. |
| 6,049,336 A | 4/2000 | Liu et al. |
| 6,054,989 A | 4/2000 | Robertson et al. |
| 6,072,486 A | 6/2000 | Sheldon et al. |
| 6,088,032 A | 7/2000 | Mackinlay |
| 6,111,573 A | 8/2000 | McComb et al. |
| 6,121,969 A | 9/2000 | Jain et al. |
| 6,133,914 A | 10/2000 | Rogers et al. |
| 6,166,738 A | 12/2000 | Robertson et al. |
| 6,188,407 B1 | 2/2001 | Smith et al. |
| 6,195,094 B1 | 2/2001 | Celebiler |
| 6,211,858 B1 | 4/2001 | Moon et al. |
| 6,222,465 B1 | 4/2001 | Kumar et al. |
| 6,229,542 B1 | 5/2001 | Miller |
| 6,253,218 B1 | 6/2001 | Aoki et al. |
| 6,275,935 B1 | 8/2001 | Barlow et al. |
| 6,278,454 B1 | 8/2001 | Krishnan |
| 6,313,853 B1 | 11/2001 | Lamontagne et al. |
| 6,317,140 B1 | 11/2001 | Livingston |
| 6,353,451 B1 | 3/2002 | Teibel et al. |
| 6,396,520 B1 | 5/2002 | Ording |
| 6,477,117 B1 | 11/2002 | Narayanaswami et al. |
| 6,486,895 B1 | 11/2002 | Robertson et al. |
| 6,496,206 B1 | 12/2002 | Mernyk et al. |
| 6,496,209 B2 | 12/2002 | Horii |
| 6,525,997 B1 | 2/2003 | Narayanaswami et al. |
| 6,545,669 B1 | 4/2003 | Kinawi et al. |
| 6,549,218 B1 | 4/2003 | Gershony et al. |
| 6,571,245 B2 | 5/2003 | Huang et al. |
| 6,590,568 B1 | 7/2003 | Astala et al. |
| 6,597,378 B1 | 7/2003 | Shiraishi et al. |
| 6,621,509 B1 | 9/2003 | Eiref et al. |
| 6,628,309 B1 | 9/2003 | Dodson et al. |
| 6,628,310 B1 | 9/2003 | Hiura et al. |
| 6,647,534 B1 | 11/2003 | Graham |
| 6,683,628 B1 | 1/2004 | Nakagawa et al. |
| 6,690,623 B1 | 2/2004 | Maano |
| 6,700,612 B1 | 3/2004 | Anderson et al. |
| 6,710,788 B1 | 3/2004 | Freach et al. |
| 6,714,222 B1 | 3/2004 | Bjorn et al. |
| 6,763,388 B1 | 7/2004 | Tsimelzon |
| 6,774,914 B1 | 8/2004 | Benayoun |
| 6,781,575 B1 | 8/2004 | Hawkins et al. |
| 6,798,429 B2 | 9/2004 | Bradski |
| 6,809,724 B1 | 10/2004 | Shiraishi et al. |
| 6,816,175 B1 | 11/2004 | Hamp et al. |
| 6,820,111 B1 | 11/2004 | Rubin et al. |
| 6,822,638 B2 | 11/2004 | Dobies et al. |
| 6,847,387 B2 | 1/2005 | Roth |
| 6,874,128 B1 | 3/2005 | Moore et al. |
| 6,880,132 B2 | 4/2005 | Uemura |
| 6,915,490 B1 | 7/2005 | Ewing |
| 6,931,601 B2 | 8/2005 | Vronay et al. |
| 6,934,911 B2 | 8/2005 | Salmimaa et al. |
| 6,940,494 B2 | 9/2005 | Hoshino et al. |
| 6,963,349 B1 | 11/2005 | Nagasaki |
| 6,970,749 B1 | 11/2005 | Chinn et al. |
| 6,976,210 B1 | 12/2005 | Silva et al. |
| 6,976,228 B2 | 12/2005 | Bernhardson |
| 6,978,127 B1 | 12/2005 | Bulthuis et al. |
| 7,003,495 B1 | 2/2006 | Burger et al. |
| 7,007,239 B1 | 2/2006 | Hawkins et al. |
| 7,010,755 B2 | 3/2006 | Anderson et al. |
| 7,017,118 B1 | 3/2006 | Carroll |
| 7,043,701 B2 | 5/2006 | Gordon |
| 7,071,943 B2 | 7/2006 | Adler |
| 7,075,512 B1 | 7/2006 | Fabre et al. |
| 7,080,326 B2 | 7/2006 | Molander et al. |
| 7,093,201 B2 | 8/2006 | Duarte |
| 7,107,549 B2 | 9/2006 | Deaton et al. |
| 7,117,453 B2 | 10/2006 | Drucker et al. |
| 7,119,819 B1 | 10/2006 | Robertson et al. |
| 7,126,579 B2 | 10/2006 | Ritter |
| 7,133,859 B1 | 11/2006 | Wong |
| 7,134,092 B2 | 11/2006 | Fung et al. |

(56) References Cited

U.S. PATENT DOCUMENTS

| | | | |
|---|---|---|---|
| 7,134,095 | B1 | 11/2006 | Smith et al. |
| 7,142,210 | B2 | 11/2006 | Schwuttke et al. |
| 7,146,576 | B2 | 12/2006 | Chang et al. |
| 7,155,667 | B1 | 12/2006 | Kotler et al. |
| 7,173,604 | B2 | 2/2007 | Marvit et al. |
| 7,178,111 | B2 | 2/2007 | Glein et al. |
| 7,194,527 | B2 | 3/2007 | Drucker et al. |
| 7,194,698 | B2 | 3/2007 | Gottfurcht et al. |
| 7,215,323 | B2 | 5/2007 | Gombert et al. |
| 7,216,305 | B1 | 5/2007 | Jaeger |
| 7,231,229 | B1 | 6/2007 | Hawkins et al. |
| 7,242,406 | B2 | 7/2007 | Robotham et al. |
| 7,249,327 | B2 | 7/2007 | Nelson et al. |
| 7,278,115 | B1 | 10/2007 | Conway et al. |
| 7,283,845 | B2 | 10/2007 | De Bast |
| 7,287,232 | B2 | 10/2007 | Tsuchimura et al. |
| 7,292,243 | B1 | 11/2007 | Burke |
| 7,310,636 | B2 | 12/2007 | Bodin et al. |
| 7,340,678 | B2 | 3/2008 | Chiu et al. |
| 7,355,593 | B2 | 4/2008 | Hill et al. |
| 7,362,331 | B2 | 4/2008 | Ording |
| 7,383,497 | B2 | 6/2008 | Glenner et al. |
| 7,392,488 | B2 | 6/2008 | Card et al. |
| 7,403,211 | B2 | 7/2008 | Sheasby et al. |
| 7,403,910 | B1 | 7/2008 | Hastings et al. |
| 7,404,151 | B2 | 7/2008 | Borchardt et al. |
| 7,406,666 | B2 | 7/2008 | Davis et al. |
| 7,412,650 | B2 | 8/2008 | Gallo |
| 7,415,677 | B2 | 8/2008 | Arend et al. |
| 7,417,680 | B2 | 8/2008 | Aoki et al. |
| 7,432,928 | B2 | 10/2008 | Shaw et al. |
| 7,433,179 | B2 | 10/2008 | Hisano et al. |
| 7,434,177 | B1 | 10/2008 | Ording et al. |
| 7,437,005 | B2 | 10/2008 | Drucker et al. |
| 7,456,823 | B2 | 11/2008 | Poupyrev et al. |
| 7,468,742 | B2 | 12/2008 | Ahn et al. |
| 7,478,437 | B2 | 1/2009 | Hatanaka et al. |
| 7,479,948 | B2 | 1/2009 | Kim et al. |
| 7,480,872 | B1 | 1/2009 | Ubillos |
| 7,480,873 | B2 | 1/2009 | Kawahara |
| 7,487,467 | B1 | 2/2009 | Kawahara et al. |
| 7,490,295 | B2 | 2/2009 | Chaudhri et al. |
| 7,493,573 | B2 | 2/2009 | Wagner |
| 7,496,595 | B2 | 2/2009 | Accapadi et al. |
| 7,506,268 | B2 | 3/2009 | Jennings et al. |
| 7,509,321 | B2 | 3/2009 | Wong et al. |
| 7,509,588 | B2 | 3/2009 | Van Os et al. |
| 7,511,710 | B2 | 3/2009 | Barrett |
| 7,512,898 | B2 | 3/2009 | Jennings et al. |
| 7,523,414 | B2 | 4/2009 | Schmidt et al. |
| 7,526,738 | B2 | 4/2009 | Ording et al. |
| 7,546,548 | B2 | 6/2009 | Chew et al. |
| 7,546,554 | B2 | 6/2009 | Chiu et al. |
| 7,552,402 | B2 | 6/2009 | Bilow |
| 7,557,804 | B1 | 7/2009 | McDaniel |
| 7,561,874 | B2 | 7/2009 | Wang et al. |
| 7,584,278 | B2 | 9/2009 | Rajarajan et al. |
| 7,587,683 | B2 | 9/2009 | Ito et al. |
| 7,594,185 | B2 | 9/2009 | Anderson et al. |
| 7,606,819 | B2 | 10/2009 | Audet et al. |
| 7,607,150 | B1 | 10/2009 | Kobayashi et al. |
| 7,620,894 | B1 | 11/2009 | Kahn |
| 7,624,357 | B2 | 11/2009 | De Bast |
| 7,642,934 | B2 | 1/2010 | Scott |
| 7,650,575 | B2 | 1/2010 | Cummins et al. |
| 7,657,842 | B2 | 2/2010 | Matthews et al. |
| 7,657,845 | B2 | 2/2010 | Drucker et al. |
| 7,663,620 | B2 | 2/2010 | Robertson et al. |
| 7,665,033 | B2 | 2/2010 | Byrne et al. |
| 7,667,703 | B2 | 2/2010 | Hong et al. |
| 7,680,817 | B2 | 3/2010 | Audet et al. |
| 7,683,883 | B2 | 3/2010 | Touma et al. |
| 7,698,658 | B2 | 4/2010 | Ohwa et al. |
| 7,710,423 | B2 | 5/2010 | Drucker et al. |
| 7,716,604 | B2 | 5/2010 | Kataoka et al. |
| 7,719,523 | B2 | 5/2010 | Hillis |
| 7,719,542 | B1 | 5/2010 | Gough et al. |
| 7,724,242 | B2 | 5/2010 | Hillis et al. |
| 7,725,839 | B2 | 5/2010 | Michaels |
| 7,728,821 | B2 | 6/2010 | Hillis et al. |
| 7,730,401 | B2 | 6/2010 | Gillespie et al. |
| 7,730,423 | B2 | 6/2010 | Graham |
| 7,735,021 | B2 | 6/2010 | Padawer et al. |
| 7,739,604 | B1 | 6/2010 | Lyons et al. |
| 7,747,289 | B2 | 6/2010 | Wang et al. |
| 7,761,813 | B2 | 7/2010 | Kim et al. |
| 7,765,266 | B2 | 7/2010 | Kropivny |
| 7,770,125 | B1 | 8/2010 | Young et al. |
| 7,783,990 | B2 | 8/2010 | Amadio et al. |
| 7,797,637 | B2 | 9/2010 | Marcjan |
| 7,805,684 | B2 | 9/2010 | Arvilommi |
| 7,810,038 | B2 | 10/2010 | Matsa et al. |
| 7,840,901 | B2 | 11/2010 | Lacey et al. |
| 7,840,907 | B2 | 11/2010 | Kikuchi et al. |
| 7,840,912 | B2 | 11/2010 | Elias et al. |
| 7,853,972 | B2 | 12/2010 | Brodersen et al. |
| 7,856,602 | B2 | 12/2010 | Armstrong |
| 7,873,916 | B1 | 1/2011 | Chaudhri |
| 7,880,726 | B2 | 2/2011 | Nakadaira et al. |
| 7,904,832 | B2 | 3/2011 | Ubillos |
| 7,907,124 | B2 | 3/2011 | Hillis et al. |
| 7,907,476 | B2 | 3/2011 | Lee |
| 7,917,869 | B2 | 3/2011 | Anderson |
| 7,924,444 | B2 | 4/2011 | Takahashi |
| 7,940,250 | B2 | 5/2011 | Forstall |
| 7,956,869 | B1 | 6/2011 | Gilra |
| 7,958,457 | B1 | 6/2011 | Brandenberg et al. |
| 7,979,879 | B2 | 7/2011 | Kazama et al. |
| 7,986,324 | B2 | 7/2011 | Funaki et al. |
| 7,995,078 | B2 | 8/2011 | Baar |
| 7,996,789 | B2 | 8/2011 | Louch et al. |
| 8,020,110 | B2 | 9/2011 | Hurst |
| 8,024,671 | B2 | 9/2011 | Lee et al. |
| 8,046,714 | B2 | 10/2011 | Yahiro et al. |
| 8,059,101 | B2 | 11/2011 | Westerman et al. |
| 8,064,704 | B2 | 11/2011 | Kim et al. |
| 8,065,618 | B2 | 11/2011 | Kumar et al. |
| 8,069,404 | B2 | 11/2011 | Audet |
| 8,072,439 | B2 | 12/2011 | Hillis et al. |
| 8,078,966 | B2 | 12/2011 | Audet |
| 8,099,441 | B2 | 1/2012 | Surasinghe |
| 8,103,963 | B2 | 1/2012 | Ikeda et al. |
| 8,111,255 | B2 | 2/2012 | Park |
| 8,125,481 | B2 | 2/2012 | Gossweile et al. |
| 8,130,211 | B2 | 3/2012 | Abernathy |
| 8,139,043 | B2 | 3/2012 | Hillis |
| 8,151,185 | B2 | 4/2012 | Audet |
| 8,156,175 | B2 | 4/2012 | Hopkins |
| 8,161,419 | B2 | 4/2012 | Palahnuk et al. |
| 8,185,842 | B2 | 5/2012 | Chang et al. |
| 8,188,985 | B2 | 5/2012 | Hillis et al. |
| 8,205,172 | B2 | 6/2012 | Wong et al. |
| 8,209,628 | B1 | 6/2012 | Davidson |
| 8,214,793 | B1 | 7/2012 | Muthuswamy |
| 8,230,358 | B1 | 7/2012 | Chaudhri |
| 8,232,990 | B2 | 7/2012 | King et al. |
| 8,255,808 | B2 | 8/2012 | Lindgren et al. |
| 8,259,163 | B2 | 9/2012 | Bell |
| 8,266,550 | B1 | 9/2012 | Cleron et al. |
| 8,269,729 | B2 | 9/2012 | Han et al. |
| 8,269,739 | B2 | 9/2012 | Hillis et al. |
| 8,306,515 | B2 | 11/2012 | Ryu et al. |
| 8,335,784 | B2 | 12/2012 | Gutt et al. |
| 8,365,084 | B1 | 1/2013 | Lin et al. |
| 8,423,911 | B2 | 4/2013 | Chaudhri |
| 8,434,027 | B2 | 4/2013 | Jones |
| 8,446,371 | B2 | 5/2013 | Fyke et al. |
| 8,458,615 | B2 | 6/2013 | Chaudhri |
| 8,519,964 | B2 | 8/2013 | Platzer et al. |
| 8,519,972 | B2 | 8/2013 | Forstall et al. |
| 8,525,839 | B2 | 9/2013 | Chaudhri |
| 8,558,808 | B2 | 10/2013 | Forstall et al. |
| 8,564,544 | B2 | 10/2013 | Jobs et al. |
| 8,601,370 | B2 | 12/2013 | Chiang et al. |

(56) References Cited

U.S. PATENT DOCUMENTS

| | | |
|---|---|---|
| 8,619,038 B2 | 12/2013 | Chaudhri et al. |
| 8,626,762 B2 | 1/2014 | Seung et al. |
| 8,672,885 B2 | 3/2014 | Kriesel et al. |
| 8,683,349 B2 | 3/2014 | Roberts et al. |
| 8,713,011 B2 | 4/2014 | Asai et al. |
| 8,713,469 B2 | 4/2014 | Park et al. |
| 8,730,188 B2 | 5/2014 | Pasquero et al. |
| 8,799,777 B1 | 8/2014 | Lee et al. |
| 8,799,821 B1 | 8/2014 | De Rose et al. |
| 8,826,170 B1 | 9/2014 | Weber et al. |
| 8,839,128 B2 | 9/2014 | Krishnaraj et al. |
| 8,881,060 B2 | 11/2014 | Chaudhri et al. |
| 8,881,061 B2 | 11/2014 | Chaudhri et al. |
| 8,957,866 B2 | 2/2015 | Barnett et al. |
| 8,972,898 B2 | 3/2015 | Carter |
| 9,026,508 B2 | 5/2015 | Nagai |
| 9,032,438 B2 | 5/2015 | Ito et al. |
| 9,053,462 B2 | 6/2015 | Cadiz et al. |
| 9,082,314 B2 | 7/2015 | Tsai |
| 9,152,312 B1 | 10/2015 | Terleski et al. |
| 9,170,708 B2 | 10/2015 | Chaudhri et al. |
| 9,237,855 B2 | 1/2016 | Hong et al. |
| 9,239,673 B2 | 1/2016 | Shaffer et al. |
| 9,256,627 B2 | 2/2016 | Surasinghe |
| 9,259,615 B2 | 2/2016 | Weast et al. |
| 9,367,232 B2 | 6/2016 | Platzer et al. |
| 9,377,762 B2 | 6/2016 | Hoobler et al. |
| 9,386,432 B2 | 7/2016 | Chu et al. |
| 9,417,787 B2 | 8/2016 | Fong |
| 9,448,691 B2 | 9/2016 | Suda |
| 9,619,143 B2 | 4/2017 | Herz et al. |
| 9,715,277 B2 * | 7/2017 | Lee ..................... G06F 3/0485 |
| 9,772,749 B2 | 9/2017 | Chaudhri et al. |
| 9,794,397 B2 | 10/2017 | Min et al. |
| 9,933,913 B2 | 4/2018 | Van Os et al. |
| 9,993,913 B2 | 6/2018 | McCardle et al. |
| 10,025,458 B2 | 7/2018 | Chaudhri et al. |
| 10,250,735 B2 | 4/2019 | Butcher et al. |
| 10,359,907 B2 | 7/2019 | Van Os et al. |
| 10,620,780 B2 | 4/2020 | Chaudhri et al. |
| 10,684,592 B2 | 6/2020 | Chang et al. |
| 10,788,953 B2 | 9/2020 | Chaudhri et al. |
| 10,788,976 B2 | 9/2020 | Chaudhri et al. |
| 10,884,579 B2 | 1/2021 | Van Os et al. |
| 10,915,224 B2 | 2/2021 | Van Os et al. |
| 11,009,833 B2 | 5/2021 | Essery |
| 2001/0024195 A1 | 9/2001 | Hayakawa |
| 2001/0024212 A1 | 9/2001 | Ohnishi |
| 2001/0038394 A1 | 11/2001 | Tsuchimura et al. |
| 2002/0008691 A1 | 1/2002 | Hanajima et al. |
| 2002/0015024 A1 | 2/2002 | Westerman et al. |
| 2002/0015042 A1 | 2/2002 | Robotham et al. |
| 2002/0015064 A1 | 2/2002 | Robotham et al. |
| 2002/0018051 A1 | 2/2002 | Singh |
| 2002/0024540 A1 | 2/2002 | Mccarthy |
| 2002/0038299 A1 | 3/2002 | Zernik et al. |
| 2002/0054090 A1 | 5/2002 | Silva et al. |
| 2002/0057287 A1 | 5/2002 | Crow et al. |
| 2002/0067376 A1 | 6/2002 | Martin et al. |
| 2002/0078037 A1 | 6/2002 | Hatanaka et al. |
| 2002/0085037 A1 | 7/2002 | Leavitt et al. |
| 2002/0091697 A1 | 7/2002 | Huang et al. |
| 2002/0093531 A1 | 7/2002 | Barile |
| 2002/0097261 A1 | 7/2002 | Gottfurcht et al. |
| 2002/0104096 A1 | 8/2002 | Cramer et al. |
| 2002/0109721 A1 | 8/2002 | Konaka et al. |
| 2002/0140698 A1 | 10/2002 | Robertson et al. |
| 2002/0140736 A1 | 10/2002 | Chen |
| 2002/0143949 A1 | 10/2002 | Rajarajan et al. |
| 2002/0149561 A1 | 10/2002 | Fukumoto et al. |
| 2002/0152222 A1 | 10/2002 | Holbrook |
| 2002/0167683 A1 | 11/2002 | Hanamoto et al. |
| 2002/0191029 A1 | 12/2002 | Gillespie et al. |
| 2002/0196238 A1 | 12/2002 | Tsukada et al. |
| 2003/0001898 A1 | 1/2003 | Bernhardson |
| 2003/0007012 A1 | 1/2003 | Bate |
| 2003/0016241 A1 | 1/2003 | Burke |
| 2003/0030664 A1 | 2/2003 | Parry |
| 2003/0048295 A1 | 3/2003 | Lilleness et al. |
| 2003/0063072 A1 | 4/2003 | Brandenberg et al. |
| 2003/0080991 A1 | 5/2003 | Crow et al. |
| 2003/0085931 A1 | 5/2003 | Card et al. |
| 2003/0090572 A1 | 5/2003 | Belz et al. |
| 2003/0098894 A1 | 5/2003 | Sheldon et al. |
| 2003/0122787 A1 | 7/2003 | Zimmerman et al. |
| 2003/0128242 A1 | 7/2003 | Gordon |
| 2003/0142136 A1 | 7/2003 | Carter et al. |
| 2003/0156119 A1 | 8/2003 | Bonadio |
| 2003/0156140 A1 | 8/2003 | Watanabe |
| 2003/0156756 A1 | 8/2003 | Gokturk et al. |
| 2003/0160825 A1 | 8/2003 | Weber |
| 2003/0164827 A1 | 9/2003 | Gottesman et al. |
| 2003/0169298 A1 | 9/2003 | Ording |
| 2003/0169302 A1 | 9/2003 | Davidsson et al. |
| 2003/0174170 A1 | 9/2003 | Jung et al. |
| 2003/0174172 A1 | 9/2003 | Conrad et al. |
| 2003/0184552 A1 | 10/2003 | Chadha |
| 2003/0184587 A1 | 10/2003 | Ording et al. |
| 2003/0189597 A1 | 10/2003 | Anderson et al. |
| 2003/0195950 A1 | 10/2003 | Huang et al. |
| 2003/0200289 A1 | 10/2003 | Kemp et al. |
| 2003/0206195 A1 | 11/2003 | Matsa et al. |
| 2003/0206197 A1 | 11/2003 | Mcinerney |
| 2003/0210278 A1 | 11/2003 | Kyoya et al. |
| 2004/0008224 A1 | 1/2004 | Molander et al. |
| 2004/0021643 A1 | 2/2004 | Hoshino et al. |
| 2004/0027330 A1 | 2/2004 | Bradski |
| 2004/0056809 A1 | 3/2004 | Prassmayer et al. |
| 2004/0056839 A1 | 3/2004 | Yoshihara |
| 2004/0070608 A1 | 4/2004 | Saka |
| 2004/0103156 A1 | 5/2004 | Quillen et al. |
| 2004/0109013 A1 | 6/2004 | Goertz |
| 2004/0121823 A1 | 6/2004 | Noesgaard et al. |
| 2004/0125088 A1 | 7/2004 | Zimmerman et al. |
| 2004/0138569 A1 | 7/2004 | Grunwald et al. |
| 2004/0141011 A1 | 7/2004 | Smethers et al. |
| 2004/0143598 A1 | 7/2004 | Drucker et al. |
| 2004/0155909 A1 | 8/2004 | Wagner |
| 2004/0160462 A1 | 8/2004 | Sheasby et al. |
| 2004/0196267 A1 | 10/2004 | Kawai et al. |
| 2004/0215719 A1 | 10/2004 | Altshuler |
| 2004/0218104 A1 | 11/2004 | Smith et al. |
| 2004/0222975 A1 | 11/2004 | Nakano et al. |
| 2004/0236769 A1 | 11/2004 | Smith et al. |
| 2004/0257375 A1 | 12/2004 | Cowperthwaite |
| 2005/0005246 A1 | 1/2005 | Card et al. |
| 2005/0005248 A1 | 1/2005 | Rockey et al. |
| 2005/0010955 A1 | 1/2005 | Elia et al. |
| 2005/0012862 A1 | 1/2005 | Lee |
| 2005/0024341 A1 | 2/2005 | Gillespie et al. |
| 2005/0026644 A1 | 2/2005 | Lien |
| 2005/0039134 A1 | 2/2005 | Wiggeshoff et al. |
| 2005/0043987 A1 | 2/2005 | Kumar et al. |
| 2005/0052471 A1 | 3/2005 | Nagasaki |
| 2005/0057524 A1 | 3/2005 | Hill et al. |
| 2005/0057530 A1 | 3/2005 | Hinckley et al. |
| 2005/0057548 A1 | 3/2005 | Kim |
| 2005/0060653 A1 | 3/2005 | Fukase et al. |
| 2005/0060664 A1 | 3/2005 | Rogers |
| 2005/0060665 A1 | 3/2005 | Rekimoto |
| 2005/0088423 A1 | 4/2005 | Keely et al. |
| 2005/0091596 A1 | 4/2005 | Anthony et al. |
| 2005/0091609 A1 | 4/2005 | Matthews et al. |
| 2005/0097089 A1 | 5/2005 | Nielsen et al. |
| 2005/0116026 A1 | 6/2005 | Burger et al. |
| 2005/0120142 A1 | 6/2005 | Hall |
| 2005/0131924 A1 | 6/2005 | Jones |
| 2005/0134578 A1 | 6/2005 | Chambers et al. |
| 2005/0138570 A1 | 6/2005 | Good et al. |
| 2005/0151742 A1 | 7/2005 | Hong et al. |
| 2005/0177796 A1 | 8/2005 | Takahashi |
| 2005/0210410 A1 | 9/2005 | Ohwa et al. |
| 2005/0210412 A1 | 9/2005 | Matthews et al. |
| 2005/0216913 A1 | 9/2005 | Gemmell et al. |

(56) References Cited

U.S. PATENT DOCUMENTS

| | | |
|---|---|---|
| 2005/0227642 A1 | 10/2005 | Jensen |
| 2005/0229102 A1 | 10/2005 | Watson et al. |
| 2005/0246331 A1 | 11/2005 | De vorchik et al. |
| 2005/0251755 A1 | 11/2005 | Mullins et al. |
| 2005/0259087 A1 | 11/2005 | Hoshino et al. |
| 2005/0262448 A1 | 11/2005 | Vronay et al. |
| 2005/0270276 A1 | 12/2005 | Sugimoto et al. |
| 2005/0275636 A1 | 12/2005 | Dehlin et al. |
| 2005/0278757 A1 | 12/2005 | Grossman et al. |
| 2005/0283734 A1 | 12/2005 | Santoro et al. |
| 2005/0289476 A1 | 12/2005 | Tokkonen |
| 2005/0289482 A1 | 12/2005 | Anthony et al. |
| 2006/0004685 A1 | 1/2006 | Pyhalammi et al. |
| 2006/0005207 A1 | 1/2006 | Louch et al. |
| 2006/0007182 A1 | 1/2006 | Sato et al. |
| 2006/0020903 A1 | 1/2006 | Wang et al. |
| 2006/0022955 A1 | 2/2006 | Kennedy |
| 2006/0025110 A1 | 2/2006 | Liu |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0031874 A1 | 2/2006 | Ok et al. |
| 2006/0033751 A1 | 2/2006 | Keely et al. |
| 2006/0035628 A1 | 2/2006 | Miller et al. |
| 2006/0036568 A1 | 2/2006 | Moore et al. |
| 2006/0048069 A1 | 3/2006 | Igeta |
| 2006/0051073 A1 | 3/2006 | Jung et al. |
| 2006/0053392 A1 | 3/2006 | Salmimaa et al. |
| 2006/0055700 A1 | 3/2006 | Niles et al. |
| 2006/0070007 A1 | 3/2006 | Cummins et al. |
| 2006/0075355 A1 | 4/2006 | Shiono et al. |
| 2006/0075396 A1 | 4/2006 | Surasinghe |
| 2006/0080386 A1 | 4/2006 | Roykkee et al. |
| 2006/0080616 A1 | 4/2006 | Vogel et al. |
| 2006/0080617 A1 | 4/2006 | Anderson et al. |
| 2006/0090022 A1 | 4/2006 | Flynn et al. |
| 2006/0092133 A1 | 5/2006 | Touma et al. |
| 2006/0092770 A1 | 5/2006 | Demas |
| 2006/0097991 A1 | 5/2006 | Hotelling et al. |
| 2006/0107231 A1 | 5/2006 | Matthews et al. |
| 2006/0112335 A1 | 5/2006 | Hofmeister et al. |
| 2006/0112347 A1 | 5/2006 | Baudisch |
| 2006/0116578 A1 | 6/2006 | Grunwald et al. |
| 2006/0117372 A1 | 6/2006 | Hopkins |
| 2006/0119619 A1 | 6/2006 | Fagans et al. |
| 2006/0123353 A1 | 6/2006 | Matthews et al. |
| 2006/0123359 A1 | 6/2006 | Schatzberger |
| 2006/0123360 A1 | 6/2006 | Anwar et al. |
| 2006/0125799 A1 | 6/2006 | Hillis et al. |
| 2006/0129586 A1 | 6/2006 | Arrouye et al. |
| 2006/0143574 A1 | 6/2006 | Ito et al. |
| 2006/0153531 A1 | 7/2006 | Kanegae et al. |
| 2006/0161863 A1 | 7/2006 | Gallo |
| 2006/0161871 A1 | 7/2006 | Hotelling et al. |
| 2006/0164418 A1 | 7/2006 | Hao et al. |
| 2006/0174211 A1 | 8/2006 | Hoellerer et al. |
| 2006/0187212 A1 | 8/2006 | Park et al. |
| 2006/0190833 A1 | 8/2006 | Sangiovanni et al. |
| 2006/0197752 A1 | 9/2006 | Hurst et al. |
| 2006/0197753 A1 | 9/2006 | Hotelling |
| 2006/0209035 A1 | 9/2006 | Jenkins et al. |
| 2006/0210958 A1 | 9/2006 | Rimas-ribikauskas et al. |
| 2006/0212828 A1 | 9/2006 | Yahiro et al. |
| 2006/0212833 A1 | 9/2006 | Gallagher et al. |
| 2006/0236266 A1 | 10/2006 | Majava |
| 2006/0242596 A1 | 10/2006 | Armstrong |
| 2006/0242604 A1 | 10/2006 | Wong et al. |
| 2006/0242607 A1 | 10/2006 | Hudson |
| 2006/0250578 A1 | 11/2006 | Pohl et al. |
| 2006/0253771 A1 | 11/2006 | Baschy |
| 2006/0262116 A1 | 11/2006 | Moshiri et al. |
| 2006/0267966 A1 | 11/2006 | Grossman et al. |
| 2006/0268100 A1 | 11/2006 | Karukka et al. |
| 2006/0271864 A1 | 11/2006 | Satterfield et al. |
| 2006/0271867 A1 | 11/2006 | Wang et al. |
| 2006/0271874 A1 | 11/2006 | Raiz et al. |
| 2006/0277460 A1 | 12/2006 | Forstall et al. |
| 2006/0277481 A1 | 12/2006 | Forstall et al. |
| 2006/0277486 A1 | 12/2006 | Skinner |
| 2006/0278692 A1 | 12/2006 | Matsumoto et al. |
| 2006/0282790 A1 | 12/2006 | Matthews et al. |
| 2006/0284852 A1 | 12/2006 | Hofmeister et al. |
| 2006/0290661 A1 | 12/2006 | Innanen et al. |
| 2007/0013665 A1 | 1/2007 | Vetelainen et al. |
| 2007/0016958 A1 | 1/2007 | Bodepudi et al. |
| 2007/0024468 A1 | 2/2007 | Quandel et al. |
| 2007/0028269 A1 | 2/2007 | Nezu et al. |
| 2007/0030362 A1 | 2/2007 | Ota et al. |
| 2007/0035513 A1 | 2/2007 | Sherrard et al. |
| 2007/0044029 A1 | 2/2007 | Fisher et al. |
| 2007/0050432 A1 | 3/2007 | Yoshizawa |
| 2007/0050726 A1 | 3/2007 | Wakai et al. |
| 2007/0055947 A1 | 3/2007 | Ostojic et al. |
| 2007/0061745 A1 | 3/2007 | Anthony et al. |
| 2007/0067272 A1 | 3/2007 | Flynt et al. |
| 2007/0070066 A1 | 3/2007 | Bakhash |
| 2007/0083827 A1 | 4/2007 | Scott et al. |
| 2007/0083911 A1 | 4/2007 | Madden et al. |
| 2007/0091068 A1 | 4/2007 | Liberty |
| 2007/0101292 A1 | 5/2007 | Kupka |
| 2007/0101297 A1 | 5/2007 | Forstall et al. |
| 2007/0106950 A1 | 5/2007 | Hutchinson et al. |
| 2007/0113207 A1 | 5/2007 | Gritton |
| 2007/0121869 A1 | 5/2007 | Gorti et al. |
| 2007/0123205 A1 | 5/2007 | Lee et al. |
| 2007/0124677 A1 | 5/2007 | de los reyes et al. |
| 2007/0126696 A1 | 6/2007 | Boillot |
| 2007/0126732 A1 | 6/2007 | Robertson et al. |
| 2007/0132789 A1 | 6/2007 | Ording et al. |
| 2007/0136351 A1 | 6/2007 | Dames et al. |
| 2007/0146325 A1 | 6/2007 | Poston et al. |
| 2007/0150810 A1 | 6/2007 | Katz et al. |
| 2007/0150834 A1 | 6/2007 | Muller et al. |
| 2007/0150835 A1 | 6/2007 | Muller |
| 2007/0152958 A1 | 7/2007 | Ahn et al. |
| 2007/0152980 A1 | 7/2007 | Kocienda et al. |
| 2007/0156697 A1 | 7/2007 | Tsarkova |
| 2007/0157089 A1 | 7/2007 | Van os et al. |
| 2007/0157094 A1 | 7/2007 | Lemay et al. |
| 2007/0157097 A1 | 7/2007 | Peters |
| 2007/0174785 A1 | 7/2007 | Perttula |
| 2007/0177803 A1 | 8/2007 | Elias et al. |
| 2007/0177804 A1 | 8/2007 | Elias et al. |
| 2007/0180395 A1 | 8/2007 | Yamashita et al. |
| 2007/0188518 A1 | 8/2007 | Vale et al. |
| 2007/0189737 A1 | 8/2007 | Chaudhri et al. |
| 2007/0192741 A1 | 8/2007 | Yoritate et al. |
| 2007/0226652 A1 | 9/2007 | Kikuchi et al. |
| 2007/0239760 A1 | 10/2007 | Simon |
| 2007/0240079 A1 | 10/2007 | Flynt et al. |
| 2007/0243862 A1 | 10/2007 | Coskun et al. |
| 2007/0243905 A1 | 10/2007 | Juh et al. |
| 2007/0245250 A1 | 10/2007 | Schechter et al. |
| 2007/0247425 A1 | 10/2007 | Liberty et al. |
| 2007/0250793 A1 | 10/2007 | Miura et al. |
| 2007/0250794 A1 | 10/2007 | Miura et al. |
| 2007/0266011 A1 | 11/2007 | Rohrs et al. |
| 2007/0271532 A1 | 11/2007 | Nguyen et al. |
| 2007/0288860 A1 | 12/2007 | Ording et al. |
| 2007/0288862 A1 | 12/2007 | Ording |
| 2007/0288868 A1 | 12/2007 | Rhee et al. |
| 2007/0294231 A1 | 12/2007 | Kaihotsu |
| 2008/0001924 A1 | 1/2008 | de los reyes et al. |
| 2008/0005702 A1 | 1/2008 | Skourup et al. |
| 2008/0005703 A1 | 1/2008 | Radivojevic et al. |
| 2008/0006762 A1 | 1/2008 | Fadell et al. |
| 2008/0016468 A1 | 1/2008 | Chambers et al. |
| 2008/0016471 A1 | 1/2008 | Park |
| 2008/0024454 A1 | 1/2008 | Everest |
| 2008/0034013 A1 | 2/2008 | Cisler et al. |
| 2008/0034309 A1 | 2/2008 | Louch et al. |
| 2008/0034317 A1 | 2/2008 | Fard et al. |
| 2008/0040668 A1 | 2/2008 | Ala-rantala |
| 2008/0059915 A1 | 3/2008 | Boillot |

(56) References Cited

U.S. PATENT DOCUMENTS

| | | |
|---|---|---|
| 2008/0062126 A1 | 3/2008 | Algreatly |
| 2008/0062141 A1 | 3/2008 | Chandhri |
| 2008/0062257 A1 | 3/2008 | Corson |
| 2008/0067626 A1 | 3/2008 | Hirler et al. |
| 2008/0082930 A1 | 4/2008 | Omernick et al. |
| 2008/0089587 A1 | 4/2008 | Kim et al. |
| 2008/0091763 A1 | 4/2008 | Devonshire et al. |
| 2008/0094369 A1 | 4/2008 | Ganatra et al. |
| 2008/0104515 A1 | 5/2008 | Dumitru et al. |
| 2008/0109408 A1 | 5/2008 | Choi et al. |
| 2008/0117461 A1 | 5/2008 | Mitsutake et al. |
| 2008/0120568 A1 | 5/2008 | Jian et al. |
| 2008/0122796 A1 | 5/2008 | Jobs et al. |
| 2008/0125180 A1 | 5/2008 | Hoffman et al. |
| 2008/0126971 A1 | 5/2008 | Kojima |
| 2008/0130421 A1 | 6/2008 | Akaiwa et al. |
| 2008/0134088 A1 | 6/2008 | Tse et al. |
| 2008/0136785 A1 | 6/2008 | Baudisch et al. |
| 2008/0151700 A1 | 6/2008 | Inoue et al. |
| 2008/0155453 A1 | 6/2008 | Othmer |
| 2008/0155617 A1 | 6/2008 | Angiolillo et al. |
| 2008/0158145 A1 | 7/2008 | Westerman |
| 2008/0158172 A1 | 7/2008 | Hotelling et al. |
| 2008/0161045 A1 | 7/2008 | Vuorenmaa |
| 2008/0164468 A1 | 7/2008 | Chen et al. |
| 2008/0165140 A1 | 7/2008 | Christie et al. |
| 2008/0168365 A1 | 7/2008 | Chaudhri |
| 2008/0168367 A1 | 7/2008 | Chaudhri et al. |
| 2008/0168368 A1 | 7/2008 | Louch et al. |
| 2008/0168382 A1 | 7/2008 | Louch et al. |
| 2008/0168401 A1 | 7/2008 | Boule et al. |
| 2008/0168478 A1 | 7/2008 | Platzer et al. |
| 2008/0180406 A1 | 7/2008 | Han et al. |
| 2008/0182628 A1 | 7/2008 | Lee et al. |
| 2008/0184112 A1 | 7/2008 | Chiang et al. |
| 2008/0204424 A1 | 8/2008 | Jin et al. |
| 2008/0216017 A1 | 9/2008 | Kurtenbach et al. |
| 2008/0222545 A1 | 9/2008 | Lemay et al. |
| 2008/0225007 A1 | 9/2008 | Nakadaira et al. |
| 2008/0229254 A1 | 9/2008 | Warner |
| 2008/0231610 A1 | 9/2008 | Hotelling et al. |
| 2008/0244119 A1 | 10/2008 | Tokuhara et al. |
| 2008/0259045 A1 | 10/2008 | Kim et al. |
| 2008/0259057 A1 | 10/2008 | Brons |
| 2008/0266407 A1 | 10/2008 | Battles et al. |
| 2008/0268948 A1 | 10/2008 | Boesen |
| 2008/0276201 A1 | 11/2008 | Risch et al. |
| 2008/0282202 A1 | 11/2008 | Sunday |
| 2008/0294981 A1 | 11/2008 | Balzano et al. |
| 2008/0300055 A1 | 12/2008 | Lutnick et al. |
| 2008/0300572 A1 | 12/2008 | Rankers et al. |
| 2008/0307361 A1 | 12/2008 | Louch et al. |
| 2008/0307362 A1 | 12/2008 | Chaudhri et al. |
| 2008/0309632 A1 | 12/2008 | Westerman et al. |
| 2008/0313110 A1 | 12/2008 | Kreamer et al. |
| 2008/0313596 A1 | 12/2008 | Kreamer et al. |
| 2009/0002335 A1 | 1/2009 | Chaudhri |
| 2009/0007017 A1 | 1/2009 | Anzures et al. |
| 2009/0019385 A1 | 1/2009 | Khatib et al. |
| 2009/0021488 A1 | 1/2009 | Kali et al. |
| 2009/0023433 A1 | 1/2009 | Walley et al. |
| 2009/0024946 A1 | 1/2009 | Gotz |
| 2009/0034805 A1 | 2/2009 | Perlmutter et al. |
| 2009/0058821 A1 | 3/2009 | Chaudhri et al. |
| 2009/0063971 A1 | 3/2009 | White et al. |
| 2009/0064055 A1 | 3/2009 | Chaudhri et al. |
| 2009/0070708 A1 | 3/2009 | Finkelstein |
| 2009/0077501 A1 | 3/2009 | Partridge et al. |
| 2009/0103780 A1 | 4/2009 | Nishihara et al. |
| 2009/0122018 A1 | 5/2009 | Vymenets et al. |
| 2009/0125842 A1 | 5/2009 | Nakayama |
| 2009/0132965 A1 | 5/2009 | Shimizu |
| 2009/0138194 A1 | 5/2009 | Geelen |
| 2009/0138827 A1 | 5/2009 | Van os et al. |
| 2009/0144653 A1 | 6/2009 | Ubillos |
| 2009/0150775 A1 | 6/2009 | Miyazaki et al. |
| 2009/0158200 A1 | 6/2009 | Palahnuk et al. |
| 2009/0163193 A1 | 6/2009 | Fyke et al. |
| 2009/0164936 A1 | 6/2009 | Kawaguchi |
| 2009/0178008 A1 | 7/2009 | Herz et al. |
| 2009/0183080 A1 | 7/2009 | Thakkar et al. |
| 2009/0183125 A1 | 7/2009 | Magal et al. |
| 2009/0184936 A1 | 7/2009 | Algreatly |
| 2009/0189911 A1 | 7/2009 | Ono |
| 2009/0199128 A1 | 8/2009 | Matthews et al. |
| 2009/0204920 A1 | 8/2009 | Beverley et al. |
| 2009/0204928 A1 | 8/2009 | Kallio et al. |
| 2009/0217187 A1 | 8/2009 | Kendall et al. |
| 2009/0217206 A1 | 8/2009 | Liu et al. |
| 2009/0217209 A1 | 8/2009 | Chen et al. |
| 2009/0222420 A1 | 9/2009 | Hirata |
| 2009/0222765 A1 | 9/2009 | Ekstrand |
| 2009/0228825 A1 | 9/2009 | Van os et al. |
| 2009/0237371 A1 | 9/2009 | Kim et al. |
| 2009/0237372 A1 | 9/2009 | Kim et al. |
| 2009/0254869 A1 | 10/2009 | Ludwig et al. |
| 2009/0265669 A1 | 10/2009 | Kida et al. |
| 2009/0271723 A1 | 10/2009 | Matsushima et al. |
| 2009/0278812 A1 | 11/2009 | Yasutake |
| 2009/0282369 A1 | 11/2009 | Jones |
| 2009/0303231 A1 | 12/2009 | Robinet et al. |
| 2009/0313567 A1 | 12/2009 | Kwon et al. |
| 2009/0313584 A1 | 12/2009 | Kerr et al. |
| 2009/0313585 A1 | 12/2009 | Hellinger et al. |
| 2009/0315848 A1 | 12/2009 | Ku et al. |
| 2009/0319928 A1 | 12/2009 | Alphin et al. |
| 2009/0319935 A1 | 12/2009 | Figura |
| 2009/0322676 A1 | 12/2009 | Kerr et al. |
| 2009/0327969 A1 | 12/2009 | Estrada |
| 2010/0011304 A1 | 1/2010 | Van Os |
| 2010/0013780 A1 | 1/2010 | Ikeda et al. |
| 2010/0031203 A1 | 2/2010 | Morris et al. |
| 2010/0050133 A1 | 2/2010 | Nishihara et al. |
| 2010/0053151 A1 | 3/2010 | Marti et al. |
| 2010/0058182 A1 | 3/2010 | Jung |
| 2010/0063813 A1 | 3/2010 | Richter et al. |
| 2010/0082661 A1 | 4/2010 | Beaudreau |
| 2010/0083165 A1 | 4/2010 | Andrews et al. |
| 2010/0095206 A1 | 4/2010 | Kim |
| 2010/0095238 A1 | 4/2010 | Baudet |
| 2010/0095248 A1 | 4/2010 | Karstens |
| 2010/0100841 A1* | 4/2010 | Shin ............ G06F 3/0486 715/784 |
| 2010/0105454 A1 | 4/2010 | Weber et al. |
| 2010/0107101 A1 | 4/2010 | Shaw et al. |
| 2010/0110025 A1 | 5/2010 | Lim |
| 2010/0115428 A1 | 5/2010 | Shuping et al. |
| 2010/0122195 A1 | 5/2010 | Hwang |
| 2010/0124152 A1 | 5/2010 | Lee |
| 2010/0153844 A1 | 6/2010 | Hwang et al. |
| 2010/0153878 A1 | 6/2010 | Lindgren et al. |
| 2010/0157742 A1 | 6/2010 | Relyea et al. |
| 2010/0159909 A1 | 6/2010 | Stifelman |
| 2010/0162170 A1 | 6/2010 | Johns et al. |
| 2010/0169357 A1 | 7/2010 | Ingrassia et al. |
| 2010/0199227 A1 | 8/2010 | Xiao et al. |
| 2010/0211872 A1 | 8/2010 | Rolston et al. |
| 2010/0223563 A1 | 9/2010 | Green |
| 2010/0223574 A1 | 9/2010 | Wang et al. |
| 2010/0229129 A1 | 9/2010 | Price et al. |
| 2010/0229130 A1 | 9/2010 | Edge et al. |
| 2010/0241955 A1 | 9/2010 | Price et al. |
| 2010/0241967 A1 | 9/2010 | Lee |
| 2010/0241999 A1 | 9/2010 | Russ et al. |
| 2010/0248788 A1 | 9/2010 | Yook et al. |
| 2010/0251085 A1 | 9/2010 | Zearing et al. |
| 2010/0257468 A1 | 10/2010 | Bernardo et al. |
| 2010/0281408 A1 | 11/2010 | Fujioka et al. |
| 2010/0315413 A1 | 12/2010 | Izadi et al. |
| 2010/0318709 A1 | 12/2010 | Bell et al. |
| 2010/0325529 A1 | 12/2010 | Sun |
| 2010/0332497 A1 | 12/2010 | Valliani et al. |
| 2010/0333017 A1 | 12/2010 | Ortiz |
| 2011/0004835 A1 | 1/2011 | Yanchar et al. |

(56) References Cited

U.S. PATENT DOCUMENTS

| | | |
|---|---|---|
| 2011/0007000 A1 | 1/2011 | Lim |
| 2011/0012921 A1 | 1/2011 | Cholewin et al. |
| 2011/0029934 A1 | 2/2011 | Locker et al. |
| 2011/0041098 A1 | 2/2011 | Kajiya et al. |
| 2011/0055722 A1 | 3/2011 | Ludwig |
| 2011/0059733 A1 | 3/2011 | Kim et al. |
| 2011/0061010 A1 | 3/2011 | Wasko |
| 2011/0078597 A1 | 3/2011 | Rapp et al. |
| 2011/0083104 A1 | 4/2011 | Minton |
| 2011/0093821 A1 | 4/2011 | Wigdor et al. |
| 2011/0119610 A1 | 5/2011 | Hackborn et al. |
| 2011/0119629 A1 | 5/2011 | Huotari et al. |
| 2011/0124376 A1* | 5/2011 | Kim ............... G06F 3/0489 455/566 |
| 2011/0131534 A1 | 6/2011 | Subramanian et al. |
| 2011/0145758 A1 | 6/2011 | Rosales et al. |
| 2011/0148786 A1 | 6/2011 | Day et al. |
| 2011/0148798 A1 | 6/2011 | Dahl |
| 2011/0167058 A1 | 7/2011 | Van Os |
| 2011/0167365 A1 | 7/2011 | Wingrove et al. |
| 2011/0173556 A1 | 7/2011 | Czerwinski et al. |
| 2011/0179368 A1 | 7/2011 | King et al. |
| 2011/0225549 A1 | 9/2011 | Kim |
| 2011/0246918 A1 | 10/2011 | Henderson |
| 2011/0252346 A1 | 10/2011 | Chaudhri |
| 2011/0252349 A1 | 10/2011 | Chaudhri |
| 2011/0252372 A1 | 10/2011 | Chaudhri |
| 2011/0252373 A1 | 10/2011 | Chaudhri |
| 2011/0283334 A1 | 11/2011 | Choi et al. |
| 2011/0285659 A1 | 11/2011 | Kuwabara et al. |
| 2011/0298723 A1 | 12/2011 | Fleizach et al. |
| 2011/0302513 A1 | 12/2011 | Ademar et al. |
| 2011/0310005 A1 | 12/2011 | Chen et al. |
| 2011/0310058 A1 | 12/2011 | Yamada et al. |
| 2011/0314098 A1 | 12/2011 | Farrell et al. |
| 2012/0023471 A1 | 1/2012 | Fischer et al. |
| 2012/0030623 A1 | 2/2012 | Hoellwarth |
| 2012/0066630 A1 | 3/2012 | Kim et al. |
| 2012/0084692 A1 | 4/2012 | Bae |
| 2012/0084694 A1 | 4/2012 | Sirpal et al. |
| 2012/0110031 A1 | 5/2012 | Lahcanski et al. |
| 2012/0151331 A1 | 6/2012 | Pallakoff et al. |
| 2012/0169617 A1 | 7/2012 | Maenpaa |
| 2012/0216146 A1 | 8/2012 | Korkonen |
| 2012/0304092 A1* | 11/2012 | Jarrett ............ G06F 3/04817 715/765 |
| 2012/0324390 A1 | 12/2012 | Tao |
| 2013/0019175 A1 | 1/2013 | Kotler et al. |
| 2013/0067411 A1 | 3/2013 | Kataoka et al. |
| 2013/0111400 A1 | 5/2013 | Miwa |
| 2013/0194066 A1 | 8/2013 | Rahman et al. |
| 2013/0205244 A1 | 8/2013 | Decker et al. |
| 2013/0234924 A1 | 9/2013 | Janefalkar et al. |
| 2013/0321340 A1 | 12/2013 | Seo et al. |
| 2013/0332886 A1 | 12/2013 | Cranfill et al. |
| 2014/0015786 A1 | 1/2014 | Honda |
| 2014/0068483 A1 | 3/2014 | Platzer et al. |
| 2014/0108978 A1 | 4/2014 | Yu et al. |
| 2014/0109024 A1 | 4/2014 | Miyazaki |
| 2014/0135631 A1 | 5/2014 | Brumback et al. |
| 2014/0139637 A1 | 5/2014 | Mistry et al. |
| 2014/0143784 A1 | 5/2014 | Mistry et al. |
| 2014/0165006 A1 | 6/2014 | Chaudhri et al. |
| 2014/0195972 A1 | 7/2014 | Lee et al. |
| 2014/0200742 A1 | 7/2014 | Mauti |
| 2014/0215457 A1 | 7/2014 | Gava et al. |
| 2014/0237360 A1 | 8/2014 | Chaudhri et al. |
| 2014/0276244 A1 | 9/2014 | Kamyar |
| 2014/0293755 A1 | 10/2014 | Geiser et al. |
| 2014/0317555 A1 | 10/2014 | Choi et al. |
| 2014/0328151 A1 | 11/2014 | Serber |
| 2014/0365126 A1 | 12/2014 | Vulcano et al. |
| 2015/0012853 A1 | 1/2015 | Chaudhri et al. |
| 2015/0015500 A1 | 1/2015 | Lee et al. |
| 2015/0089407 A1 | 3/2015 | Suzuki |
| 2015/0105125 A1 | 4/2015 | Min et al. |
| 2015/0112752 A1 | 4/2015 | Wagner et al. |
| 2015/0117162 A1 | 4/2015 | Tsai |
| 2015/0160812 A1 | 6/2015 | Yuan et al. |
| 2015/0172438 A1 | 6/2015 | Yang |
| 2015/0242092 A1 | 8/2015 | Van os et al. |
| 2015/0242989 A1 | 8/2015 | Mun et al. |
| 2015/0281945 A1 | 10/2015 | Seo et al. |
| 2015/0301506 A1 | 10/2015 | Koumaiha |
| 2015/0366518 A1 | 12/2015 | Sampson |
| 2015/0379476 A1 | 12/2015 | Chaudhri et al. |
| 2016/0034148 A1 | 2/2016 | Wilson et al. |
| 2016/0034167 A1 | 2/2016 | Wilson et al. |
| 2016/0048296 A1 | 2/2016 | Gan et al. |
| 2016/0054710 A1 | 2/2016 | Jo et al. |
| 2016/0058337 A1 | 3/2016 | Blahnik et al. |
| 2016/0062572 A1 | 3/2016 | Yang et al. |
| 2016/0077495 A1 | 3/2016 | Brown et al. |
| 2016/0117141 A1 | 4/2016 | Ro et al. |
| 2016/0124626 A1 | 5/2016 | Lee et al. |
| 2016/0139798 A1* | 5/2016 | Takikawa ............ G06F 3/0482 345/173 |
| 2016/0179310 A1 | 6/2016 | Chaudhri et al. |
| 2016/0182805 A1 | 6/2016 | Emmett et al. |
| 2016/0224211 A1 | 8/2016 | Xu et al. |
| 2016/0253065 A1 | 9/2016 | Platzer et al. |
| 2016/0269540 A1 | 9/2016 | Butcher et al. |
| 2016/0313913 A1* | 10/2016 | Leem ............... H04M 1/72472 |
| 2017/0039535 A1 | 2/2017 | Park et al. |
| 2017/0075305 A1 | 3/2017 | Ryu et al. |
| 2017/0147198 A1 | 5/2017 | Herz et al. |
| 2017/0255169 A1 | 9/2017 | Lee et al. |
| 2017/0344329 A1 | 11/2017 | Oh et al. |
| 2017/0357426 A1 | 12/2017 | Wilson et al. |
| 2017/0357427 A1 | 12/2017 | Wilson et al. |
| 2017/0357433 A1 | 12/2017 | Boule et al. |
| 2017/0374205 A1 | 12/2017 | Panda |
| 2018/0150216 A1* | 5/2018 | Choi ............... G06F 3/0412 |
| 2018/0307388 A1 | 10/2018 | Chaudhri et al. |
| 2019/0171349 A1 | 6/2019 | Van os et al. |
| 2019/0173996 A1 | 6/2019 | Butcher et al. |
| 2019/0179514 A1 | 6/2019 | Van os et al. |
| 2019/0235724 A1 | 8/2019 | Platzer et al. |
| 2019/0320057 A1 | 10/2019 | Omernick et al. |
| 2019/0369842 A1* | 12/2019 | Dolbakian .......... G06F 3/04817 |
| 2020/0000035 A1 | 1/2020 | Calmer |
| 2020/0054549 A1 | 2/2020 | Paufique |
| 2020/0142554 A1* | 5/2020 | Lin ............... G06F 3/04883 |
| 2020/0192683 A1* | 6/2020 | Lin ............... G06F 9/445 |
| 2020/0225843 A1 | 7/2020 | Herz et al. |
| 2020/0333945 A1 | 10/2020 | Wilson et al. |
| 2020/0348814 A1 | 11/2020 | Platzer et al. |
| 2020/0356242 A1 | 11/2020 | Wilson et al. |
| 2020/0379615 A1 | 12/2020 | Chaudhri et al. |
| 2021/0109647 A1 | 4/2021 | Van Os et al. |
| 2021/0112152 A1 | 4/2021 | Omernick et al. |
| 2021/0132758 A1* | 5/2021 | Xu ............... G06F 3/0488 |
| 2021/0141506 A1 | 5/2021 | Chaudhri et al. |
| 2021/0195013 A1 | 6/2021 | Butcher et al. |
| 2021/0271374 A1 | 9/2021 | Chaudhri et al. |
| 2021/0311438 A1 | 10/2021 | Wilson et al. |
| 2022/0137765 A1 | 5/2022 | Platzer et al. |
| 2022/0202384 A1 | 6/2022 | Saiki et al. |
| 2022/0206649 A1 | 6/2022 | Chaudhri et al. |
| 2022/0377167 A1 | 11/2022 | Omernick et al. |
| 2022/0413684 A1 | 12/2022 | Van Os et al. |
| 2022/0417358 A1 | 12/2022 | Butcher et al. |

FOREIGN PATENT DOCUMENTS

| | | |
|---|---|---|
| AU | 2015101022 A4 | 9/2015 |
| CA | 2349649 A1 | 1/2002 |
| CA | 2800123 C | 7/2016 |
| CH | 700242 A2 | 7/2010 |
| CN | 1392977 A | 1/2003 |
| CN | 1464719 A | 12/2003 |
| CN | 1695105 A | 11/2005 |
| CN | 1773875 A | 5/2006 |
| CN | 1786906 A | 6/2006 |

(56) References Cited

FOREIGN PATENT DOCUMENTS

| | | |
|---|---|---|
| CN | 1940833 A | 4/2007 |
| CN | 1998150 A | 7/2007 |
| CN | 101072410 A | 11/2007 |
| CN | 101308443 A | 11/2008 |
| CN | 102081502 A | 6/2011 |
| CN | 102244676 A | 11/2011 |
| CN | 102446059 A | 5/2012 |
| CN | 102801649 A | 11/2012 |
| CN | 103210366 A | 7/2013 |
| CN | 103649897 A | 3/2014 |
| CN | 104281405 A | 1/2015 |
| CN | 104471532 A | 3/2015 |
| CN | 104580576 A | 4/2015 |
| CN | 105335087 A | 2/2016 |
| EP | 163032 A2 | 12/1985 |
| EP | 404373 A1 | 12/1990 |
| EP | 626635 A2 | 11/1994 |
| EP | 689134 A1 | 12/1995 |
| EP | 844553 A1 | 5/1998 |
| EP | 1003098 A2 | 5/2000 |
| EP | 1143334 A2 | 10/2001 |
| EP | 1186997 A2 | 3/2002 |
| EP | 1517228 A2 | 3/2005 |
| EP | 1674976 A2 | 6/2006 |
| EP | 1724996 A2 | 11/2006 |
| EP | 2150031 A1 | 2/2010 |
| EP | 2911377 A1 | 8/2015 |
| EP | 2993602 A1 | 3/2016 |
| FR | 2819675 A1 | 7/2002 |
| GB | 2329813 A | 3/1999 |
| GB | 2407900 A | 5/2005 |
| JP | 6-208446 A | 7/1994 |
| JP | 8-221203 A | 8/1996 |
| JP | 9-73381 A | 3/1997 |
| JP | 9-101874 A | 4/1997 |
| JP | 9-258971 A | 10/1997 |
| JP | 9-292262 A | 11/1997 |
| JP | 9-297750 A | 11/1997 |
| JP | 10-40067 A | 2/1998 |
| JP | 10-214350 A | 8/1998 |
| JP | 11-508116 A | 7/1999 |
| JP | 2000-20213 A | 1/2000 |
| JP | 2001-92430 A | 4/2001 |
| JP | 2001-92586 A | 4/2001 |
| JP | 2001-318751 A | 11/2001 |
| JP | 2002-41197 A | 2/2002 |
| JP | 2002-41206 A | 2/2002 |
| JP | 2002-132412 A | 5/2002 |
| JP | 2002-149312 A | 5/2002 |
| JP | 2002-189567 A | 7/2002 |
| JP | 2002-525705 A | 8/2002 |
| JP | 2002-297514 A | 10/2002 |
| JP | 2002-312105 A | 10/2002 |
| JP | 2003-66941 A | 3/2003 |
| JP | 2003-139546 A | 5/2003 |
| JP | 2003-198705 A | 7/2003 |
| JP | 2003-248538 A | 9/2003 |
| JP | 2003-256142 A | 9/2003 |
| JP | 2003-271310 A | 9/2003 |
| JP | 2003-295994 A | 10/2003 |
| JP | 2003-536125 A | 12/2003 |
| JP | 2004-38260 A | 2/2004 |
| JP | 2004-70492 A | 3/2004 |
| JP | 2004-132741 A | 4/2004 |
| JP | 2004-152075 A | 5/2004 |
| JP | 2004-208217 A | 7/2004 |
| JP | 2004-341892 A | 12/2004 |
| JP | 2005-4396 A | 1/2005 |
| JP | 2005-4419 A | 1/2005 |
| JP | 2005-515530 A | 5/2005 |
| JP | 2005-198064 A | 7/2005 |
| JP | 2005-202703 A | 7/2005 |
| JP | 2005-227826 A | 8/2005 |
| JP | 2005-227951 A | 8/2005 |
| JP | 2005-228088 A | 8/2005 |
| JP | 2005-228091 A | 8/2005 |
| JP | 2005-309933 A | 11/2005 |
| JP | 2005-321915 A | 11/2005 |
| JP | 2005-327064 A | 11/2005 |
| JP | 2006-99733 A | 4/2006 |
| JP | 2006-155232 A | 6/2006 |
| JP | 2006-259376 A | 9/2006 |
| JP | 2007-25998 A | 2/2007 |
| JP | 2007-124667 A | 5/2007 |
| JP | 2007-132676 A | 5/2007 |
| JP | 2007-512635 A | 5/2007 |
| JP | 2007-334984 A | 12/2007 |
| JP | 2008-15698 A | 1/2008 |
| JP | 2008-503007 A | 1/2008 |
| JP | 2008-52705 A | 3/2008 |
| JP | 2008-102860 A | 5/2008 |
| JP | 2008-262251 A | 10/2008 |
| JP | 2008-304959 A | 12/2008 |
| JP | 2008-306667 A | 12/2008 |
| JP | 2009-9350 A | 1/2009 |
| JP | 2009-508217 A | 2/2009 |
| JP | 2009-136456 A | 6/2009 |
| JP | 2009-265929 A | 11/2009 |
| JP | 2009-277192 A | 11/2009 |
| JP | 2010-61402 A | 3/2010 |
| JP | 2010-97552 A | 4/2010 |
| JP | 2010-187096 A | 8/2010 |
| JP | 2010-538394 A | 12/2010 |
| JP | 2012-208645 A | 10/2012 |
| JP | 2013-25357 A | 2/2013 |
| JP | 2013-25409 A | 2/2013 |
| JP | 2013-47919 A | 3/2013 |
| JP | 2013-106271 A | 5/2013 |
| JP | 2013-120468 A | 6/2013 |
| JP | 2013-191234 A | 9/2013 |
| JP | 2013-203283 A | 10/2013 |
| JP | 2013-206274 A | 10/2013 |
| JP | 2013-211055 A | 10/2013 |
| JP | 2013-218698 A | 10/2013 |
| JP | 2014-503891 A | 2/2014 |
| KR | 2002-0010863 A | 2/2002 |
| KR | 10-0490373 B1 | 5/2005 |
| KR | 10-2009-0035499 A | 4/2009 |
| KR | 10-2009-0100320 A | 9/2009 |
| KR | 10-2010-0019887 A | 2/2010 |
| KR | 10-2011-0078008 A | 7/2011 |
| KR | 10-2011-0093729 A | 8/2011 |
| KR | 10-2012-0057800 A | 6/2012 |
| KR | 10-2012-0091495 A | 8/2012 |
| KR | 10-2013-0016329 A | 2/2013 |
| KR | 10-2015-0022599 A | 3/2015 |
| WO | 1996/06401 A1 | 2/1996 |
| WO | 1998/44431 A2 | 10/1998 |
| WO | 1999/38149 A1 | 7/1999 |
| WO | 2000/16186 A2 | 3/2000 |
| WO | 2001/46790 A2 | 6/2001 |
| WO | 2002/13176 A2 | 2/2002 |
| WO | 2003/060622 A2 | 7/2003 |
| WO | 2005/041020 A1 | 5/2005 |
| WO | 2005/055034 A1 | 6/2005 |
| WO | 2006/012343 A2 | 2/2006 |
| WO | 2006/020304 A2 | 2/2006 |
| WO | 2006/020305 A2 | 2/2006 |
| WO | 2006/092464 A1 | 9/2006 |
| WO | 2006/117438 A1 | 11/2006 |
| WO | 2006/119269 A2 | 11/2006 |
| WO | 2007/031816 A1 | 3/2007 |
| WO | 2007/032908 A1 | 3/2007 |
| WO | 2006/020304 A3 | 5/2007 |
| WO | 2007/069835 A1 | 6/2007 |
| WO | 2007/094894 A2 | 8/2007 |
| WO | 2007/142256 A1 | 12/2007 |
| WO | 2008/017936 A2 | 2/2008 |
| WO | 2007/100944 A3 | 8/2008 |
| WO | 2008/114491 A1 | 9/2008 |
| WO | 2009/032638 A2 | 3/2009 |
| WO | 2009/032750 A1 | 3/2009 |
| WO | 2009/089222 A2 | 7/2009 |
| WO | 2011/126501 A1 | 10/2011 |

(56) References Cited

FOREIGN PATENT DOCUMENTS

| WO | 2012/078079 A2 | 6/2012 |
|---|---|---|
| WO | 2013/017736 A1 | 2/2013 |
| WO | 2013/149055 A1 | 10/2013 |
| WO | 2013/157330 A1 | 10/2013 |
| WO | 2016/025395 A2 | 2/2016 |

OTHER PUBLICATIONS

Communication of the Board of Appeal received for European Patent Application No. 09170697.8, dated Jan. 25, 2021, 6 pages.
Office Action received for Chinese Patent Application No. 201780033621.1, dated Dec. 22, 2020, 30 pages (16 pages of English Translation and 14 pages of Official Copy).
Applicant-Initiated Interview Summary received for U.S. Appl. No. 15/421,865, dated Dec. 15, 2020, 6 pages.
Applicant-Initiated Interview Summary received for U.S. Appl. No. 16/267,817, dated Dec. 1, 2020, 5 pages.
Minutes of the Oral Proceedings received for European Patent Application No. 12189764.9, mailed on Oct. 13, 2020, 6 pages.
Office Action received for European Patent Application No. 17810739.7, dated Nov. 25, 2020, 4 pages.
Extended European Search Report received for European Patent Application No. 20203888.1, dated Feb. 10, 2021, 8 pages.
Office Action received for Australian Patent Application No. 2020201723, dated Feb. 4, 2021, 6 pages.
Office Action received for Chinese Patent Application No. 201780033973.7, dated Jan. 22, 2021, 27 pages (11 pages of English Translation and 16 pages of Official Copy).
Blickenstorfer Conrad H., "Neonode N2 A new version of the phone that pioneered touchscreens", Pen Computing Magazine, Online Available at: http://www.pencomputing.com/WinCE/neonode-n2-review.html, Nov. 4, 2007, 9 pages.
Feist Jonathan, "Android customization—How to create a custom clock widget using zooper widget", Android Authority, Available Online at: https://www.androidauthority.com/zooper-widget-clock-366476/, May 15, 2014, pp. 1-13.
Final Office Action received for U.S. Appl. No. 15/411,110, dated Mar. 15, 2021, 28 pages.
Intention to Grant received for European Patent Application No. 12189764.9, dated Mar. 5, 2021, 14 pages.
Applicant Initiated Interview Summary received for U.S. Appl. No. 16/270,801, dated Mar. 11, 2020, 3 pages.
Applicant Initiated Interview Summary received for U.S. Appl. No. 16/270,902, dated Mar. 11, 2020, 3 pages.
Final Office Action received for U.S. Appl. No. 15/411,110, dated Mar. 5, 2020, 30 pages.
Notice of Allowance received for U.S. Appl. No. 14/142,648, dated Mar. 13, 2020, 5 pages.
Record of Oral Hearing received for U.S. Appl. No. 14/142,648, mailed on Mar. 2, 2020, 13 pages.
Summons to Attend Oral Proceedings received for European Patent Application No. 12189764.9, mailed on Mar. 12, 2020, 11 pages.
Final Office Action received for U.S. Appl. No. 15/421,865, dated Mar. 19, 2021, 20 pages.
Notice of Acceptance received for Australian Patent Application No. 2021200102, dated Mar. 16, 2021, 3 pages.
Notice of Allowance received for U.S. Appl. No. 16/918,855, dated Apr. 6, 2021, 7 pages.
Office Action received for Japanese Patent Application No. 2018-121118, dated Feb. 19, 2021, 17 pages (9 pages of English Translation and 8 pages of Official Copy).
Office Action received for Japanese Patent Application No. 2019-024663, dated Feb. 19, 2021, 8 pages (4 pages of English Translation and 4 pages of Official Copy).
Final Office Action received for U.S. Appl. No. 16/267,817, dated Aug. 24, 2020, 23 pages.
Notice of Allowance received for U.S. Appl. No. 14/261,112, dated Apr. 9, 2021, 2 pages.

Office Action received for Japanese Patent Application No. 2020-046707, dated Mar. 5, 2021, 8 pages (4 pages of English Translation and 4 pages of Official Copy).
Non-Final Office Action received for U.S. Appl. No. 16/994,392, dated Jun. 9, 2021, 27 pages.
Office Action received for Chinese Patent Application No. 201780033621.1, dated May 24, 2021, 18 pages (7 pages of English Translation and 11 pages of Official Copy).
Applicant-Initiated Interview Summary received for U.S. Appl. No. 16/267,817, dated Jul. 14, 2020, 5 pages.
Examiner's Pre-Review Report received for Japanese Patent Application No. 2018-121118, dated Jun. 2, 2020, 4 pages (2 pages of English Translation and 2 pages of Official Copy).
Notice of Acceptance received for Australian Patent Application No. 2020201723, dated May 6, 2021, 3 pages.
Third Party Proceedings received for European Patent Application No. 17210062.0, mailed on Apr. 23, 2020, 6 pages.
Decision of Board of Appeal received for European Patent Application No. 09170697.8, mailed on Apr. 23, 2021, 17 pages.
Office Action received for Korean Patent Application No. 10-2020-7018655, dated Apr. 26, 2021, 9 pages (4 pages of English Translation and 5 pages of Official Copy).
Notice of Allowance received for U.S. Appl. No. 16/020,804, dated May 28, 2020, 18 pages.
Office Action received for Japanese Patent Application No. 2019-024663, dated Apr. 27, 2020, 8 pages (4 pages of English Translation and 4 pages of Official Copy).
Corrected Notice of Allowance received for U.S. Appl. No. 14/142,648, dated May 20, 2020, 2 pages.
Notice of Allowance received for U.S. Appl. No. 16/428,634, dated May 8, 2020, 16 pages.
Summons to Attend Oral Proceedings received for European Patent Application No. 12189764.9, mailed on May 20, 2020, 11 pages.
Decision on Appeal received for U.S. Appl. No. 14/142,648, mailed on Feb. 28, 2020, 6 pages.
Advisory Action received for U.S. Appl. No. 15/421,865, dated Apr. 16, 2020, 7 pages.
Applicant-Initiated Interview Summary received for U.S. Appl. No. 15/411,110, dated Apr. 21, 2020, 5 pages.
Applicant-Initiated Interview Summary received for U.S. Appl. No. 16/020,804, dated Apr. 13, 2020, 3 pages.
Non-Final Office Action received for U.S. Appl. No. 16/267,817, dated Apr. 15, 2020, 25 pages.
Notice of Acceptance received for Australian Patent Application No. 2019200692, dated Apr. 7, 2020, 3 pages.
Office Action received for Australian Patent Application No. 2019219816, dated Apr. 17, 2020, 3 pages.
Result of Consultation received for European Patent Application No. 17210062.0, dated Apr. 20, 2020, 2 pages.
Notice of Acceptance received for Australian Patent Application No. 2019204835, dated Dec. 7, 2020, 3 pages.
Notice of Allowance received for Japanese Patent Application No. 2017-223021, dated Dec. 18, 2020, 3 pages (1 page of English Translation and 2 pages of Official Copy).
Notice of Allowance received for U.S. Appl. No. 16/267,817, dated Dec. 18, 2020, 11 pages.
Summons to Oral Proceedings received for European Patent Application No. 09170697.8, mailed on Dec. 17, 2020, 4 pages.
Intention to Grant received for European Patent Application No. 17210062.0, dated Jun. 23, 2020, 8 pages.
Minutes of Oral Proceedings received for European Patent Application No. 17210062.0, mailed on Jun. 17, 2020, 5 pages.
Non-Final Office Action received for U.S. Appl. No. 15/411,110, dated Jun. 26, 2020, 32 pages.
Non-Final Office Action received for U.S. Appl. No. 16/270,801, dated Mar. 27, 2020, 11 pages.
Non-Final Office Action received for U.S. Appl. No. 16/270,902, dated Mar. 27, 2020, 11 pages.
Notice of Allowance received for Korean Patent Application No. 10-2019-7005262, dated Mar. 25, 2020, 5 pages (2 pages of English Translation and 3 pages of Official Copy).
Notice of Allowance received for U.S. Appl. No. 15/418,537, dated Apr. 6, 2020, 9 pages.

(56) References Cited

OTHER PUBLICATIONS

Notice of Allowance received for U.S. Appl. No. 16/378,291, dated Mar. 25, 2020, 11 pages.
Office Action received for Australian Patent Application No. 2017277813, dated Mar. 20, 2020, 4 pages.
Advisory Action received for U.S. Appl. No. 12/689,834, dated Aug. 19, 2015, 3 pages.
Advisory Action received for U.S. Appl. No. 12/242,851, dated Nov. 15, 2013, 4 pages.
Advisory Action received for U.S. Appl. No. 12/888,362, dated Sep. 4, 2015, 3 pages.
Advisory Action received for U.S. Appl. No. 12/888,362, dated May 7, 2013, 3 pages.
Advisory Action received for U.S. Appl. No. 14/261,112, dated Apr. 23, 2015, 3 pages.
Advisory Action received for U.S. Appl. No. 14/261,112, dated Nov. 30, 2017, 3 pages.
Advisory Action received for U.S. Appl. No. 14/710,125, dated Mar. 14, 2017, 3 pages.
Advisory Action received for U.S. Appl. No. 11/960,669, dated Nov. 3, 2011, 3 pages.
Apple Iphone School, "Customize 1.19 Update for the iPhone", 4:02 minutes video, available at <http://www.youtube.com/watch?v=5ogDzOM89oc>, uploaded on Dec. 8, 2007, 2 pages.
Apple Iphone School, "SummerBoard 3.0a9 for iPhone", 4:50 minutes video, available at <http://www.youtube.com/watch?v=s_P_9mrZTKs>, uploaded on Oct. 21, 2007, 2 pages.
Apple, "Iphone User's Guide", iPhone first generation, Available at: <http://pocketpccentral.net/iphone/products/1 g_iphone.htm>, Jun. 29, 2007, 124 pages.
Apple, "iPhone User's Guide", Available at http://mesnotices.20minutes.fr/manuel-notice-mode-emploi/APPLE/IPHONE%2D%5FE#a, Jun. 2007, 137 pages.
Apple, "Keynote '08 User's Guide", © Apple Inc., 2008, 204 pages.
Applicant Initiated Interview Summary received for U.S. Appl. No. 15/411,110, dated Oct. 28, 2019, 6 pages.
Applicant-Initiated Interview Summary received for U.S. Appl. No. 15/418,537, dated Dec. 23, 2019, 6 pages.
"Asus Eee News, Mods, and Hacks: Asus Eee PC Easy Mode Internet Tab Options Tour", asuseeehacks.blogspot.com, Available online at <http://asuseeehacks.blogspot.com/2007/11/asus-eee-pc-user-interface-tour.html>, Nov. 10, 2007, 33 pages.
Barsch, Bill, "3D Desktop! TouchScreen and XGL on Linux!", 2:42 minutes video, available at <http://www.youtube.com/watch?v=Yx9FgLr9oTk>, uploaded on Aug. 15, 2006, 2 pages.
Board Opinion received for Chinese Patent Application No. 200780041309.3, mailed on Apr. 1, 2016, 16 pages (9 pages of English Translation and 7 pages of Official copy).
Board Opinion received for Chinese Patent Application No. 201480001676.0, mailed on Oct. 21, 2019, 10 pages (1 page of English Translation and 9 pages of Official Copy).
Bott, E., et al., "Table of Contents/Chapter20: Putting Pictures on Folder Icons", Microsoft Windows XP Inside Out Deluxe, Second Edition, Available online at: http://proquest.safaribooksonline.com/book/operating-systems/9780735642171, Oct. 6, 2004, pp. 1-8 and 669.
Cha, Bonnie, "HTC Touch Diamond (Sprint)", CNET Reviews, available at <http://www.cnet.com/products/htc-touch/>, updated on Sep. 12, 2008, 8 pages.
Clifton, Marc, "Detect if Another Process is Running and Bring it to the Foreground", Online Available at: https://www.codeproject.com/Articles/2976/Detect-if-another-process-is-running-andbring-it, Sep. 30, 2002, 6 pages.
cocoabuilder.com, "Single Instance of a Cocoa Application", Available at: http://www.cocoabuilder.com/archive/cocoa/167892-single-instance-of-cocoa-application.html, Jul. 19, 2006, 4 pages.
Collomb, M., et al., "Improving drag-and-drop on wall-size displays", proceedings of Graphics Interface, May 9, 2005, pp. 25-32.
Corrected Notice of Allowance received for U.S. Appl. No. 12/689,834, dated Feb. 8, 2018, 4 pages.
Corrected Notice of Allowance received for U.S. Appl. No. 12/689,834, dated May 17, 2018, 2 pages.
Corrected Notice of Allowance received for U.S. Appl. No. 12/888,362, dated Jun. 6, 2018, 3 pages.
Corrected Notice of Allowance received for U.S. Appl. No. 12/888,362, dated Apr. 25, 2018, 3 pages.
Deanhill1971, "Run a Program or Switch to an Already Running Instance", Available Online at <https://autohotkey.com/board/topic/7129-run-a-program-or-switch-to-an-already-running-instance/>, Feb. 1, 2006, 16 pages.
Decision of Board of Appeal received for European Patent Application No. 09170697.8 mailed on Oct. 24, 2016, 24 pages.
Decision on Acceptance received for Australian Patent Application No. 2017202587, dated Oct. 8, 2019, 19 pages.
Decision on Appeal received for U.S. Appl. No. 14/142,640, mailed on Oct. 7, 2019, 9 pages.
Decision on Appeal received for U.S. Appl. No. 14/710,125, mailed on Mar. 11, 2019, 7 pages.
Decision to Grant received for European Patent Application No. 09700333.9, dated Nov. 7, 2013, 2 pages.
Decision to Grant received for European Patent Application No. 10762813.3, dated May 11, 2018, 3 pages.
Decision to Grant received for European Patent Application No. 12177813.8, dated Nov. 24, 2016, 3 pages.
Decision to Grant received for European Patent Application No. 12194312.0, dated Feb. 1, 2018, 2 pages.
Decision to Grant received for European Patent Application No. 12194315.3, dated Oct. 12, 2017, 2 pages.
Decision to Grant received for European Patent Application No. 17198398.4, dated Jun. 14, 2019, 3 pages.
Decision to Refuse received for European Patent Application No. 06846840.4, dated Mar. 4, 2010, 10 pages.
Decision to Refuse received for European Patent Application No. 09170697.8, dated Oct. 23, 2013, 12 pages.
Decision to Refuse received for European Patent Application No. 07814689.1, dated May 11, 2012, 15 pages.
Decision to Refuse received for European Patent Application No. 09170697.8, dated Jul. 10, 2018, 31 pages.
Delltech, "Windows XP: The Complete Reference: Working with Graphics", Available online at: http://web.archive.org/web/20050405151925/http:/delltech.150m.com/XP/graphics/3.htm, Chapter 18, Apr. 5, 2005, 4 pages.
Examiner's Answer to Appeal Brief received for U.S. Appl. No. 14/142,648, dated Apr. 10, 2018, 15 pages.
Examiner's Answer to Appeal Brief received for U.S. Appl. No. 14/261,112, dated Oct. 29, 2019, 10 pages.
Examiner's Answer to Appeal Brief received for U.S. Appl. No. 14/710,125, dated Jan. 26, 2018, 6 pages.
Examiner's Pre-review report received for Japanese Patent Application No. 2014-253365, dated Dec. 12, 2017, 7 pages (3 page of English Translation and 4 pages of Official Copy).
ExpansysTV, "HTC Touch Dual Demonstration by eXpansys", 5:26 minutes video, available at <http://www.youtube.com/watch?v=Tupk8MYLhMk>, uploaded on Oct. 1, 2007, 2 pages.
Extended European Search Report received for European Patent Application No. 17198398.4, dated Feb. 8, 2018., 8 pages.
Extended European Search Report received for European Patent Application No. 09170697.8, dated Apr. 28, 2010, 3 pages.
Extended European Search Report received for European Patent Application No. 12177813.8, dated Feb. 1, 2013, 6 pages.
Extended European Search Report received for European Patent Application No. 12189764.9, dated Jan. 4, 2013, 6 pages.
Extended European Search Report received for European Patent Application No. 12194312.0 dated Jan. 16, 2013, 7 pages.
Extended European Search Report received for European Patent Application No. 12194315.3, dated Jan. 16, 2013, 7 pages.
Extended European Search Report received for European Patent Application No. 17210062.0, dated Feb. 20, 2018, 12 pages.
Extended European Search Report received for European Patent Application No. 17810723.1, dated Nov. 12, 2019, 9 pages.
Extended European Search Report received for European Patent Application No. 17810739.7, dated Mar. 22, 2019, 9 pages.

(56) References Cited

OTHER PUBLICATIONS

Extended European Search Report received for European Patent Application No. 17813879.8, dated Jan. 8, 2020, 8 pages.
Extended European Search Report received for European Patent Application No. 19176224.4, dated Dec. 13, 2019, 7 pages.
Fadhley, Mohd Nazley., "LauncherX", Online Available at <http://www.palmx.org/mambo/index2.php?option=com_content&task=view&id=65&1temid>, Nov. 21, 2002, 3 pages.
Feist, Jonathan, "Android customization—how to create a custom clock widget using Zooper Widget", Available Online at: https://www.androidauthority.com/zooper-widget-clock-366476/, May 15, 2014, 10 pages.
Final Office Action received for U.S. Appl. No. 14/261,112, dated Mar. 3, 2016, 31 pages.
Final Office Action received for U.S. Appl. No. 11/960,669, dated Aug. 18, 2011, 13 pages.
Final Office Action received for U.S. Appl. No. 11/620,686, dated Aug. 3, 2009, 11 pages.
Final Office Action received for U.S. Appl. No. 11/620,686, dated Jul. 12, 2010, 10 pages.
Final Office Action received for U.S. Appl. No. 11/620,687, dated Aug. 18, 2009, 7 pages.
Final Office Action received for U.S. Appl. No. 11/849,938, dated Jan. 30, 2013, 31 pages.
Final Office Action received for U.S. Appl. No. 11/849,938, dated May 27, 2011, 21 pages.
Final Office Action received for U.S. Appl. No. 11/850,010 dated Oct. 17, 2011, 11 pages.
Final Office Action received for U.S. Appl. No. 11/850,010, dated Apr. 18, 2016, 16 pages.
Final Office Action received for U.S. Appl. No. 11/850,010, dated Aug. 14, 2018, 21 pages.
Final Office Action received for U.S. Appl. No. 11/850,010, dated Feb. 15, 2013, 12 pages.
Final Office Action received for U.S. Appl. No. 11/850,010, dated May 8, 2014, 11 pages.
Final Office Action received for U.S. Appl. No. 11/850,010, dated May 11, 2018, 24 pages.
Final Office Action received for U.S. Appl. No. 11/850,011, dated Dec. 1, 2010, 15 pages.
Final Office Action received for U.S. Appl. No. 11/969,809, dated Jul. 14, 2011, 26 pages.
Final Office Action received for U.S. Appl. No. 12/242,851, dated Dec. 12, 2011, 13 pages.
Final Office Action received for U.S. Appl. No. 12/242,851, dated Jul. 1, 2016, 90 pages.
Final Office Action received for U.S. Appl. No. 12/242,851, dated May 10, 2013, 20 pages.
Final Office Action received for U.S. Appl. No. 12/364,470, dated May 5, 2010, 16 pages.
Final Office Action received for U.S. Appl. No. 12/364,470, dated Oct. 19, 2011, 20 pages.
Final Office Action received for U.S. Appl. No. 12/689,834, dated Mar. 26, 2015, 30 pages.
Final Office Action received for U.S. Appl. No. 12/689,834, dated May 4, 2017, 41 pages.
Final Office Action received for U.S. Appl. No. 12/689,834, dated Oct. 15, 2012, 22 pages.
Final Office Action received for U.S. Appl. No. 12/888,362, dated Apr. 29, 2015, 12 pages.
Final Office Action received for U.S. Appl. No. 12/888,362, dated Jan. 3, 2013, 13 pages.
Final Office Action received for U.S. Appl. No. 12/888,375, dated Nov. 7, 2012, 14 pages.
Final Office Action received for U.S. Appl. No. 12/888,376, dated Feb. 8, 2013, 11 pages.
Final Office Action received for U.S. Appl. No. 14/142,648, dated Dec. 7, 2016, 12 pages.
Final Office Action received for U.S. Appl. No. 14/261,112, dated Aug. 10, 2017, 35 pages.
Final Office Action received for U.S. Appl. No. 14/261,112, dated Nov. 7, 2018, 34 pages.
Final Office Action received for U.S. Appl. No. 14/261,112, dated Oct. 9, 2014, 29 pages.
Final Office Action received for U.S. Appl. No. 14/710,125, dated Oct. 27, 2016, 13 pages.
Final Office Action received for U.S. Appl. No. 15/418,537, dated Sep. 23, 2019, 53 pages.
Final Office Action received for U.S. Appl. No. 15/421,865, dated Dec. 2, 2019, 19 pages.
Final Office Action received for U.S. Appl. No. 15/426,836, dated Mar. 29, 2019, 49 pages.
Final Office Action received for U.S. Appl. No. 14/142,640, dated Mar. 8, 2016, 35 pages.
Fujitsu Ltd, "SX/G Manual of Icons on Desktop", Edition 14/14A V14, 1st Edition, Mar. 27, 1998, 4 pages (Official Copy only) (See Communication under 37 CFR § 1.98(a) (3)).
Gade, Lisa, "Sprint HTC Touch", Smartphone Reviews by Mobile Tech Review, Available online at <http://www.mobiletechreview.com/phones/HTC-Touch.htm>, Nov. 2, 2007, 7 pages.
"Qualcomm Toq—smartwatch—User Manual", Available Online at: https://toq.qualcomm.com/sites/default/files/qualcomm_toq_user_manual.pdf, Nov. 27, 2013, pp. 1-38.
Gsmarena Team, "HTC Touch review", Online Available at: <twww.gsmarena.com/htc_touch-review-189p3.php>, Nov. 28, 2007, 5 pages.
Gsmarena, Team, "HTC Touch Review: Smart to Touch the Spot", available at <http://www.gsmarena.com/htc_touch-review-189.php>, Nov. 28, 2007, 18 pages.
Hayama, H, et al., "To change images of scaled-down representation", Windows XP SP3 & SP2, Dec. 1, 2008, 6 pages (2 pages of English Translation and 4 pages of official Copy).
Higuchi, Tadahiro, "Try API!, Making a cool application with Visual Basic 6.0", 1st edition, Japan, AI Publishing, AI Mook 221, Jul. 16, 1999, 23 pages (Official Copy Only) (See Communication under 37 CFR § 1.98(a) (3)).
Huang et al., "Effects of Visual Vibratory Perception by Cross-Modali Matching with Tactile Sensation", Retrieved from the Internet: <URL:http://media.nuas.ac.jp/~robin/Research/ADC99.html>, 1999, pp. 1-7.
Intention to Grant received for European Patent Application No. 09700333.9, dated Jun. 20, 2013, 7 pages.
Intention to Grant received for European Patent Application No. 10762813.3, dated Dec. 18, 2017, 11 pages.
Intention to Grant received for European Patent Application No. 12177813.8, dated Jul. 6, 2016, 8 pages.
Intention to Grant received for European Patent Application No. 12194312.0, dated Aug. 3, 2017, 8 pages.
Intention to Grant received for European Patent Application No. 12194315.3, dated May 31, 2017, 8 pages.
Intention to Grant received for European Patent Application No. 13795330.3, dated Aug. 9, 2019, 13 pages.
Intention to Grant received for European Patent Application No. 17198398.4, dated Jan. 28, 2019, 8 pages.
International Preliminary Report on Patentability for PCT Patent Application No. PCT/US2008/050047, dated Sep. 15, 2009, 11 pages.
International Preliminary Report on Patentability received for PCT Patent Application No. PCT/US2006/062685, dated Jul. 1, 2008, 6 pages.
International Preliminary Report on Patentability received for PCT Patent Application No. PCT/US2007/077639, dated Mar. 10, 2009, 6 pages.
International Preliminary Report on Patentability received for PCT Patent Application No. PCT/US2007/077643, dated Mar. 10, 2009, 7 pages.
International Preliminary Report on Patentability received for PCT Patent Application No. PCT/US2008/050430, dated Jul. 7, 2009, 10 pages.
International Preliminary Report on Patentability received for PCT Patent Application No. PCT/US2008/074625, dated Mar. 9, 2010, 6 pages.

(56) References Cited

OTHER PUBLICATIONS

International Preliminary Report on Patentability received for PCT Patent Application No. PCT/US2009/030225, dated Jul. 15, 2010, 11 pages.
International Preliminary Report on Patentability received for PCT Patent Application No. PCT/US2010/050056, dated Oct. 18, 2012, 21 pages.
International Preliminary Report on Patentability received for PCT Patent Application No. PCT/US2013/067634, dated May 12, 2016, 9 pages.
International Preliminary Report on Patentability received for PCT Patent Application No. PCT/US2014/040414, dated Dec. 23, 2015, 10 pages.
International Preliminary Report on Patentability received for PCT Patent Application No. PCT/US2017/034834, dated Dec. 20, 2018, 9 pages.
International Preliminary Report on Patentability received for PCT Patent Application No. PCT/US2017/035331, dated Dec. 20, 2018, 13 pages.
International Preliminary Report on Patentability received for PCT Patent Application No. PCT/US2017/037057, dated Dec. 27, 2018, 24 pages.
International Search Report and Written Opinion received for PCT Patent Application No. PCT/US2007/077639, dated Jul. 8, 2008, 7 pages.
International Search Report and Written Opinion received for PCT Patent Application No. PCT/US2007/077643, dated May 8, 2008, 9 pages.
International Search Report and Written Opinion received for PCT Patent Application No. PCT/US2008/050047, dated Sep. 3, 2009, 15 pages.
International Search Report and Written Opinion received for PCT Patent Application No. PCT/US2008/050430, dated Sep. 1, 2008, 13 pages.
International Search Report and Written Opinion received for PCT Patent Application No. PCT/US2008/074625, dated Jan. 8, 2009, 8 pages.
International Search Report and Written Opinion received for PCT Patent Application No. PCT/US2009/030225, dated Feb. 25, 2010, 15 pages.
International Search Report and Written Opinion received for PCT Patent Application No. PCT/US2010/050056, dated May 13, 2011, 26 pages.
International Search Report and Written Opinion received for PCT Patent Application No. PCT/US2013/067634, dated Apr. 16, 2014, 11 pages.
International Search Report and Written Opinion received for PCT Patent Application No. PCT/US2014/040414, dated Sep. 16, 2014, 12 pages.
International Search Report and Written Opinion received for PCT Patent Application No. PCT/US2017/034834, dated Aug. 23, 2017, 10 pages.
International Search Report and Written Opinion received for PCT Patent Application No. PCT/US2017/035331, dated Oct. 6, 2017, 18 pages.
International Search Report and Written Opinion received for PCT Patent Application No. PCT/US2017/037057, dated Aug. 29, 2017, 26 pages.
Invitation to Pay Additional Fees received for PCT Patent Application No. PCT/US2017/035331, dated Aug. 7, 2017, 4 pages.
Invitation to Pay Additional Fees received for PCT Patent Application No. PCT/US2010/050056, dated Jan. 5, 2011, 5 pages.
Jobs, Steve, "iPhone Introduction in 2007 (Complete)", available at <https://www.youtube.com/watch?v=9hUlxyE2Ns8>, Jan. 10, 2013, 3 pages.
Kondo, Daisuke, "Windows XP Tablet PC Edition Quick Review Challenging by Microsoft", PCfan No. 9, No. 28, Japan, Mainichi Communication, Oct. 15, 2002, pp. 12-17 (Official copy only) (See Communication under 37 CFR § 1.98(a) (3)).
"Launch 'Em Version 3.1", Retrieved from the Internet: http://www.fladnag.net/downloads/telephone/palm/APPS/Inchem31/Documentation/LaunchEm.pdf, 2001, pp. 1-39.
Mac People, "Useful Technique for Web Browser", Ascii Media Works Inc., vol. 15, No. 6, Jun. 1, 2009, 17 pages (Official copy only) (See Communication under 37 CFR § 1.98(a) (3)).
"Macintosh Human Interface Guidelines", chapter 1, 1995, pp. 3-14.
Mcguffin et al., "Acquisition of Expanding Targets", ACM, Apr. 20-25, 2002, 8 pages.
Microsoft Help and Support, "How to Arrange or Move Icons on the Desktop", Available online at: http://support.microsoft.com/kb/289587, 2007, 2 pages.
Microsoft, "Working screenshot of Microsoft Office 2003", Aug. 19, 2003, 14 pages.
Miller, Matthew, "HTC Touch and TouchFLO Interface", 7:53 minutes video, available at <http://www.youtube.com/watch?v=6oUp4wOcUc4>, uploaded on Jun. 6, 2007, 2 pages.
Minutes of Meeting received for European Patent Application No. 09170697.8, mailed on Jul. 10, 2018, 6 pages.
Minutes of the Oral Proceedings received for European Patent Application No. 13795330.3, mailed on Aug. 2, 2019, 7 pages.
mobilissimo.ro, "HTC Touch—Touch FLO Demo", Online Available at: <<https://www.youtube.com/watch?v=YQ8TQ9Rr_7E>, Jun. 5, 2007, 1 page.
Nakata, Atsushi, "Tablet PC aiming at spread pen input by changing target user", Nikkei Windows for IT Professionals, Nikkei Business Publications, Inc., No. 69, Dec. 1, 2002, pp. 14-16 (Official copy only) (See Communication under 37 CFR § 1.98(a) (3)).
Naver Blog, "iPhone iOS 4 folder management", Jun. 27, 2010, 2 pages (Official copy only) (See Communication under 37 CFR § 1.98(a) (3)).
Nishida, T., et al., "Drag-and-Guess: Drag-and-Drop with Prediction", INTERACT'07 Proceedings of the 11th IFIP TC 13 International Conference on Human-Computer interaction, Sep. 10, 2007, pp. 461-474.
"Nokia 7710", Available online at: https://www.nokia.com/en_int/phones/sites/default/files/user-guides/Nokia_7710_UG_en.pdf, 2005, pp. 1-153.
Non-Final Office Action received for U.S. Appl. No. 11/620,687, dated Dec. 22, 2008, 9 pages.
Non-Final Office Action received for U.S. Appl. No. 11/620,687, dated Jan. 11, 2010, 9 pages.
Non-Final Office Action received for U.S. Appl. No. 11/850,010, dated Dec. 17, 2014, 10 pages.
Non-Final Office Action received for U.S. Appl. No. 12/689,834, dated Aug. 26, 2016, 26 pages.
Non-Final Office Action received for U.S. Appl. No. 12/689,834, dated May 24, 2012, 21 pages.
Non-Final Office Action received for U.S. Appl. No. 14/142,640, dated Jun. 5, 2015, 29 pages.
Non-Final Office Action received for U.S. Appl. No. 15/033,551, dated May 24, 2018, 26 pages.
Non-Final Office Action received for U.S. Appl. No. 15/421,865, dated Mar. 21, 2019, 18 pages.
Non-Final Office Action received for U.S. Appl. No. 11/960,669, dated Mar. 17, 2011, 23 pages.
Non-Final Office Action received for U.S. Appl. No. 11/459,602, dated Sep. 4, 2008, 13 pages.
Non-Final Office Action received for U.S. Appl. No. 11/620,686, dated Dec. 22, 2009, 10 pages.
Non-Final Office Action received for U.S. Appl. No. 11/620,686, dated Dec. 31, 2008, 17 pages.
Non-Final Office Action received for U.S. Appl. No. 11/849,938, dated Dec. 14, 2011, 26 pages.
Non-Final Office Action received for U.S. Appl. No. 11/849,938, dated Oct. 12, 2010, 19 pages.
Non-Final Office Action received for U.S. Appl. No. 11/850,010 dated May 16, 2012, 12 pages.
Non-Final Office Action received for U.S. Appl. No. 11/850,010 dated May 2, 2011, 10 pages.
Non-Final Office Action received for U.S. Appl. No. 11/850,010, dated Oct. 24, 2013, 13 pages.

(56) References Cited

OTHER PUBLICATIONS

Non-Final Office Action received for U.S. Appl. No. 11/850,010, dated Jul. 24, 2017, 19 pages.
Non-Final Office Action received for U.S. Appl. No. 11/850,010, dated Jun. 25, 2015, 10 pages.
Non-Final Office Action received for U.S. Appl. No. 11/850,011, dated Aug. 11, 2010, 19 pages.
Non-Final Office Action received for U.S. Appl. No. 11/969,809, dated Mar. 14, 2011, 25 pages.
Non-Final Office Action received for U.S. Appl. No. 12/242,851, dated Apr. 15, 2011, 20 pages.
Non-Final Office Action received for U.S. Appl. No. 12/242,851, dated Jun. 26, 2015, 33 pages.
Non-Final Office Action received for U.S. Appl. No. 12/242,851, dated Oct. 6, 2014, 27 pages.
Non-Final Office Action received for U.S. Appl. No. 12/242,851, dated Sep. 20, 2012, 19 pages.
Non-Final Office Action received for U.S. Appl. No. 12/364,470, dated Mar. 4, 2011, 17 pages.
Non-Final Office Action received for U.S. Appl. No. 12/364,470, dated Nov. 13, 2009, 15 pages.
Non-Final Office Action received for U.S. Appl. No. 12/364,470, dated Sep. 2, 2010, 26 pages.
Non-Final Office Action received for U.S. Appl. No. 12/689,834, dated Jun. 10, 2014, 25 pages.
Non-Final Office Action received for U.S. Appl. No. 12/788,278, dated Oct. 16, 2012, 19 pages.
Non-Final Office Action received for U.S. Appl. No. 12/888,362, dated Sep. 4, 2014, 10 pages.
Non-Final Office Action received for U.S. Appl. No. 12/888,366, dated Jul. 31, 2012, 10 pages.
Non-Final Office Action received for U.S. Appl. No. 12/888,370, dated Aug. 22, 2012, 13 pages.
Non-Final Office Action received for U.S. Appl. No. 12/888,373, dated Sep. 10, 2012, 12 pages.
Non-Final Office Action received for U.S. Appl. No. 12/888,375, dated Jun. 7, 2012, 11 pages.
Non-Final Office Action received for U.S. Appl. No. 12/888,375, dated Sep. 30, 2013, 10 pages.
Non-Final Office Action received for U.S. Appl. No. 12/888,376, dated Aug. 29, 2014, 12 pages.
Non-Final Office Action received for U.S. Appl. No. 12/888,376, dated Oct. 2, 2012, 12 pages.
Non-Final Office Action received for U.S. Appl. No. 12/888,377, dated Sep. 13, 2012, 13 pages.
Non-Final Office Action received for U.S. Appl. No. 13/104,903, dated Nov. 13, 2012, 9 pages.
Non-Final Office Action received for U.S. Appl. No. 13/104,911, dated Feb. 20, 2013, 11 pages.
Non-Final Office Action received for U.S. Appl. No. 14/142,648, dated Apr. 12, 2016, 11 pages.
Non-Final Office Action received for U.S. Appl. No. 14/261,112, dated Apr. 5, 2018, 40 pages.
Non-Final Office Action received for U.S. Appl. No. 14/261,112, dated Jul. 8, 2015, 29 pages.
Non-Final Office Action received for U.S. Appl. No. 14/261,112, dated Jun. 18, 2014, 25 pages.
Non-Final Office Action received for U.S. Appl. No. 14/261,112, dated Nov. 29, 2016, 34 pages.
Non-Final Office Action received for U.S. Appl. No. 15/153,617, dated Apr. 2, 2018, 12 pages.
Non-Final Office Action received for U.S. Appl. No. 15/411,110, dated Dec. 13, 2018, 23 pages.
Non-Final Office Action received for U.S. Appl. No. 15/411,110, dated Jul. 22, 2019, 29 pages.
Non-Final Office Action received for U.S. Appl. No. 15/418,537, dated Dec. 13, 2018, 53 pages.
Non-Final Office Action received for U.S. Appl. No. 15/426,836, dated Oct. 18, 2018, 40 pages.
Non-Final Office Action received for U.S. Appl. No. 16/020,804, dated Nov. 20, 2019, 13 pages.
Non-Final Office Action received for U.S. Appl. No. 12/888,362, dated Jul. 20, 2012, 15 pages.
Non-Final Office Action received for U.S. Appl. No. 14/710,125, dated Apr. 12, 2016, 12 pages.
Notice of Acceptance received for Australia Patent Application No. 2012261534, dated Jan. 6, 2015, 2 pages.
Notice of Acceptance received for Australian Patent Application No. 2012200475, dated Aug. 24, 2015, 2 pages.
Notice of Acceptance received for Australian Patent Application No. 2012202140, dated May 28, 2014, 2 pages.
Notice of Acceptance received for Australian Patent Application No. 2013404001, dated Nov. 21,2017, 3 pages.
Notice of Acceptance received for Australian Patent Application No. 2014204422, dated Apr. 28, 2016, 2 pages.
Notice of Acceptance received for Australian Patent Application No. 2014274556, dated Jul. 27, 2016, 2 pages.
Notice of Acceptance received for Australian Patent Application No. 2016203168, dated Feb. 14, 2018, 3 pages.
Notice of Acceptance received for Australian Patent Application No. 2016203309, dated Feb. 14, 2018, 3 pages.
Notice of Acceptance received for Australian Patent Application No. 2016213886, dated Feb. 9, 2018, 3 pages.
Notice of Acceptance received for Australian Patent Application No. 2017201768, dated Nov. 21, 2018, 3 pages.
Notice of Acceptance received for Australian Patent Application No. 2017202587, dated Nov. 6, 2019, 3 pages.
Notice of Acceptance received for Australian Patent Application No. 2017276153, dated Feb. 19, 2018, 4 pages.
Notice of Acceptance received for Australian Patent Application No. 2017276153, dated Jan. 17, 2018, 3 pages.
Notice of Acceptance received for Australian Patent Application No. 2017277851, dated Dec. 9, 2019, 3 pages.
Notice of Acceptance received for Australian Patent Application No. 2018200272, dated Apr. 23, 2019, 3 pages.
Notice of Acceptance received for Australian Patent Application No. 2018203512, dated Jul. 26, 2019, 3 pages.
Notice of Allowance received for Australian Patent Application No. 2010350739, dated Sep. 8, 2014, 2 pages.
Notice of Allowance received for Australian Patent Application No. 2015202076, dated Apr. 5, 2017, 3 pages.
Notice of Allowance received for Canadian Patent Application No. 2,845,297, dated Nov. 10, 2014, 1 page.
Notice of Allowance received for Canadian Patent Application No. 2,890,778, dated Apr. 24, 2017, 1 page.
Notice of Allowance received for Chinese Patent Application No. 200780041309.3, dated Jul. 31, 2017, 2 Pages (Official Copy only) (See Communication under 37 CFR § 1.98(a) (3)).
Notice of Allowance received for Chinese Patent Application No. 200980000229.2, dated Oct. 24, 2014, 4 pages (2 pages of English Translation and 2 pages of Official Copy).
Notice of Allowance received for Chinese Patent Application No. 201010592864.9, dated Jan. 30, 2015, 4 pages (Official Copy Only) (See Communication under 37 CFR § 1.98(a) (3)).
Notice of Allowance received for Chinese Patent Application No. 201310724733.5, dated Dec. 27, 2018, 2 pages (1 page of English Translation and 1 page of Official Copy).
Notice of Allowance received for Chinese Patent Application No. 201380080659.6, dated Jul. 29, 2019, 2 pages (1 page of English Translation and 1 page of Official Copy).
Notice of Allowance received for Chinese Patent Application No. 201410250648.4, dated Aug. 20, 2018, 2 pages (1 page of English Translation and 1 page of Official Copy).
Notice of Allowance received for Chinese Patent Application No. 201410250688.9, dated May 21, 2018, 3 pages (1 page of English Translation and 2 pages of Official Copy).
Notice of Allowance received for Chinese Patent Application No. 201410251370.2, dated Jul. 31, 2018, 2 pages (1 page of English Translation and 1 page of Official Copy).
Notice of Allowance received for Chinese Patent Application No. 201410251400.X, dated Aug. 20, 2018, 3 pages (1 page of English Translation and 2 pages of Official Copy).

(56) References Cited

OTHER PUBLICATIONS

Notice of Allowance received for Japanese Patent Application No. 2009-051921, dated Jan. 20, 2014, 2 pages (Official Copy only) (See Communication under 37 CFR § 1.98(a) (3)).
Notice of Allowance received for Japanese Patent Application No. 2013-127963, dated Oct. 9, 2015, 3 pages (1 page of English Translation and 2 pages of Official Copy).
Notice of Allowance received for Japanese Patent Application No. 2013-252338, dated Jun. 23, 2017, 3 pages (Official Copy Only) (See Communication under 37 CFR § 1.98(a) (3)).
Notice of Allowance received for Japanese Patent Application No. 2014-139095, dated Apr. 1, 2016, 3 pages (Official Copy only) (See Communication under 37 § CFR 1.98(a) (3)).
Notice of Allowance received for Japanese Patent Application No. 2014-253365, dated Nov. 26, 2018, 3 pages (1 page of English Translation and 2 pages of Official Copy).
Notice of Allowance received for Japanese Patent Application No. 2015-532193 dated Jan. 23, 2017, 3 pages (Official Copy Only) (See Communication under 37 CFR § 1.98(a) (3)).
Notice of Allowance received for Japanese Patent Application No. 2016-091460, dated Oct. 9, 2018, 3 pages (1 page of English Translation and 2 pages of Official Copy).
Notice of Allowance received for Japanese Patent Application No. 2016-092789, dated Feb. 3, 2017, 3 pages (Official Copy Only) (See Communication under 37 CFR § 1.98(a) (3)).
Notice of Allowance received for Japanese Patent Application No. 2016-527367, dated Jul. 30, 2018, 4 pages (1 page of English Translation and 3 pages of Official Copy).
Notice of Allowance received for Japanese Patent Application No. 2017-042050, dated Apr. 24, 2017, 3 pages (Official Copy Only) (See Communication under 37 CFR § 1.98(a) (3)).
Notice of Allowance received for Japanese Patent Application No. 2017-102031, dated Jun. 23, 2017, 3 pages (Official Copy Only) (See Communication under 37 CFR § 1.98(a) (3)).
Notice of Allowance received for Japanese Patent Application No. 2017-142812, dated Jul. 19, 2019, 4 pages (1 page of English Translation and 3 pages of Official copy).
Notice of Allowance received for Japanese Patent Application No. 2017-204561, dated Mar. 12, 2019, 4 pages (1 page of English Translation and 3 pages of Official Copy).
Notice of Allowance received for Japanese Patent Application No. 2013-011209, dated Jun. 13, 2016, 2 pages (Official Copy only) (See Communication under 37 § CFR 1.98(a) (3)).
Notice of Allowance received for Korean Patent Application No. 10-2011-7026583, dated Apr. 29, 2015, 3 pages (1 page of English Translation and 2 pages of Official Copy).
Notice of Allowance received for Korean Patent Application No. 10-2012-7029270, dated Sep. 23, 2014, 2 pages (Official Copy only) (See Communication under 37 CFR § 1.98(a) (3)).
Notice of Allowance received for Korean Patent Application No. 10-2014-7011273, dated Apr. 28, 2015, 3 pages (1 page of English Translation and 2 pages of Official Copy).
Notice of Allowance Received for Korean Patent Application No. 10-2014-7036624, dated Sep. 26, 2016, 3 pages (1 page of English Translation and 2 pages of Official Copy).
Notice of Allowance received for Korean Patent Application No. 10-2016-7014051, dated Nov. 27, 2018, 4 pages (1 page of English Translation and 3 pages of Official Copy).
Notice of Allowance received for U.S. Appl. No. 12/788,278, dated May 1, 2013, 8 pages.
Notice of Allowance received for U.S. Appl. No. 14/011,639, dated Sep. 29, 2015, 11 pages.
Notice of Allowance received for U.S. Appl. No. 11/459,602, dated Jan. 9, 2009, 6 pages.
Notice of Allowance received for U.S. Appl. No. 11/849,938, dated Nov. 27, 2013, 2 pages.
Notice of Allowance received for U.S. Appl. No. 11/849,938, dated Oct. 10, 2013, 28 pages.
Notice of Allowance received for U.S. Appl. No. 11/850,011, dated Feb. 11, 2011, 5 pages.
Notice of Allowance received for U.S. Appl. No. 11/850,011, dated Feb. 18, 2011, 4 pages.
Notice of Allowance received for U.S. Appl. No. 11/969,809, dated Apr. 26, 2013, 17 pages.
Notice of Allowance received for U.S. Appl. No. 12/242,851, dated Dec. 27, 2016, 20 pages.
Notice of Allowance received for U.S. Appl. No. 12/364,470, dated Nov. 24, 2017, 9 pages.
Notice of Allowance received for U.S. Appl. No. 12/689,834, dated Jan. 17, 2018, 9 pages.
Notice of Allowance received for U.S. Appl. No. 12/888,362, dated Apr. 11, 2018, 7 pages.
Notice of Allowance received for U.S. Appl. No. 12/888,366, dated Dec. 14, 2012, 11 pages.
Notice of Allowance received for U.S. Appl. No. 12/888,370, dated Feb. 12, 2013, 10 pages.
Notice of Allowance received for U.S. Appl. No. 12/888,370, dated Jul. 1, 2014, 8 pages.
Notice of Allowance received for U.S. Appl. No. 12/888,373, dated Jul. 1, 2014, 8 pages.
Notice of Allowance received for U.S. Appl. No. 12/888,376, dated May 29, 2015, 14 pages.
Notice of Allowance received for U.S. Appl. No. 13/104,903, dated Apr. 29, 2013, 6 pages.
Notice of Allowance received for U.S. Appl. No. 13/104,911, dated Jun. 10, 2013, 6 pages.
Notice of Allowance received for U.S. Appl. No. 14/011,639, dated Feb. 16, 2016, 5 pages.
Notice of Allowance received for U.S. Appl. No. 14/142,640, dated Dec. 11, 2019, 7 pages.
Notice of Allowance received for U.S. Appl. No. 14/710,125, dated Apr. 19, 2019, 8 pages.
Notice of Allowance received for U.S. Appl. No. 14/710,125, dated May 7, 2019, 9 pages.
Notice of Allowance received for U.S. Appl. No. 15/033,551, dated Nov. 14, 2018, 10 pages.
Notice of Allowance received for U.S. Appl. No. 15/056,913, dated May 24, 2017, 19 pages.
Notice of Allowance received for U.S. Appl. No. 15/153,617, dated Nov. 23, 2018, 10 pages.
Notice of Allowance received for U.S. Appl. No. 15/426,836, dated Dec. 16, 2019, 16 pages.
Notice of Allowance received for U.S. Appl. No. 11/850,010, dated Feb. 6, 2019, 25 pages.
Notice of Allowance received for U.S. Appl. No. 12/888,373, dated Feb. 22, 2013, 12 pages.
Notice of Allowance received for U.S. Appl. No. 12/888,377, dated Jan. 30, 2013, 12 pages.
Office Action received for Danish Patent Application No. PA201670595, dated Nov. 25, 2016, 9 pages.
Office Action received for European Patent Application No. 13795330.3, dated Oct. 9, 2017, 8 pages.
Office Action received for Australian Patent Application No. 2014274556, dated Aug. 28, 2015, 2 pages.
Office Action received for Australian Patent Application No. 2009204252, dated Sep. 16, 2014, 6 pages.
Office Action received for Australian Patent Application No. 2012200475, dated Aug. 4, 2015, 3 pages.
Office Action received for Australian Patent Application No. 2012200475, dated Jun. 29, 2015, 3 pages.
Office Action received for Australian Patent Application No. 2012200475, dated Nov. 19, 2013, 4 pages.
Office Action received for Australian Patent Application No. 2012202140, dated Aug. 12, 2013, 2 pages.
Office Action received for Australian Patent Application No. 2012261534, dated Dec. 3, 2013, 3 pages.
Office Action received for Australian Patent Application No. 2013404001, dated Aug. 3, 2017, 5 pages.
Office Action received for Australian Patent Application No. 2013404001, dated Nov. 26, 2016, 3 pages.
Office Action received for Australian Patent Application No. 2014100582, dated Aug. 7, 2014, 5 pages.

(56) References Cited

OTHER PUBLICATIONS

Office Action received for Australian Patent Application No. 2014100582, dated Feb. 4, 2015, 3 pages.
Office Action received for Australian Patent Application No. 2014204422, dated Aug. 7, 2015, 3 pages.
Office Action received for Australian Patent Application No. 2014274537, dated Jul. 25, 2016, 3 pages.
Office Action received for Australian Patent Application No. 2014274537, dated Aug. 14, 2015, 3 pages.
Office Action received for Australian Patent Application No. 2015202076, dated May 5, 2016, 3 pages.
Office Action received for Australian Patent Application No. 2015215876, dated Aug. 1, 2016, 4 pages.
Office Action received for Australian Patent Application No. 2015215876, dated Jul. 26, 2017, 6 pages.
Office Action received for Australian Patent Application No. 2015215876, dated Jun. 28, 2017, 4 pages.
Office Action received for Australian Patent Application No. 2015215876, dated May 24, 2017, 4 pages.
Office Action received for Australian Patent Application No. 2016203168, dated Feb. 8, 2017, 2 pages.
Office Action received for Australian Patent Application No. 2016203309, dated Feb. 8, 2017, 11 pages.
Office Action received for Australian Patent Application No. 2016213886, dated May 18, 2017, 2 pages.
Office Action received for Australian Patent Application No. 2017201768, dated Feb. 28, 2018, 4 pages.
Office Action received for Australian Patent Application No. 2017202587, dated Apr. 26, 2019, 4 pages.
Office Action received for Australian Patent Application No. 2017202587, dated Jul. 4, 2018, 4 pages.
Office Action received for Australian Patent Application No. 2017202587, dated Jul. 4, 2019, 4 pages.
Office Action received for Australian Patent Application No. 2017277813, dated Jun. 11, 2019, 3 pages.
Office Action received for Australian Patent Application No. 2017277851, dated Jul. 5, 2019, 3 pages.
Office Action received for Australian Patent Application No. 2018200272, dated Jan. 17, 2019, 2 pages.
Office Action received for Australian Patent Application No. 2018203512, dated Apr. 15, 2019, 4 pages.
Office Action received for Australian Patent Application No. 2019200692, dated Dec. 24, 2019, 2 pages.
Office Action received for Canadian Patent Application No. 2,845,297, dated Apr. 23, 2014, 2 pages.
Office Action received for Canadian Patent Application No. 2,890,778, dated May 19, 2016, 6 pages.
Office Action received for Canadian Patent Application No. 2,983,178, dated Aug. 16, 2018, 5 pages.
Office Action received for Canadian Patent Application No. 2,983,178, dated Jul. 22, 2019, 6 pages.
Office Action received for Chinese Patent Application No. 200780041309.3, dated Feb. 8, 2017, 4 pages (1 page of English Translation and 3 pages of Official Copy).
Office Action received for Chinese Patent Application No. 200980000229.2, dated Jan. 6, 2014, 6 pages (3 pages of English Translation and 3 pages of Official Copy).
Office Action received for Chinese Patent Application No. 200980000229.2, dated Jun. 27, 2014, 7 pages (4 pages of English Translation and 3 pages of Official copy).
Office Action received for Chinese Patent Application No. 201310724733.5, dated Apr. 9, 2018, 11 pages (2 pages of English Translation and 9 pages of Official copy).
Office Action received for Chinese Patent Application No. 201310724733.5, dated Aug. 15, 2018, 2 pages (1 page of English Translation and 1 page of Official copy).
Office Action received for Chinese Patent Application No. 201310724733.5, dated Aug. 28, 2018, 6 pages (3 pages of English Translation and 3 pages of Official copy).
Office Action received for Chinese Patent Application No. 201310724733.5, dated Oct. 30, 2017, 14 pages (3 pages of English Translation and 11 pages of Official Copy).
Office Action received for Chinese Patent Application No. 201310724733.5, dated Apr. 12, 2016, 14 pages (3 pages of English Translation and 11 pages of Official Copy).
Office Action received for Chinese Patent Application No. 201310724733.5, dated Apr. 21, 2017, 18 pages (5 pages of English Translation and 13 pages of Official Copy).
Office Action received for Chinese Patent Application No. 201310724733.5, dated Dec. 30, 2016, 13 pages (3 pages of English Translation and 10 pages of Official Copy).
Office Action received for Chinese Patent Application No. 201380080659.6, dated Apr. 4, 2018, 15 pages (5 pages of English Translation and 10 pages of Official Copy).
Office Action received for Chinese Patent Application No. 201380080659.6, dated Mar. 4, 2019, 9 pages (5 pages of English Translation and 4 pages of Official Copy).
Office Action received for Chinese Patent Application No. 201380080659.6, dated Oct. 26, 2018, 11 pages (3 pages of English Translation and 8 pages of Official Copy).
Office action received for Chinese Patent Application No. 201410250648.4, dated Feb. 14, 2018, 6 pages (3 pages of English Translation and 3 pages of Official Copy).
Office Action received for Chinese Patent Application No. 201410250648.4, dated Jun. 29, 2017, 13 pages (5 pages of English Translation and 8 pages of Official Copy).
Office Action received for Chinese Patent Application No. 201410250648.4, dated Oct. 9, 2016, 6 pages (3 pages of English Translation and 3 pages of Official Copy).
Office Action received for Chinese Patent Application No. 201410250688.9, dated Nov. 16, 2017, 6 pages (3 pages of English Translation and 3 pages of Official Copy).
Office Action received for Chinese Patent Application No. 201410250688.9, dated Jun. 1, 2017, 12 pages (5 pages of English Translation and 7 pages of Official Copy).
Office Action received for Chinese Patent Application No. 201410250688.9, dated Sep. 28, 2016, 7 pages (3 pages of English Translation and 4 pages of Official Copy).
Office Action received for Chinese Patent Application No. 201410251370.2, dated Feb. 11, 2018, 14 pages (5 pages of English Translation and 9 pages of Official Copy).
Office Action received for Chinese Patent Application No. 201410251370.2, dated May 12, 2017, 8 pages (4 pages of English Translation and 4 pages of Official Copy).
Office Action received for Chinese Patent Application No. 201410251370.2, dated Sep. 5, 2016, 7 pages (3 pages of English Translation and 4 pages of Official Copy).
Office Action received for Chinese Patent Application No. 201410251400.X, dated Feb. 8, 2018, 6 pages (3 pages of English Translation and 3 pages of Official Copy).
Office Action received for Chinese Patent Application No. 201410251400.X, dated Jul. 4, 2016, 8 pages (2 pages of English Translation and 6 pages of Official Copy).
Office Action received for Chinese Patent Application No. 201410251400.X, dated May 26, 2017, 11 pages (3 pages of English Translation and 8 pages of Official Copy).
Office Action received for Chinese Patent Application No. 201480001676.0, dated Mar. 20, 2018, 12 pages (3 pages of English Translation and 9 pages of Official Copy).
Office Action received for Chinese Patent Application No. 201480001676.0, dated May 12, 2017, 15 pages (5 pages of English Translation and 10 pages of Official Copy).
Office Action received for Chinese Patent Application No. 201480001676.0, dated Nov. 27, 2018, 8 pages (1 page of English Translation and 7 pages of Official Copy).
Office Action received for Danish Patent Application No. PA201670595, dated Aug. 23, 2018, 5 pages.
Office Action received for Danish Patent Application No. PA201670595, dated May 31, 2017, 3 pages.
Office Action received for Danish Patent Application No. PA201670595, dated Nov. 30, 2017, 4 pages.

(56) References Cited

OTHER PUBLICATIONS

Office Action received for European Patent Application No. 07814689.1, dated Mar. 4, 2011, 6 pages.
Office Action received for European Patent Application No. 08705639.6, dated Dec. 19, 2013, 7 pages.
Office Action received for European Patent Application No. 08829660.3, dated Aug. 2, 2013, 7 pages.
Office Action received for European Patent Application No. 08829660.3, dated Jan. 3, 2020, 6 pages.
Office Action received for European Patent Application No. 08829660.3, dated Jan. 11, 2019, 7 pages.
Office Action received for European Patent Application No. 08829660.3, dated Jul. 5, 2016, 5 pages.
Office Action received for European Patent Application No. 08829660.3, dated Oct. 15, 2010, 8 pages.
Office Action received for European Patent Application No. 09170697.8 dated Dec. 13, 2011, 4 pages.
Office Action received for European Patent Application No. 09170697.8, dated Mar. 3, 2017, 8 pages.
Office Action received for European Patent Application No. 09700333.9, dated Jun. 10, 2011, 5 pages.
Office Action received for European Patent Application No. 09700333.9, dated Nov. 26, 2010, 5 pages.
Office Action received for European Patent Application No. 10762813.3, dated Mar. 21, 2016, 6 pages.
Office Action received for European Patent Application No. 12189764.9, dated Jan. 21, 2019, 7 pages.
Office Action received for European Patent Application No. 12189764.9, dated Mar. 1, 2016, 6 pages.
Office Action received for European Patent Application No. 12194312.0, dated Jan. 13, 2014, 4 pages.
Office Action received for European Patent Application No. 12194312.0, dated Oct. 8, 2013, 5 pages.
Office Action received for European Patent Application No. 12194315.3, dated Jan. 13, 2014, 4 pages.
Office Action received for European Patent Application No. 12194315.3, dated Oct. 8, 2013, 5 pages.
Office Action received for European Patent Application No. 14734674.6, dated Aug. 30, 2019, 6 pages.
Office Action received for European Patent Application No. 14734674.6, dated Oct. 5, 2017, 6 pages.
Office Action received for European Patent Application No. 17210062.0, dated Jan. 3, 2019, 6 pages.
Office Action received for Japanese Patent Application No. 2017-223021, dated Apr. 8, 2019, 7 pages (3 pages of English Translation and 4 pages of Official Copy).
Office Action received for Japanese Patent Application No. 2013-011209, dated Feb. 7, 2014, 3 pages (Official copy only) (See Communication under 37 CFR § 1.98(a) (3)).
Office Action received for Japanese Patent Application No. 2013-011209, dated Nov. 2, 2015, 9 pages (2 pages of English Translation and 7 pages of Official Copy).
Office Action received for Japanese Patent Application No. 2013-011209, dated Oct. 27, 2014, 3 pages (Official Copy only) (See Communication under 37 CFR § 1.98(a) (3)).
Office Action received for Japanese Patent Application No. 2013-127963, dated Aug. 15, 2014, 8 pages (6 pages of English Translation and 2 pages of Official Copy).
Office Action received for Japanese Patent Application No. 2013-127963, dated Mar. 10, 2014, 7 pages (4 pages of English Translation and 3 pages of Official copy).
Office Action received for Japanese Patent Application No. 2013-252338, dated Dec. 4, 2015, 4 pages (2 pages of English Translation and 2 pages of official copy).
Office Action received for Japanese Patent Application No. 2013-252338, dated Jan. 27, 2017, 10 pages (5 pages of English Translation and 5 pages of Official Copy).
Office Action received for Japanese Patent Application No. 2013-252338, dated Jan. 30, 2015, 4 pages (Official Copy only) (See Communication under 37 CFR § 1.98(a) (3)).
Office Action received for Japanese Patent Application No. 2013-252338, dated Jun. 24, 2016, 4 pages (2 pages of English Translation and 2 pages of Official copy).
Office Action received for Japanese Patent Application No. 2013-503721, dated Feb. 14, 2014, 8 pages (5 pages of English Translation and 3 pages of Official Copy).
Office Action received for Japanese Patent Application No. 2013-503721, dated Jun. 6, 2014, 3 pages (Official Copy only) (See Communication under 37 CFR § 1.98(a) (3)).
Office Action received for Japanese Patent Application No. 2014-139095, dated Aug. 17, 2015, 6 pages (3 pages of English Translation and 3 pages of Official Copy).
Office Action received for Japanese Patent Application No. 2014-253365, dated Aug. 31, 2018, 6 pages (3 pages of English Translation and 3 pages of Official Copy).
Office Action received for Japanese Patent Application No. 2014-253365, dated Dec. 14, 2015, 6 pages (3 pages of English Translation and 3 pages Official Copy).
Office Action received for Japanese Patent Application No. 2014-253365, dated Jul. 18, 2017, 9 pages (4 page of English Translation and 5 pages of Official Copy).
Office Action received for Japanese Patent Application No. 2014-253365, dated Oct. 17, 2016, 11 pages (5 pages of English Translation and 6 pages of Official Copy).
Office Action received for Japanese Patent Application No. 2015-532193, dated Mar. 22, 2016, 7 pages (3 pages of English Translation and 4 pages of Official Copy).
Office Action received for Japanese Patent Application No. 2016-042767, dated Mar. 3, 2017, 10 pages (6 pages of English Translation and 4 pages of Official Copy).
Office Action received for Japanese Patent Application No. 2016-091460, dated Jun. 1, 2018, 3 pages (1 page of English Translation and 2 pages of Official Copy).
Office Action received for Japanese Patent Application No. 2016-091460, dated Jun. 26, 2017, 6 pages (3 pages of English Translation and 3 pages of Official Copy).
Office Action received for Japanese Patent Application No. 2016-091460, dated Nov. 4, 2016, 6 pages (3 pages of English Translation and 3 pages of Official Copy).
Office Action received for Japanese Patent Application No. 2016-091460, dated Nov. 27, 2017, 7 pages (4 pages of English Translation and 3 pages of Official Copy).
Office Action received for Japanese Patent Application No. 2016-527367, dated Feb. 26, 2018, 15 pages (8 pages of English Translation and 7 pages of Official Copy).
Office Action received for Japanese Patent Application No. 2016-527367, dated Jul. 7, 2017, 16 pages (8 pages of English Translation and 8 pages of Official Copy).
Office Action received for Japanese Patent Application No. 2017-142812, dated Nov. 2, 2018, 6 pages (3 pages of English Translation and 3 pages of Official Copy).
Office Action received for Japanese Patent Application No. 2017-204561, dated Aug. 6, 2018, 7 pages (4 pages of English Translation and 3 pages of Official copy).
Office Action received for Japanese Patent Application No. 2017-204561, dated Nov. 6, 2018, 8 pages (4 pages of English Translation and 4 pages of Official copy).
Office Action received for Japanese Patent Application No. 2017-223021, dated Jul. 30, 2018, 12 pages (6 pages of English Translation and 6 pages of Official copy).
Office Action received for Japanese Patent Application No. 2017-223021, dated Sep. 24, 2019, 6 pages (3 pages of English Translation and 3 pages of Official Copy).
Office Action received for Japanese Patent Application No. 2018-121118, dated May 14, 2019, 10 pages (5 pages of English Translation and 5 pages of Official Copy).
Office Action received for Japanese Patent Application No. 2018-121118, dated Nov. 18, 2019, 10 pages (5 pages of English Translation and 5 pages of Official Copy).
Office Action received for Japanese Patent Application No. 2018-201088, dated Oct. 11, 2019, 9 pages (5 pages of English Translation and 4 pages of Official Copy).

(56) References Cited

OTHER PUBLICATIONS

Office Action received for Korean Patent Application No. 10-2011-7026583, dated Aug. 14, 2014, 6 pages (2 pages of English Translation and 4 pages of Official Copy).
Office Action received for Korean Patent Application No. 10-2011-7026583, dated Oct. 25, 2013, 4 pages (1 page of English Translation and 3 pages of Official Copy).
Office Action received for Korean Patent Application No. 10-2012-7029270, dated Dec. 4, 2013, 4 pages (Official Copy only) (See Communication under 37 CFR § 1.98(a) (3)).
Office Action received for Korean Patent Application No. 10-2014-7011273, dated Aug. 14, 2014, 5 pages (2 pages of English Translation and 3 pages of Official Copy).
Office Action received for Korean Patent Application No. 10-2014-7036624, dated Jan. 29, 2016, 10 pages (5 pages of office action and 5 pages of English Translation).
Office Action received for Korean Patent Application No. 10-2016-7014051, dated Apr. 30, 2018, 14 pages (7 pages of English Translation and 7 pages of Official Copy).
Office Action received for Korean Patent Application No. 10-2016-7014051, dated Jun. 20, 2017, 16 pages (8 pages of English Translation and 8 pages of Official Copy).
Office Action received for Korean Patent Application No. 10-2019-7005262, dated May 3, 2019, 5 pages (2 pages of English Translation and 3 pages of Official Copy).
Office Action received from European Patent Application No. 06846840.4, dated Oct. 13, 2008, 3 pages.
Park, Will, "Apple iPhone v1.1.1 SpringBoard Hacked to Display Multiple Pages", available at <http://www.intomobile.com/2007/10/09/apple-iphone-v111-springboard-hacked-to-display-multiple-pages/>, Oct. 9, 2007, 5 pages.
PCFan, "Boot Camp Introduction/Data Transition/Operability/Ability Truth Derived from Gap Mac&Win Dual Boot Hard Verification", Daily Communications, vol. 13, No. 14, Jun. 15, 2006, 4 pages (Official copy only) (See Communication under 37 CFR § 1.98(a) (3)).
Record of Oral Hearing received for U.S. Appl. No. 14/142,640, mailed on Nov. 20, 2019, 15 pages.
Ren, X., et al., "The Adaptive Hybrid Cursor: A Pressure-Based Target Selection Technique for Pen-Based User interfaces", INTERACT'07, Proceedings of the 11th IFIP TC 13 International Conference on Human-Computer Interaction, Sep. 10, 2007, 14 pages.
Shima, Korekazu, et al., "Android Application-Development", From basics of development to mashup/hardwareinteraction, a road to "takumi" of Android application-development, Section I, difference from prior platforms, things which can be done with Android, Mar. 18, 2009, pp. 58-65 (Official copy only) (See Communication under 37 CFR § 1.98(a) (3)).
Shiota, Shinji, "Special Developer's Story, DOS / V magazine", vol. 13, No. 10, Jun. 1, 2004, 12 pages (Official copy only) (See Communication under 37 CFR § 1.98(a) (3)).
"SilverScreen Theme Library", Online Available at: <https://web.archive.org/web/20061113121041/http://www.pocketsensei.com/ss_themes.htm>, Nov. 13, 2006, 3 pages.
"SilverScreen User Guide", Online Available at: <https://web.archive.org/web/20061113121032/http://www.pocketsensei.com/ss_guide.htm>, Nov. 13, 2006, 12 pages.
Stinson, Craig, "Windows 95 Official Manual", ASCII Ltd., Ver.1, Mar. 1, 1996, 6 pages (Official copy only) (See Communication under 37 CFR § 1.98(a) (3)).
Summons to Attend Oral proceedings received for European Application No. 09170697.8 mailed on Apr. 22, 2013, 6 pages.
Summons to Attend Oral proceedings received for European Application No. 09170697.8, mailed on Jul. 29, 2016, 9 pages.
Summons to Attend Oral Proceedings received for European Application No. 09170697.8, mailed on Oct. 19, 2017, 12 pages.
Summons to Attend Oral proceedings received for European Patent Application No. 06846840.4, mailed on May 18, 2009, 7 pages.
Summons to Attend Oral Proceedings received for European Patent Application No. 07814689.1, mailed on Dec. 1, 2011, 11 pages.
Summons to Attend Oral Proceedings received for European Patent Application No. 09700333.9, mailed on Sep. 21, 2012, 4 pages.
Summons to Attend Oral Proceedings received for European Patent Application No. 10762813.3, mailed on Nov. 9, 2016, 9 pages.
Summons to Attend Oral Proceedings received for European Patent Application No. 13795330.3, mailed on Oct. 19, 2018, 13 pages.
Summons to Attend Oral Proceedings received for European Patent Application No. 17210062.0, mailed on Oct. 30, 2019, 7 pages.
Summons to Oral Proceedings received for European Patent Application No. 12194312.0, mailed on Dec. 8, 2016, 9 pages.
Summons to Oral Proceedings received for European Patent Application No. 12194315.3, mailed on Dec. 8, 2016, 9 pages.
Supplemental Notice of Allowance received for U.S. Appl. No. 11/850,011, dated Feb. 24, 2011, 6 pages.
Takahashi, Masaaki, "Inside Macintosh", Mystery of File V, Mystery of Drag & Drop, NikkeiMAC, Nikkei Business Publications Inc., vol. 17, Aug. 15, 1994, 9 pages (Official Copy only) (See Communication under 37 CFR § 1.98(a) (3)).
"TH8000 Series Programmable Thermostats", Retrieved from the Internet: URL:https://ia802507.us.archive.org/1/items/generalmanual_000075065/generalmanual000075065.pdf, 2004, 44 pages.
TooEasyToForget, "iPhone—Demo of SummerBoard & Its Features", 5:05 minutes video, available at <http://www.youtube.com/watch?v=CJOb3ftQLac>, uploaded on Sep. 24, 2007, 2 pages.
Turetta, Jonathan, "Steve Jobs iPhone 2007 Presentation (HD)", Retrieved from the Internet: https://www.youtube.com/watch?v=vN4U5FqrOdQ&feature=youtu.be, May 13, 2013, 2 pages.
Windows XP, "Enable or disable AutoArrange desktop icons in Windows XP", Windows Tutorials, http://www.freemailtutorials.com/microsoftWindows/autoArrangeIconsOnTheDesktop.php, Nov. 19, 2009, 3 pages.
Wright, Ben, "Palm OS PDA Application Mini-Reviews", Online Available at <http://library.indstate.edu/newsletter/feb04/palmmini.htm>, Feb. 3, 2015, 11 pages.
Zhang et al., "An Ergonomics Study of Menu-Operation on Mobile Phone Interface", In Proceedings of the workshop on Intelligent Information Technology Application, 2007, pp. 247-251.
Notice of Allowance received for U.S. Appl. No. 16/270,801, dated Sep. 16, 2020, 9 pages.
Notice of Allowance received for U.S. Appl. No. 16/270,902, dated Sep. 22, 2020, 9 pages.
Office Action received for Australian Patent Application No. 2019204835, dated Sep. 16, 2020, 6 pages.
Notice of Acceptance received for Australian Patent Application No. 2017277813, dated Jun. 16, 2020, 3 pages.
Notice of Allowance received for U.S. Appl. No. 14/142,648, dated Jul. 15, 2020, 6 pages.
Office Action received for Australian Patent Application No. 2019210673, dated Sep. 28, 2020, 2 pages.
Office Action received for Japanese Patent Application No. 2017-223021, dated Sep. 11, 2020, 20 pages (10 pages of English Translation and 10 pages of Official Copy).
Office Action received for Japanese Patent Application No. 2019-144763, dated Oct. 2, 2020, 6 pages (3 pages of English Translation and 3 pages of Official Copy).
Office Action received for Korean Patent Application No. 10-2020-7018655, dated Oct. 13, 2020, 5 pages (2 pages of English Translation and 3 pages of Official Copy).
Decision to Grant received for European Patent Application No. 17210062.0, dated Oct. 1, 2020, 2 pages.
Non-Final Office Action received for U.S. Appl. No. 15/421,865, dated Oct. 7, 2020, 20 pages.
Notice of Acceptance received for Australian Patent Application No. 2019219816, dated Sep. 23, 2020, 3 pages.
Notice of Allowance received for Japanese Patent Application No. 2018-201088, dated Sep. 18, 2020, 4 pages (1 page of English Translation and 3 pages of Official Copy).
Record of Oral Hearing received for U.S. Appl. No. 14/261,112, mailed on Sep. 28, 2020, 20 pages.
Applicant Initiated Interview Summary received for U.S. Appl. No. 15/411,110, dated Nov. 17, 2020, 7 pages.
Notice of Allowance received for Canadian Patent Application No. 2,983,178, dated Oct. 20, 2020, 1 page.

(56) References Cited

OTHER PUBLICATIONS

Notice of Allowance received for U.S. Appl. No. 14/261,112, dated Nov. 18, 2020, 6 pages.
Result of Consultation received for European Patent Application No. 08829660.3, dated Nov. 18, 2020, 5 pages.
Applicant-Initiated Interview Summary received for U.S. Appl. No. 15/421,865, dated Feb. 3, 2020, 5 pages.
Corrected Notice of Allowance received for U.S. Appl. No. 14/142,640, dated Feb. 5, 2020, 4 pages.
Decision to Grant received for European Patent Application No. 13795330.3, dated Jan. 16, 2020, 2 pages.
Pre-interview First Office Action received for U.S. Appl. No. 16/270,801, dated Feb. 10, 2020, 5 pages.
Pre-interview First Office Action received for U.S. Appl. No. 16/270,902, dated Feb. 10, 2020, 5 pages.
Decision on Appeal received for U.S. Appl. No. 14/261,112, mailed on Oct. 29, 2020, 20 pages.
Notice of Acceptance received for Australian Patent Application No. 2019210673, dated Oct. 17, 2020, 3 pages.
Office Action received for Japanese Patent Application No. 2019-024663, dated Oct. 5, 2020, 7 pages (4 pages of English Translation and 3 pages of Official Copy).
Advisory Action received for U.S. Appl. No. 15/411,110, dated Jun. 29, 2021, 4 pages.
Applicant-Initiated Interview Summary received for U.S. Appl. No. 15/421,865, dated Jun. 30, 2021, 6 pages.
Non-Final Office Action received for U.S. Appl. No. 17/002,622, dated Jul. 6, 2021, 14 pages.
Notice of Allowance received for U.S. Appl. No. 16/926,530, dated Jun. 24, 2021, 10 pages.
Office Action received for Australian Patent Application No. 2020239774, dated Jun. 28, 2021, 8 pages.
Examiner's Pre-Review Report received for Japanese Patent Application No. 2019-024663, dated Aug. 31, 2021, 4 pages (2 pages of English Translation and 2 pages of Official Copy).
Intention to Grant received for European Patent Application No. 12189764.9, dated Sep. 28, 2021, 14 pages.
Non-Final Office Action received for U.S. Appl. No. 17/190,869, dated Sep. 27, 2021, 26 pages.
Notice of Allowance received for Japanese Patent Application No. 2018-121118, dated Sep. 27, 2021, 3 pages (1 page of English Translation and 2 pages of Official Copy).
Office Action received for Japanese Patent Application No. 2020-123882, dated Sep. 3, 2021, 8 pages (4 pages of English Translation and 4 pages of Official Copy).
Notice of Allowance received for Chinese Patent Application No. 201780033973.7, dated Jul. 7, 2021, 5 pages (1 page of English Translation and 4 pages of Official Copy).
Office Action received for European Patent Application No. 09170697.8, dated Jul. 6, 2021, 3 pages.
Office Action received for European Patent Application No. 17810723.1, dated Jul. 9, 2021, 8 pages.
Applicant-Initiated Interview Summary received for U.S. Appl. No. 16/832,285, dated Nov. 19, 2021, 19 pages.
Applicant-Initiated Interview Summary received for U.S. Appl. No. 16/994,392, dated Dec. 3, 2021, 2 pages.
Decision to Grant received for European Patent Application No. 12189764.9, dated Nov. 25, 2021, 2 pages.
Notice of Allowance received for U.S. Appl. No. 17/002,622, dated Nov. 22, 2021, 7 pages.
Notice of Allowance received for U.S. Appl. No. 17/019,062, dated Nov. 24, 2021, 0 pages.
Summons to Attend Oral Proceedings received for European Patent Application No. 14734674.6, mailed on Nov. 23, 2021, 7 pages.
Notice of Allowance received for U.S. Appl. No. 17/019,062, dated Aug. 10, 2021, 22 pages.
Office Action received for Australian Patent Application No. 2020239774, dated Oct. 5, 2021, 3 pages.
Office Action received for European Patent Application No. 17813879.8, dated Oct. 20, 2021, 7 pages.

Non-Final Office Action received for U.S. Appl. No. 16/832,285, dated Jul. 26, 2021, 62 pages.
Office Action received for Japanese Patent Application No. 2019-144763, dated Jul. 2, 2021, 6 pages (3 pages of English Translation and 3 pages of Official Copy).
Applicant-Initiated Interview Summary received for U.S. Appl. No. 17/190,869, dated Dec. 10, 2021, 2 pages.
Corrected Notice of Allowance received for U.S. Appl. No. 17/002,622, dated Dec. 13, 2021, 2 pages.
Corrected Notice of Allowance received for U.S. Appl. No. 17/019,062, dated Dec. 8, 2021, 2 pages.
Intention to Grant received for European Patent Application No. 08829660.3, dated Dec. 17, 2021, 8 pages.
Intention to Grant received for European Patent Application No. 09170697.8, dated Dec. 16, 2021, 8 pages.
Notice of Allowance received for Japanese Patent Application No. 2019-144763, dated Nov. 29, 2021, 4 pages (1 page of English Translation and 3 pages of Official Copy).
Non-Final Office Action received for U.S. Appl. No. 15/421,865, dated Dec. 29, 2021, 23 pages.
Notice of Allowance received for U.S. Appl. No. 17/190,869, dated Jan. 10, 2022, 10 pages.
Office Action received for Chinese Patent Application No. 201780033621.1, dated Dec. 14, 2021, 8 pages (4 pages of English Translation and 4 pages of Official Copy).
Office Action received for Australian Patent Application No. 2021201687, dated Mar. 16, 2022, 5 pages.
Applicant-Initiated Interview Summary received for U.S. Appl. No. 15/421,865, dated Feb. 28, 2022, 5 pages.
Corrected Notice of Allowance received for U.S. Appl. No. 17/002,622, dated Feb. 16, 2022, 2 pages.
Corrected Notice of Allowance received for U.S. Appl. No. 17/002,622, dated Jan. 25, 2022, 2 pages.
Examiner's Answer to Appeal Brief received for U.S. Appl. No. 15/411,110, dated Feb. 1, 2022, 9 pages.
Final Office Action received for U.S. Appl. No. 16/832,285, dated Jan. 19, 2022, 66 pages.
Final Office Action received for U.S. Appl. No. 16/994,392, dated Jan. 18, 2022, 12 pages.
Non-Final Office Action received for U.S. Appl. No. 17/130,674, dated Mar. 3, 2022, 8 pages.
Notice of Acceptance received for Australian Patent Application No. 2020239774, dated Jan. 5, 2022, 3 pages.
Office Action received for Canadian Patent Application No. 3,109,701, dated Feb. 7, 2022, 4 pages.
Office Action received for European Patent Application No. 19176224.4, dated Jan. 18, 2022, 6 pages.
Office Action received for Japanese Patent Application No. 2019-24663, dated Feb. 10, 2022, 4 pages (2 pages of English Translation and 2 pages of Official Copy).
Office Action received for Japanese Patent Application No. 2020-046707, dated Jan. 7, 2022, 10 pages (5 pages of English Translation and 5 pages of Official Copy).
Applicant-Initiated Interview Summary received for U.S. Appl. No. 16/994,392, dated Mar. 10, 2022, 2 pages.
Notice of Allowance received for Chinese Patent Application No. 201780033621.1, dated Mar. 10, 2022, 2 pages (1 page of English Translation and 1 page of Official Copy).
Notice of Allowance received for Korean Patent Application No. 10-2020-7018655, dated Feb. 25, 2022, 4 pages (1 page of English Translation and 3 pages of Official Copy).
Office Action received for European Patent Application No. 20203888.1, dated Mar. 10, 2022, 6 pages.
Minutes of the Oral Proceedings received for European Patent Application No. 14734674.6, mailed on Jun. 13, 2022, 9 pages.
Decision to Grant received for European Patent Application No. 08829660.3, dated May 6, 2022, 2 pages.
Decision to Grant received for European Patent Application No. 09170697.8, dated Apr. 29, 2022, 2 pages.
Notice of Allowance received for Japanese Patent Application No. 2020-046707, dated Aug. 15, 2022, 4 pages (1 page of English Translation and 3 pages of Official Copy).

(56) References Cited

OTHER PUBLICATIONS

Notice of Allowance received for Japanese Patent Application No. 2019-024663, dated Sep. 26, 2022, 23 pages (1 page of English Translation and 22 pages of Official Copy).
Corrected Notice of Allowance received for U.S. Appl. No. 16/994,392, dated Aug. 4, 2022, 2 pages.
Corrected Notice of Allowance received for U.S. Appl. No. 17/130,674, dated Jul. 29, 2022, 2 pages.
Corrected Notice of Allowance received for U.S. Appl. No. 17/521,768, dated Jul. 29, 2022, 2 pages.
Office Action received for Japanese Patent Application No. 2020-123882, dated Jul. 29, 2022, 8 pages (4 pages of English Translation and 4 pages of Official Copy).
Corrected Notice of Allowance received for U.S. Appl. No. 16/994,392, dated Jul. 19, 2022, 2 pages.
Non-Final Office Action received for U.S. Appl. No. 15/411,110, dated Jul. 14, 2022, 28 pages.
Non-Final Office Action received for U.S. Appl. No. 17/321,313, dated Jul. 19, 2022, 18 pages.
Notice of Allowance received for U.S. Appl. No. 17/521,768, dated Jul. 15, 2022, 10 pages.
Brief Communication Regarding Oral Proceedings received for European Patent Application No. 17810723.1, mailed on Nov. 11, 2022, 11 pages.
Minutes of the Oral Proceedings received for European Patent Application No. 17810723.1, mailed on Dec. 9, 2022, 7 pages.
Result of Consultation received for European Patent Application No. 17810723.1, mailed on Nov. 30, 2022, 3 pages.
Decision to Refuse received for European Patent Application No. 14734674.6, dated Jun. 29, 2022, 15 pages.
Final Office Action received for U.S. Appl. No. 15/421,865, dated Jul. 12, 2022, 27 pages.
Notice of Allowance received for U.S. Appl. No. 16/994,392, dated Jul. 11, 2022, 26 pages.
Summons to Attend Oral Proceedings received for European Patent Application No. 17810723.1, mailed on Jul. 5, 2022, 8 pages.
Summons to Attend Oral Proceedings received for German Patent Application No. 112006003600.9, mailed on Jun. 2, 2022, 33 pages (21 pages of English Translation and 12 pages of Official Copy).
Examiner's Answer to Appeal Brief received for U.S. Appl. No. 16/832,285, dated Sep. 7, 2022, 30 pages.
Notice of Allowance received for U.S. Appl. No. 17/349,226, dated Sep. 20, 2022, 7 pages.
Notice of Acceptance received for Australian Patent Application No. 2021201687, dated Jun. 8, 2022, 3 pages.
Notice of Allowance received for U.S. Appl. No. 17/130,674, dated Jun. 15, 2022, 9 pages.
Result of Consultation received for European Patent Application No. 14734674.6, mailed on May 27, 2022, 3 pages.
Intention to Grant received for European Patent Application No. 17810723.1, dated Dec. 16, 2022, 9 pages.
Applicant-Initiated Interview Summary received for U.S. Appl. No. 15/411,110, dated Oct. 31, 2022, 6 pages.
Notice of Allowance received for U.S. Appl. No. 17/321,313, dated Oct. 24, 2022, 9 pages.
Office Action received for Chinese Patent Application No. 201780034059.4, dated Oct. 9, 2022, 11 pages (5 pages of English Translation and 6 pages of Official Copy).

* cited by examiner

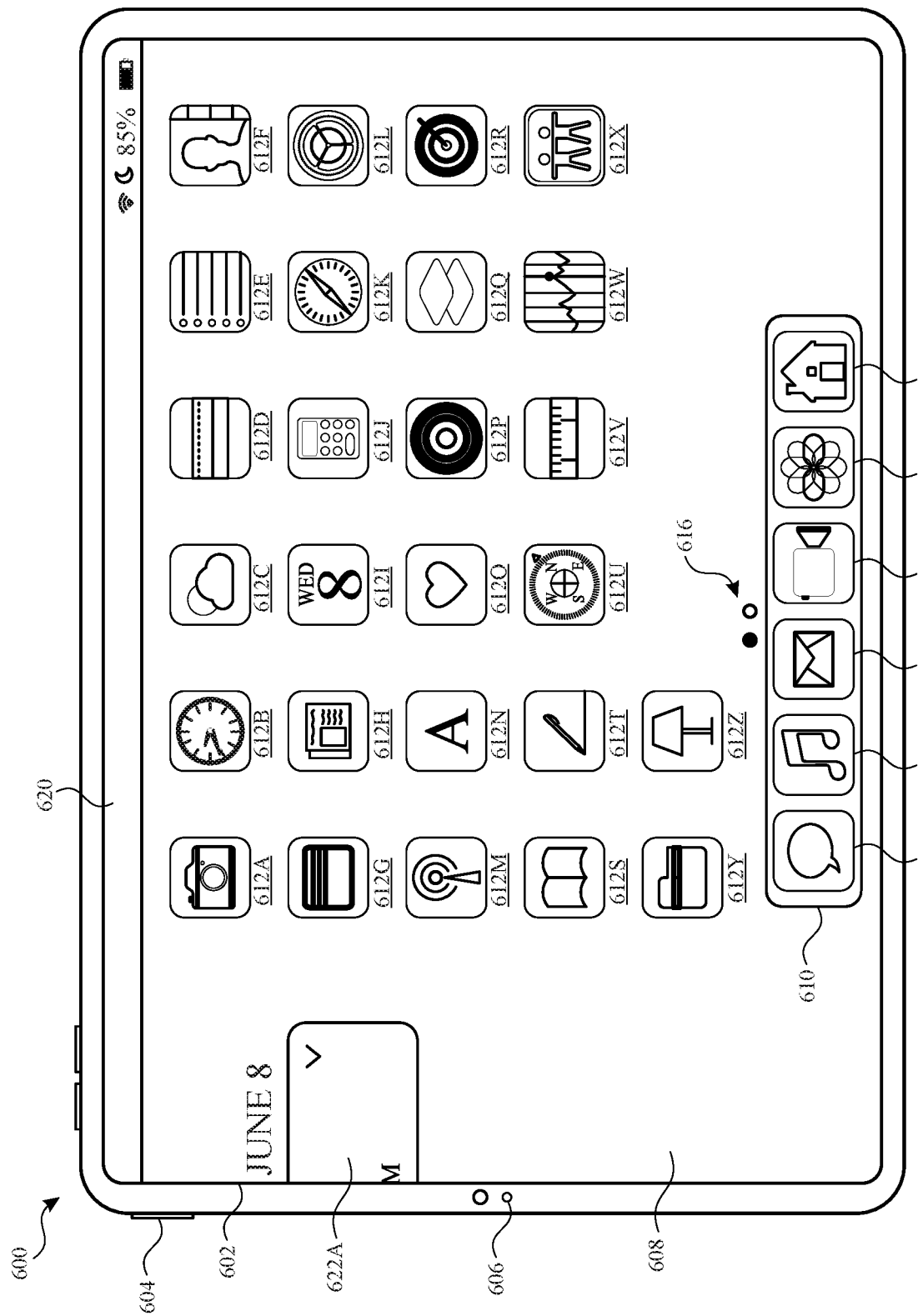

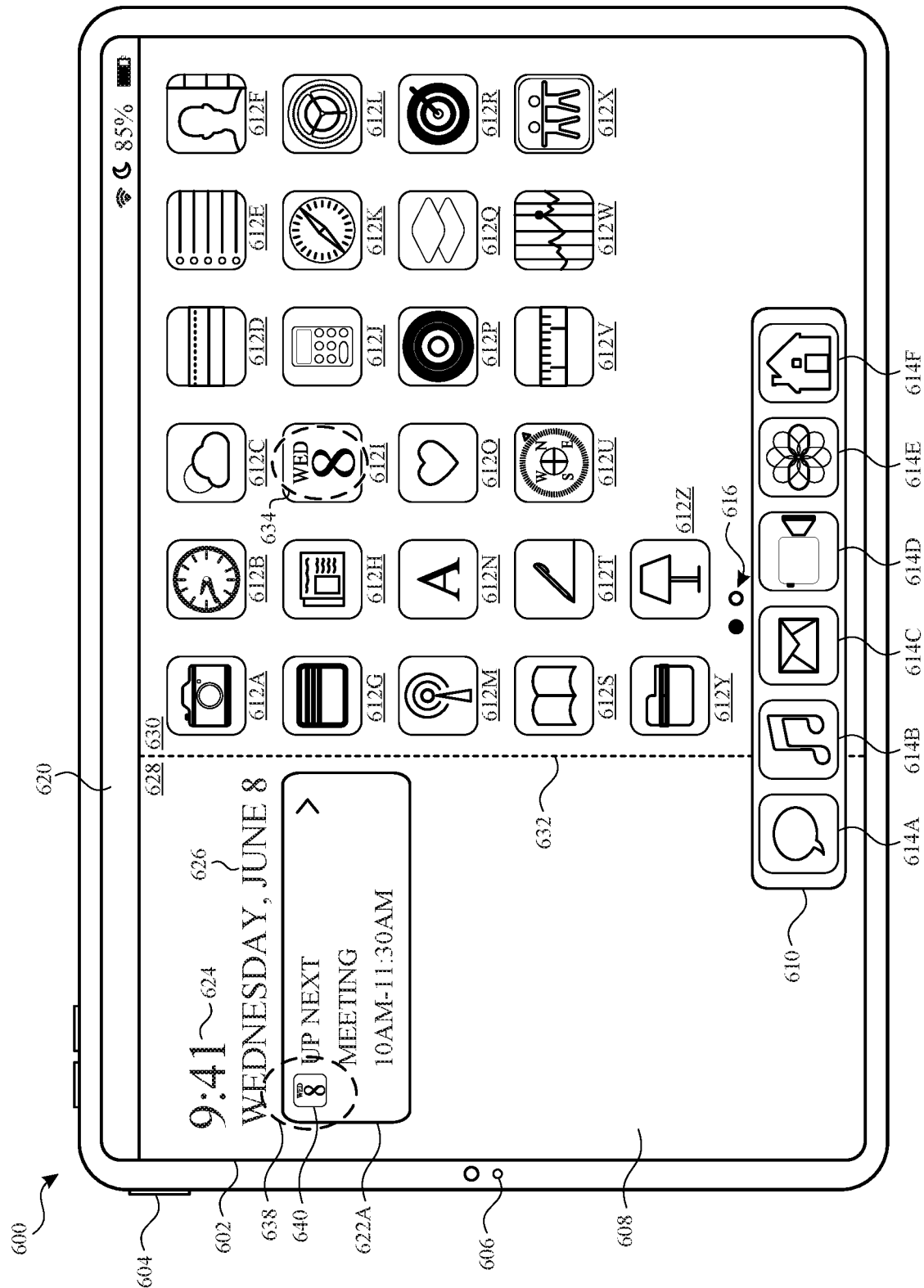

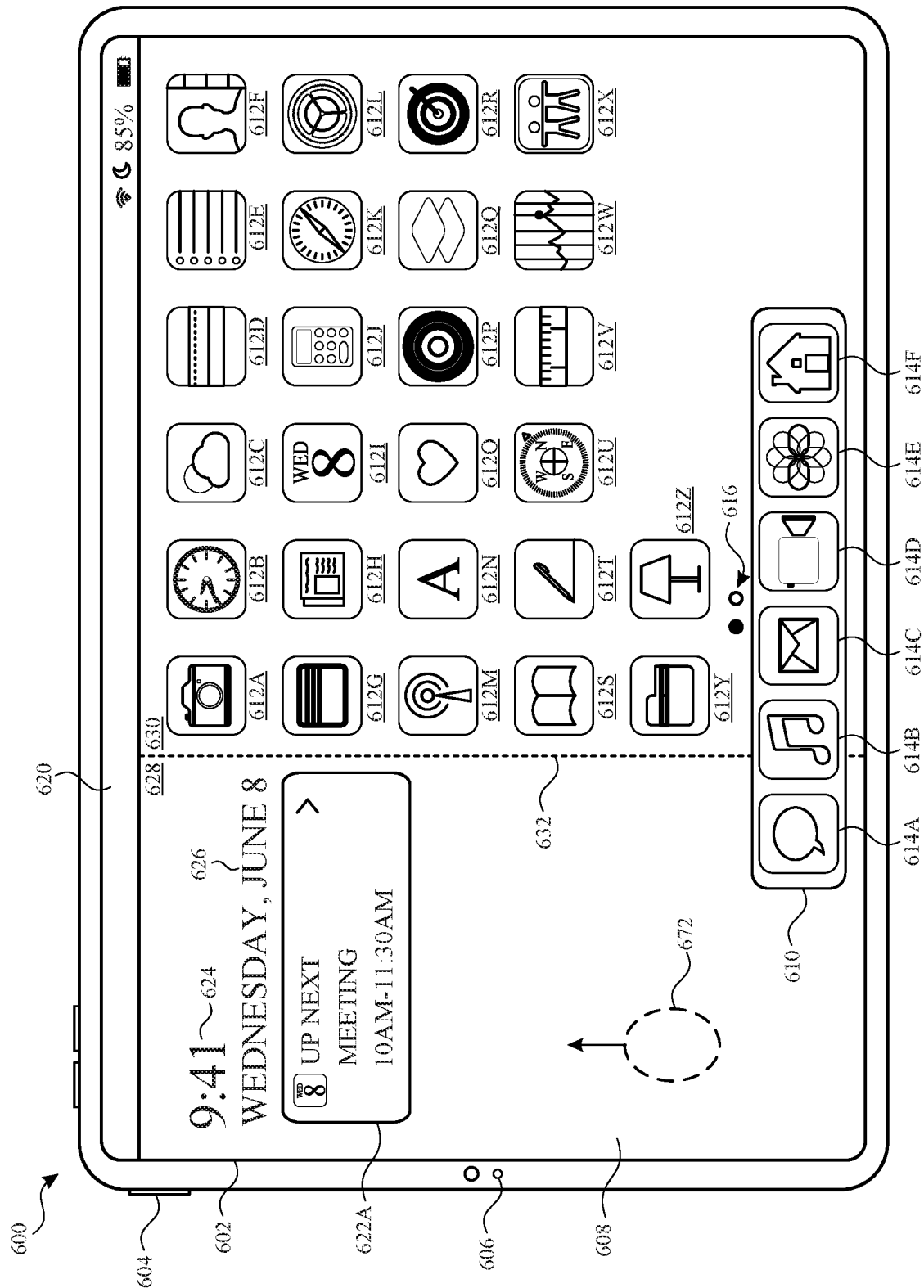

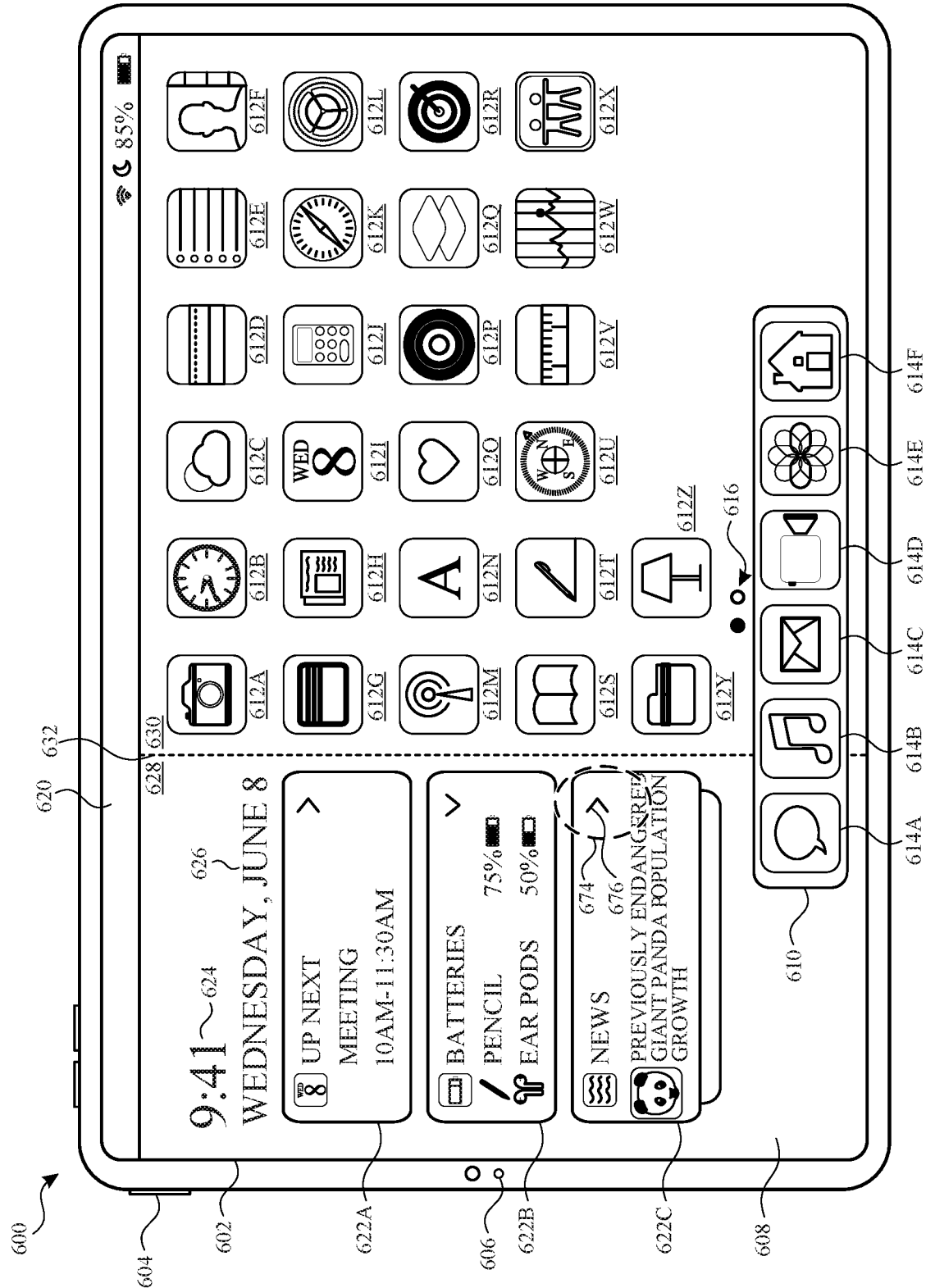

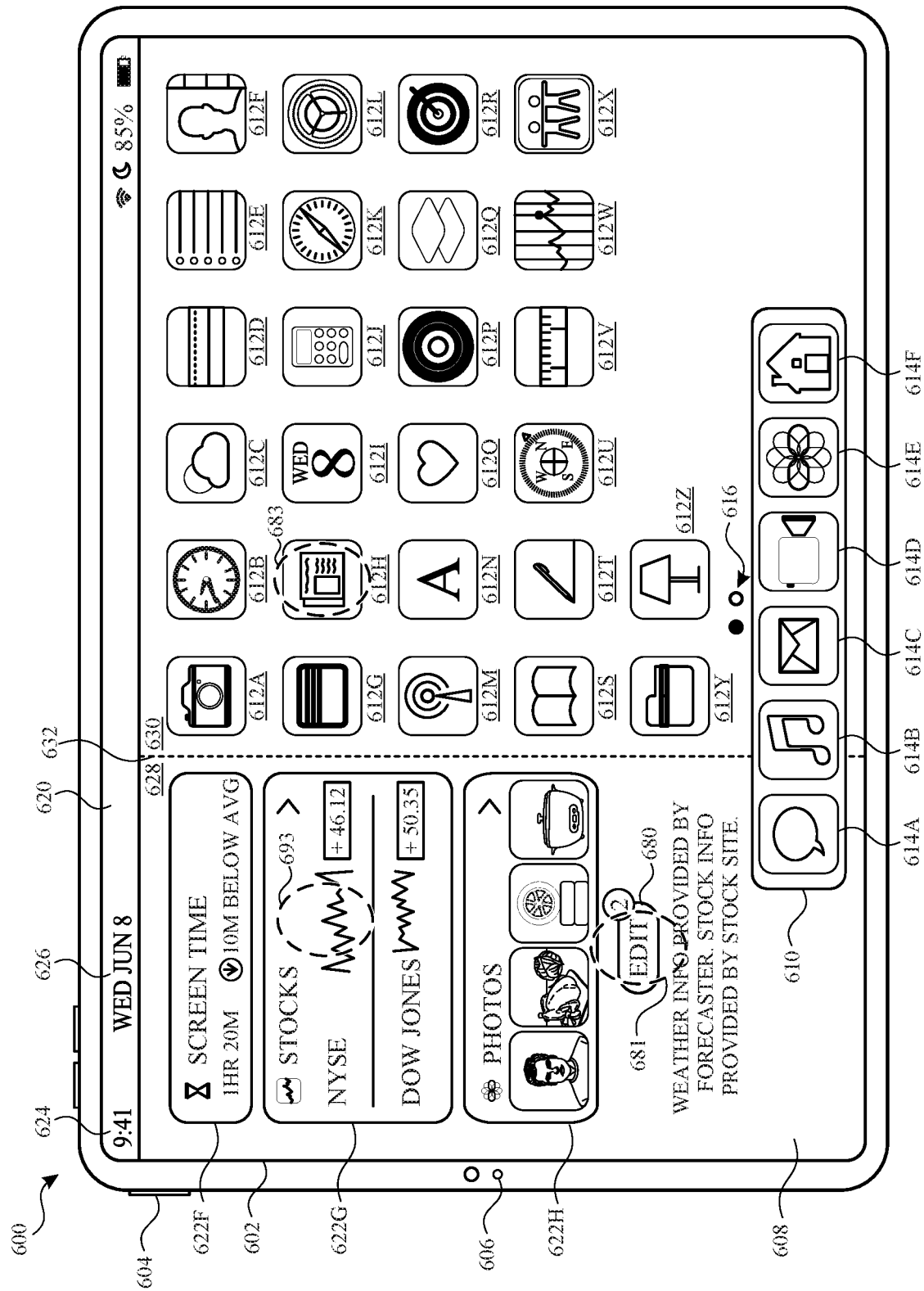

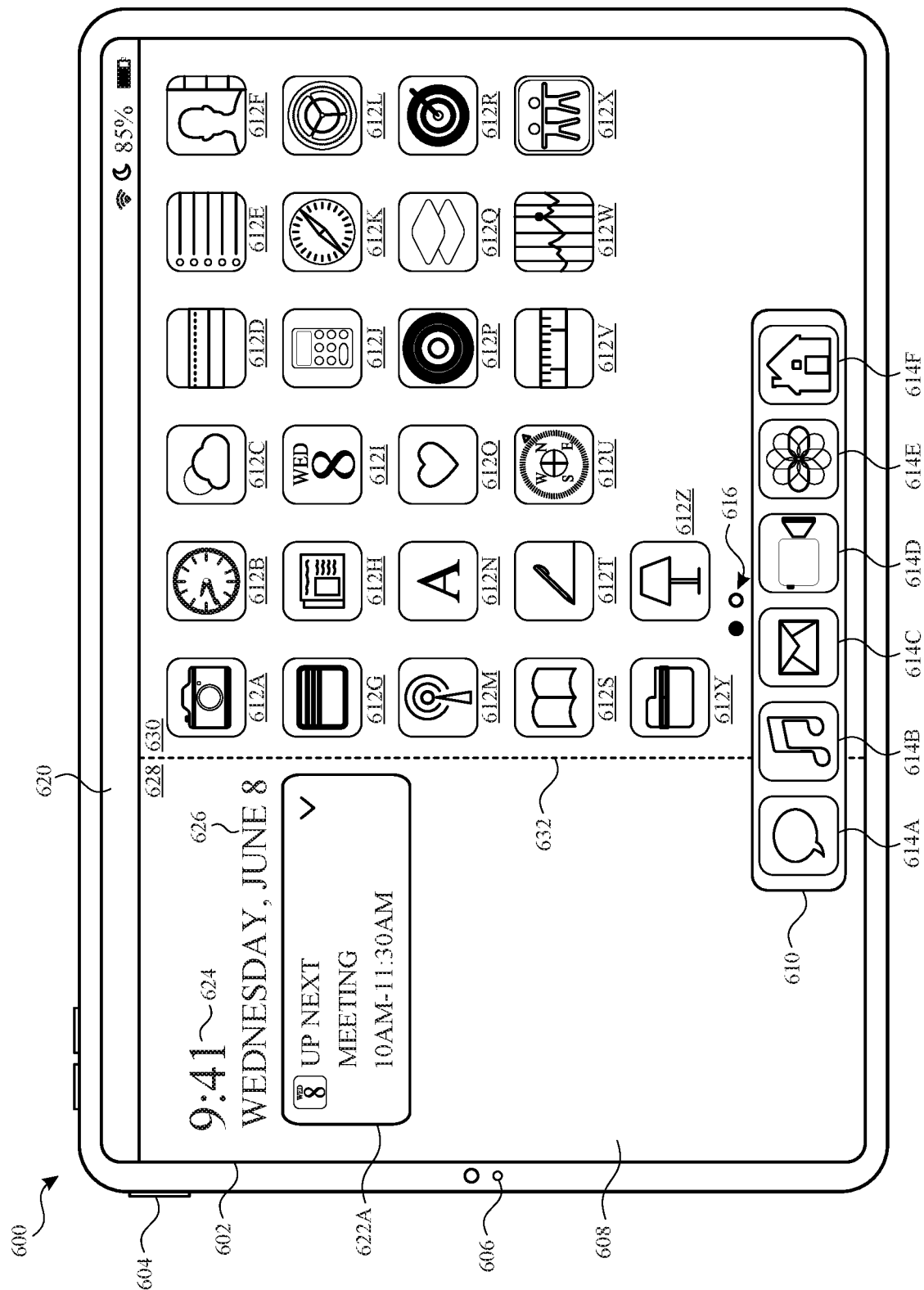

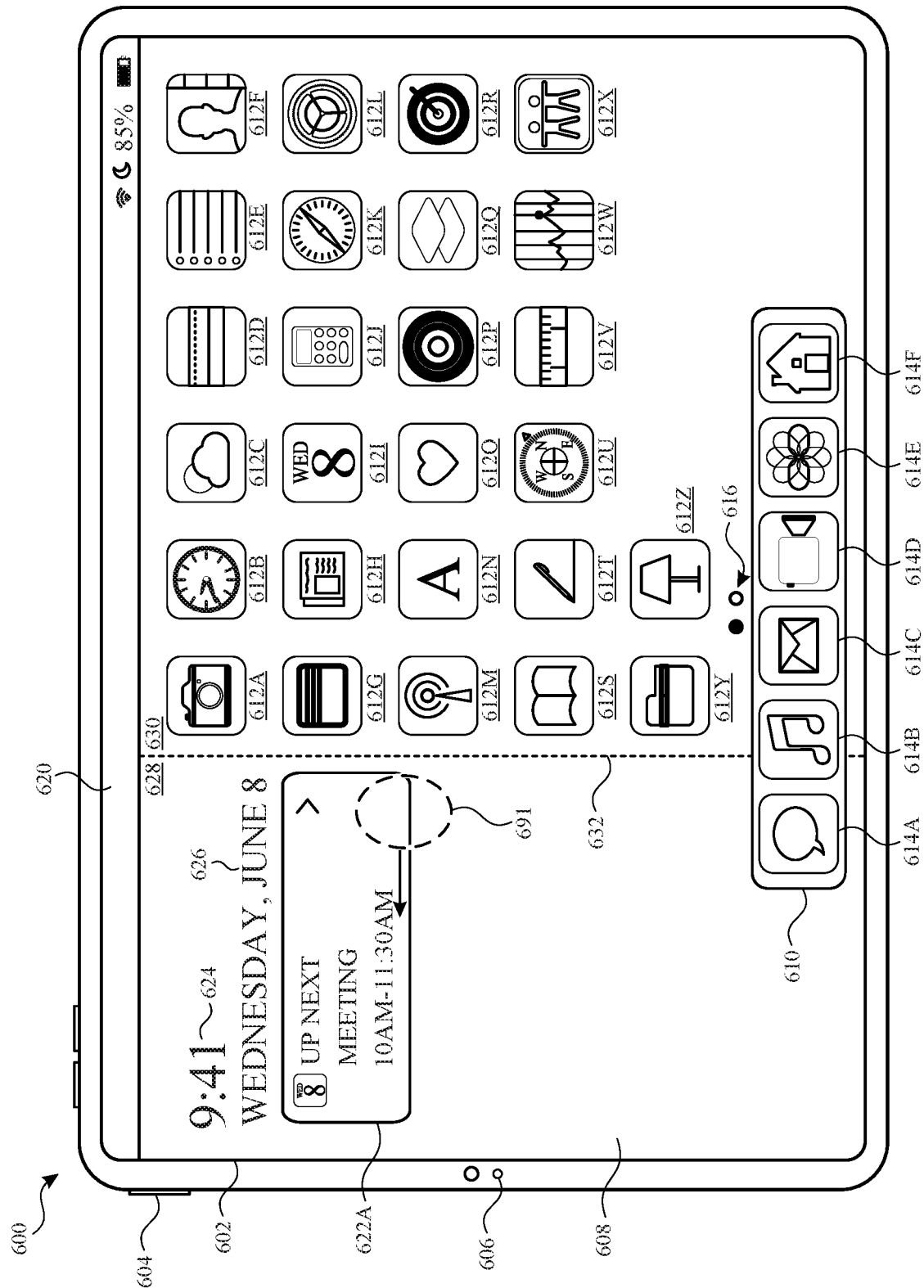

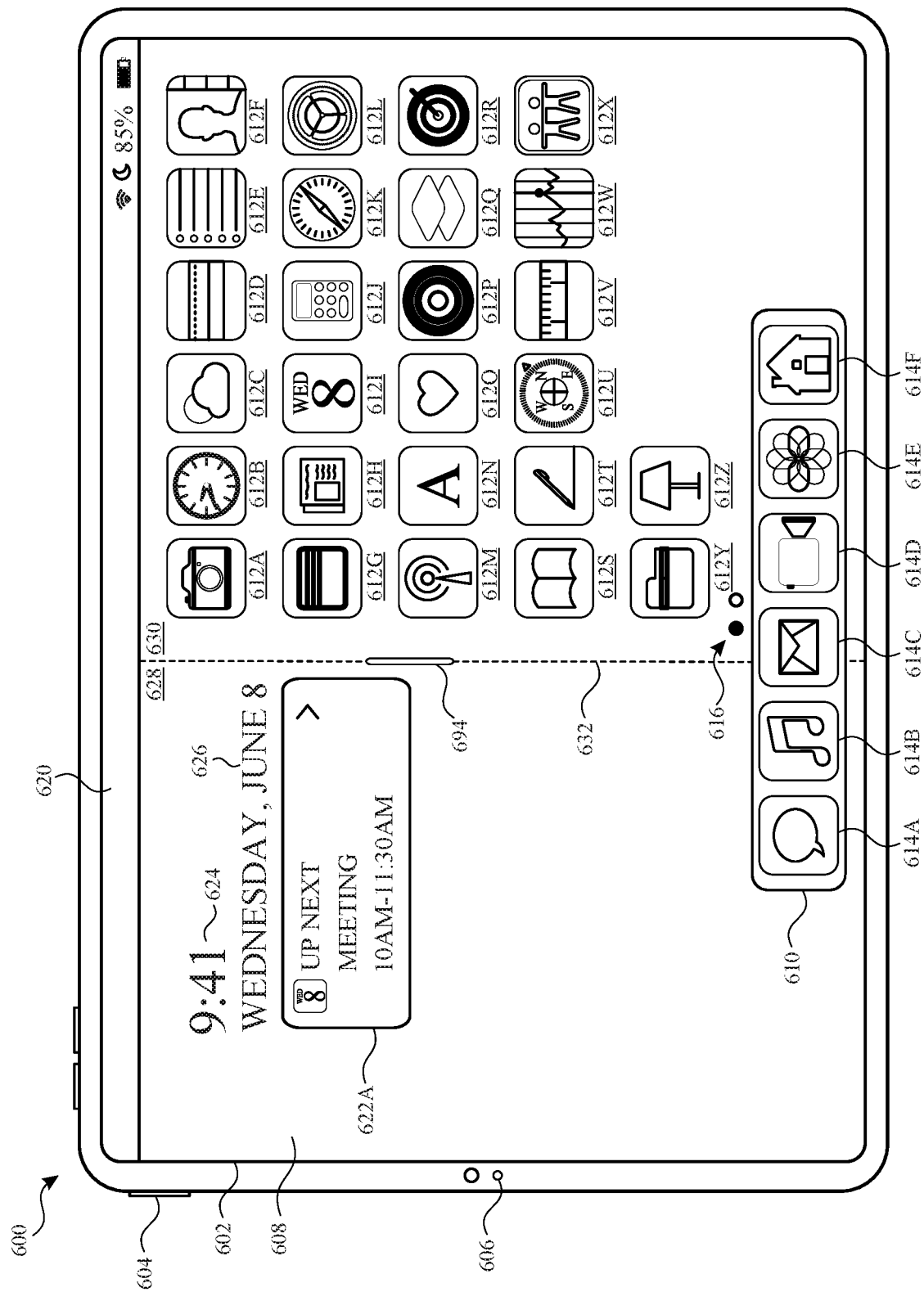

700

718
Concurrently display, via the display device, the modified first plurality of application icons and the first set of one or more user interface elements.

720
Detect a fourth user input in a predefined region corresponding to the first set of one or more user interface elements, wherein the first set of one or more user interface elements includes a single user interface element.

722
In response to detecting the fourth user input:

724
In accordance with a determination that the fourth user input includes movement in a fifth direction:

726
Maintain display of the single user interface element.

728
Display, via the display device, a second set of one or more user interface elements, wherein the single user interface element and the second set of one or more user interface elements are concurrently displayed.

730
Detect a change in orientation of the electronic device from a first orientation to a second orientation that is different from the first orientation.

732
In response to detecting the change in orientation of the electronic device from the first orientation to the second orientation:

734
Display the first plurality of application icons without displaying the first set of one or more user interface elements.

*FIG. 7B*

USER INTERFACES FOR WIDGETS

CROSS-REFERENCE TO RELATED APPLICATIONS

This application claims priority to U.S. Provisional Patent Application Ser. No. 62/843,507, titled "USER INTERFACES FOR WIDGETS," filed May 5, 2019, the content of which is hereby incorporated by reference in its entirety.

FIELD

The present disclosure relates generally to computer user interfaces, and more specifically to techniques for displaying widgets.

BACKGROUND

An electronic device can have applications installed on the device, where the applications enable access to certain functions and application data. Techniques are implemented on the electronic device for displaying application data.

BRIEF SUMMARY

Some techniques for displaying application data using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for displaying application data using widgets. Such methods and interfaces optionally complement or replace other methods for displaying application data. Such methods and interfaces reduce the cognitive burden on a user and produce a more efficient human-machine interface. For battery-operated computing devices, such methods and interfaces conserve power and increase the time between battery charges.

In some embodiments, a method is described. The method comprises: at an electronic device with a display device: displaying, via the display device, a first plurality of application icons without displaying a first set of one or more user interface elements, wherein the application icons are selectable to display application user interfaces for corresponding applications; while displaying, via the display device, the first plurality of application icons, detecting a first user input; and in response to detecting the first user input: in accordance with a determination that the first user input includes movement in a first direction: ceasing display of the first plurality of application icons; and displaying, via the display device, a second plurality of application icons that are different from the first plurality of application icons, wherein the application icons are selectable to display application user interfaces for corresponding applications; and in accordance with a determination that the first user input includes movement in a second direction that is different from the first direction: modifying display of the first plurality of application icons to change a distance between a first application icon of the first plurality of application icons and a second application icon of the first plurality of application icons; and concurrently displaying, via the display device, the modified first plurality of application icons and the first set of one or more user interface elements.

In some embodiments, a non-transitory computer-readable storage medium is described. The non-transitory computer-readable storage medium stores one or more programs configured to be executed by one or more processors of an electronic device with a display device, the one or more programs including instructions for: displaying, via the display device, a first plurality of application icons without displaying a first set of one or more user interface elements, wherein the application icons are selectable to display application user interfaces for corresponding applications; while displaying, via the display device, the first plurality of application icons, detecting a first user input; and in response to detecting the first user input: in accordance with a determination that the first user input includes movement in a first direction: ceasing display of the first plurality of application icons; and displaying, via the display device, a second plurality of application icons that are different from the first plurality of application icons, wherein the application icons are selectable to display application user interfaces for corresponding applications; and in accordance with a determination that the first user input includes movement in a second direction that is different from the first direction: modifying display of the first plurality of application icons to change a distance between a first application icon of the first plurality of application icons and a second application icon of the first plurality of application icons; and concurrently displaying, via the display device, the modified first plurality of application icons and the first set of one or more user interface elements.

In some embodiments, a transitory computer-readable storage medium is described. The transitory computer-readable storage medium stores one or more programs configured to be executed by one or more processors of an electronic device with a display device, the one or more programs including instructions for: displaying, via the display device, a first plurality of application icons without displaying a first set of one or more user interface elements, wherein the application icons are selectable to display application user interfaces for corresponding applications; while displaying, via the display device, the first plurality of application icons, detecting a first user input; and in response to detecting the first user input: in accordance with a determination that the first user input includes movement in a first direction: ceasing display of the first plurality of application icons; and displaying, via the display device, a second plurality of application icons that are different from the first plurality of application icons, wherein the application icons are selectable to display application user interfaces for corresponding applications; and in accordance with a determination that the first user input includes movement in a second direction that is different from the first direction: modifying display of the first plurality of application icons to change a distance between a first application icon of the first plurality of application icons and a second application icon of the first plurality of application icons; and concurrently displaying, via the display device, the modified first plurality of application icons and the first set of one or more user interface elements.

In some embodiments, an electronic device is described. The electronic device comprises: a display device; one or more processors; and memory storing one or more programs configured to be executed by the one or more processors, the one or more programs including instructions for: displaying, via the display device, a first plurality of application icons without displaying a first set of one or more user interface elements, wherein the application icons are selectable to display application user interfaces for corresponding applications; while displaying, via the display device, the first plurality of application icons, detecting a first user input; and in response to detecting the first user input: in accordance with a determination that the first user input includes movement in a first direction: ceasing display of the first plurality of application icons; and displaying, via the display device, a second plurality of application icons that are different from the first plurality of application icons, wherein the application icons are selectable to display application user interfaces for corresponding applications; and in accordance with a determination that the first user input includes movement in a second direction that is different from the first direction: modifying display of the first plurality of application icons to change a distance between a first application icon of the first plurality of application icons and a second application icon of the first plurality of application icons; and concurrently displaying, via the display device, the modified first plurality of application icons and the first set of one or more user interface elements.

In some embodiments, an electronic device is described. The electronic device comprises: a display device; means for displaying, via the display device, a first plurality of application icons without displaying a first set of one or more user interface elements, wherein the application icons are selectable to display application user interfaces for corresponding applications; means, while displaying, via the display device, the first plurality of application icons, for detecting a first user input; and means, in response to detecting the first user input: in accordance with a determination that the first user input includes movement in a first direction: for ceasing display of the first plurality of application icons; and for displaying, via the display device, a second plurality of application icons that are different from the first plurality of application icons, wherein the application icons are selectable to display application user interfaces for corresponding applications; and in accordance with a determination that the first user input includes movement in a second direction that is different from the first direction: for modifying display of the first plurality of application icons to change a distance between a first application icon of the first plurality of application icons and a second application icon of the first plurality of application icons; and for concurrently displaying, via the display device, the modified first plurality of application icons and the first set of one or more user interface elements.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for displaying widgets, thereby increasing the effectiveness, efficiency, and user satisfaction with such devices. Such methods and interfaces may complement or replace other methods for displaying widgets.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 7A-7B are a flow diagram illustrating a method for displaying widgets in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for displaying widgets. For example, a user may find it difficult to easily access certain application data. The user may use widgets to access the application data, but it may be difficult to navigate to the widgets. Additionally, the user may not be able to access other desired functions of the device while widgets are being displayed. Accordingly, techniques are needed for displaying widgets in readily accessible manner. Moreover, techniques are needed that allow the user to perform a variety of functions while having access to the application data provided by the widgets. Such techniques can reduce the cognitive burden on a user who accesses application data via widgets, thereby enhancing productivity. Further, such techniques can reduce processor and battery power otherwise wasted on redundant user inputs.

Figure 6A:
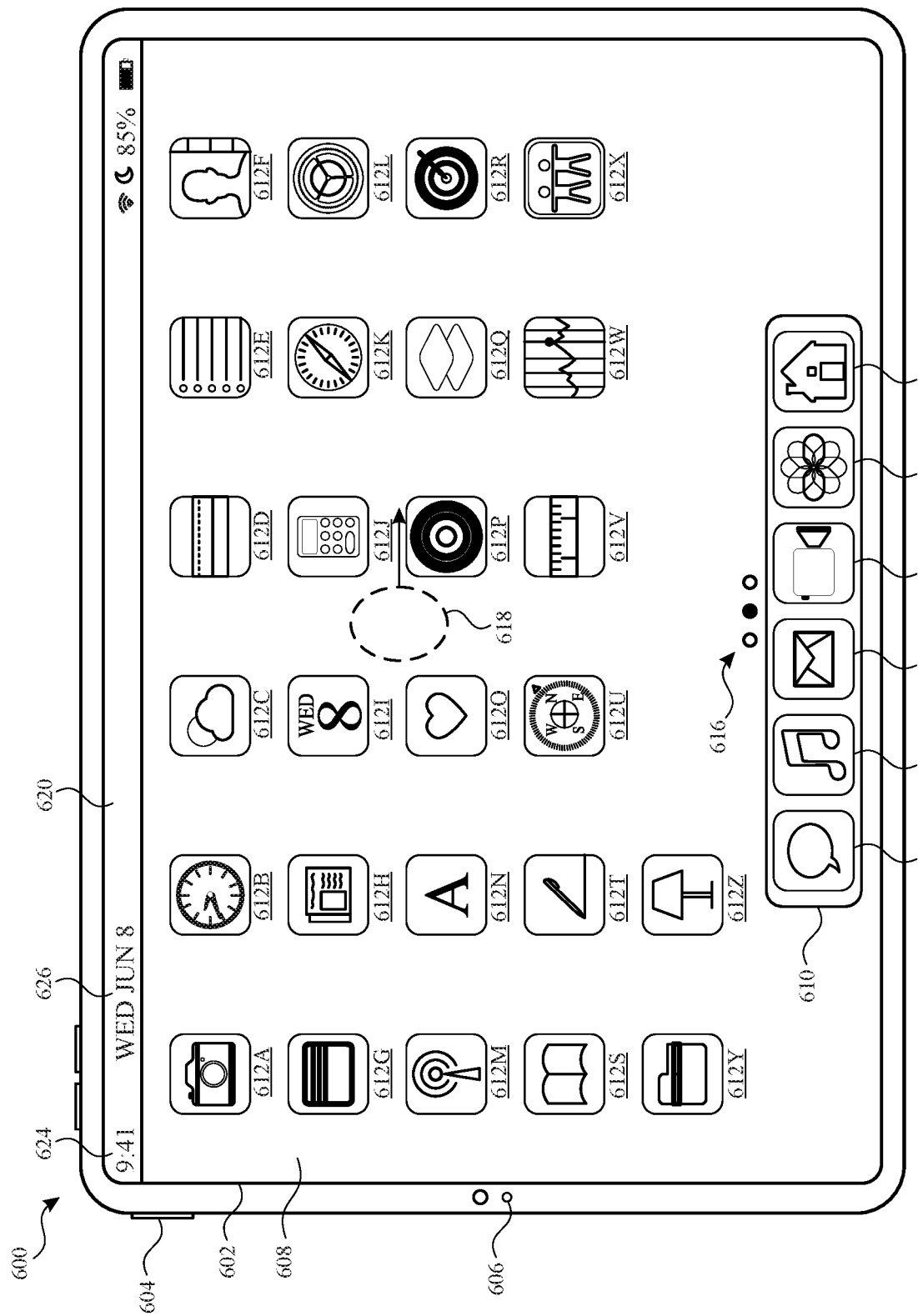
FIGS. 6A-6AC illustrate exemplary user interfaces for displaying widgets in accordance with some embodiments.
Figure 7A:
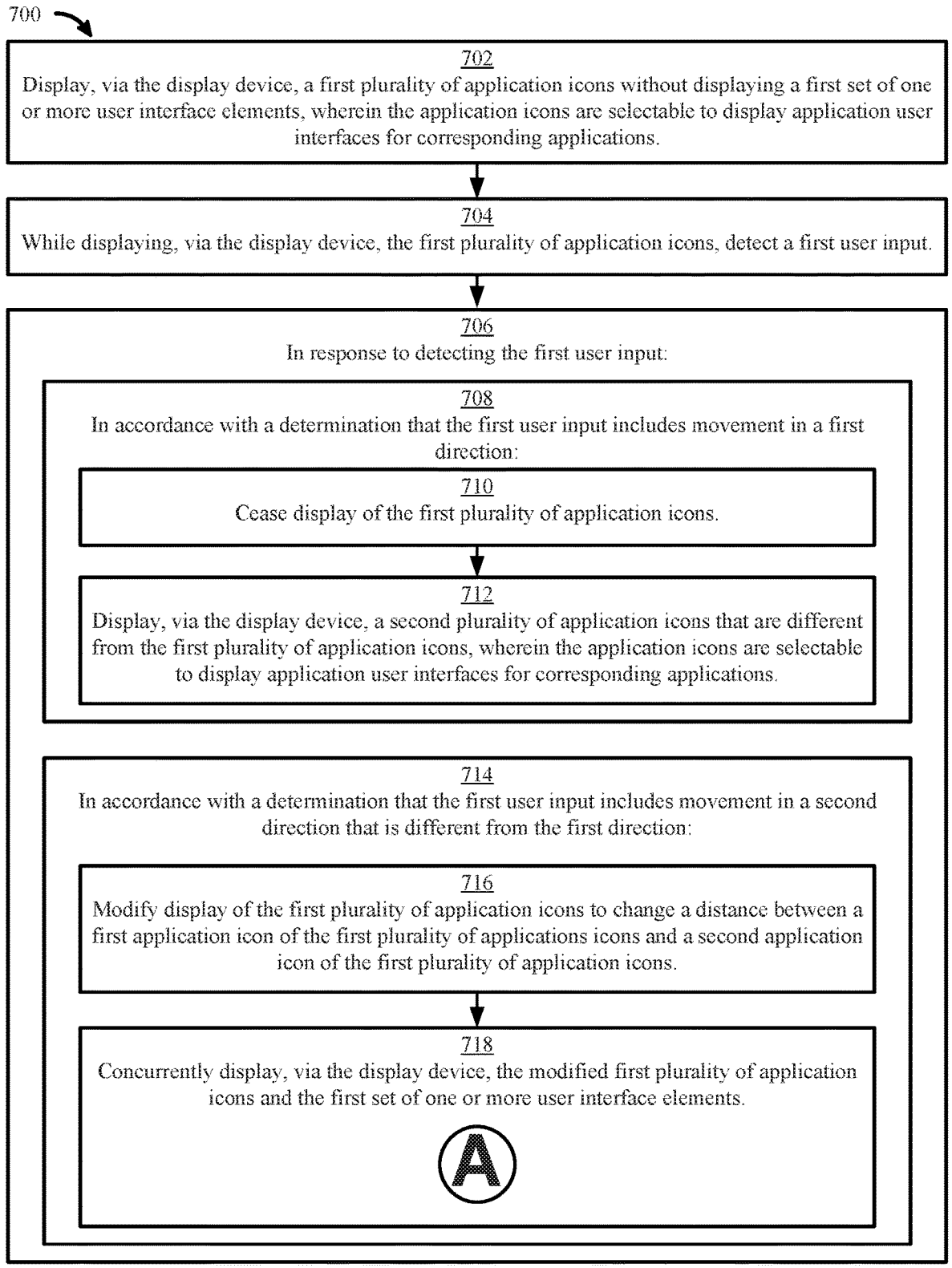

Below, FIGS. 1A-1B, 2, 3, 4A-4B, and 5A-5H provide a description of exemplary devices for performing the techniques for displaying widgets. FIGS. 6A-6AC illustrate exemplary user interfaces for display widgets. FIGS. 7A-7B are a flow diagram illustrating methods of displaying widgets in accordance with some embodiments. The user interfaces in FIGS. 6A-6AC are used to illustrate the processes described below, including the processes in FIGS. 7A-7B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
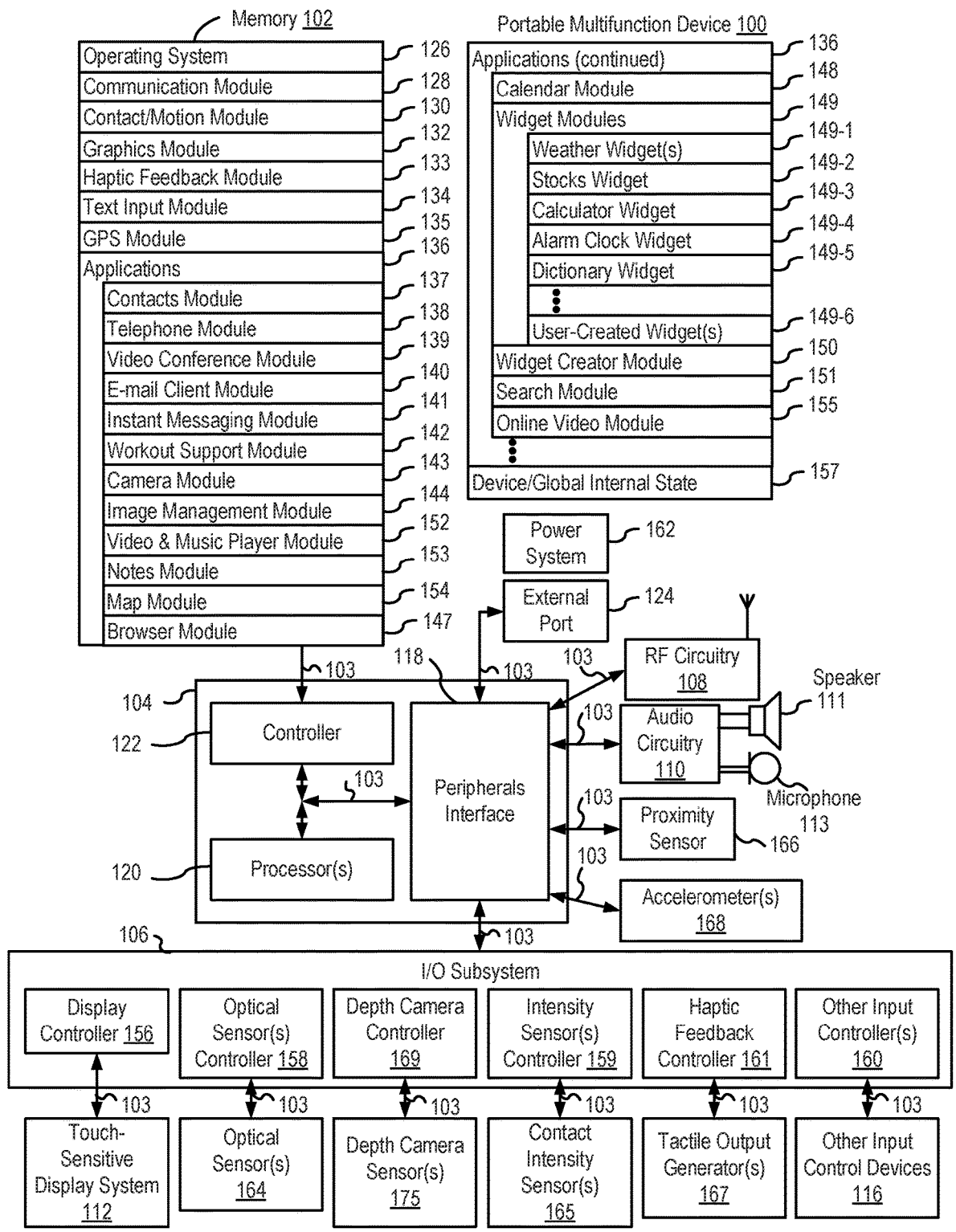
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
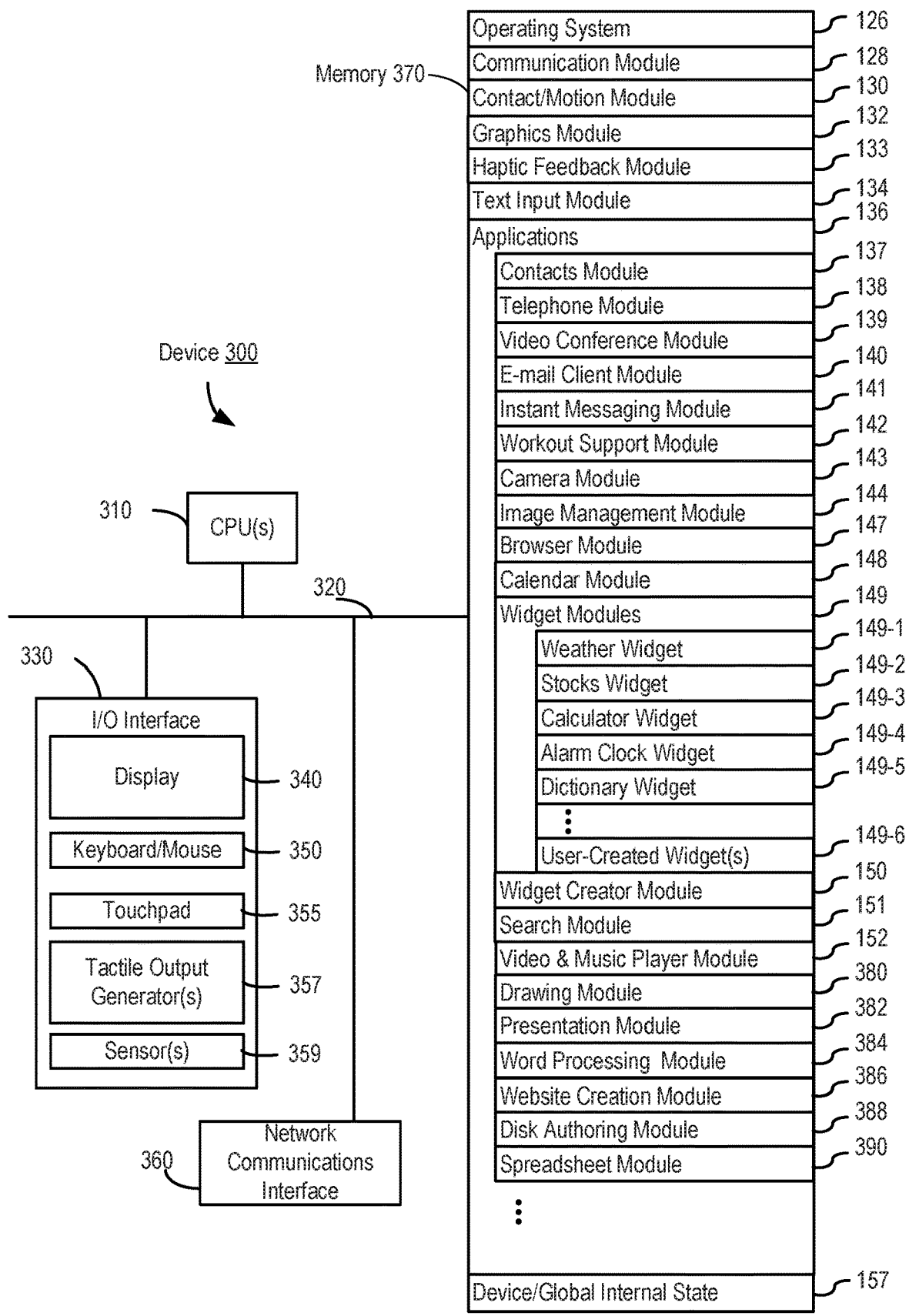
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
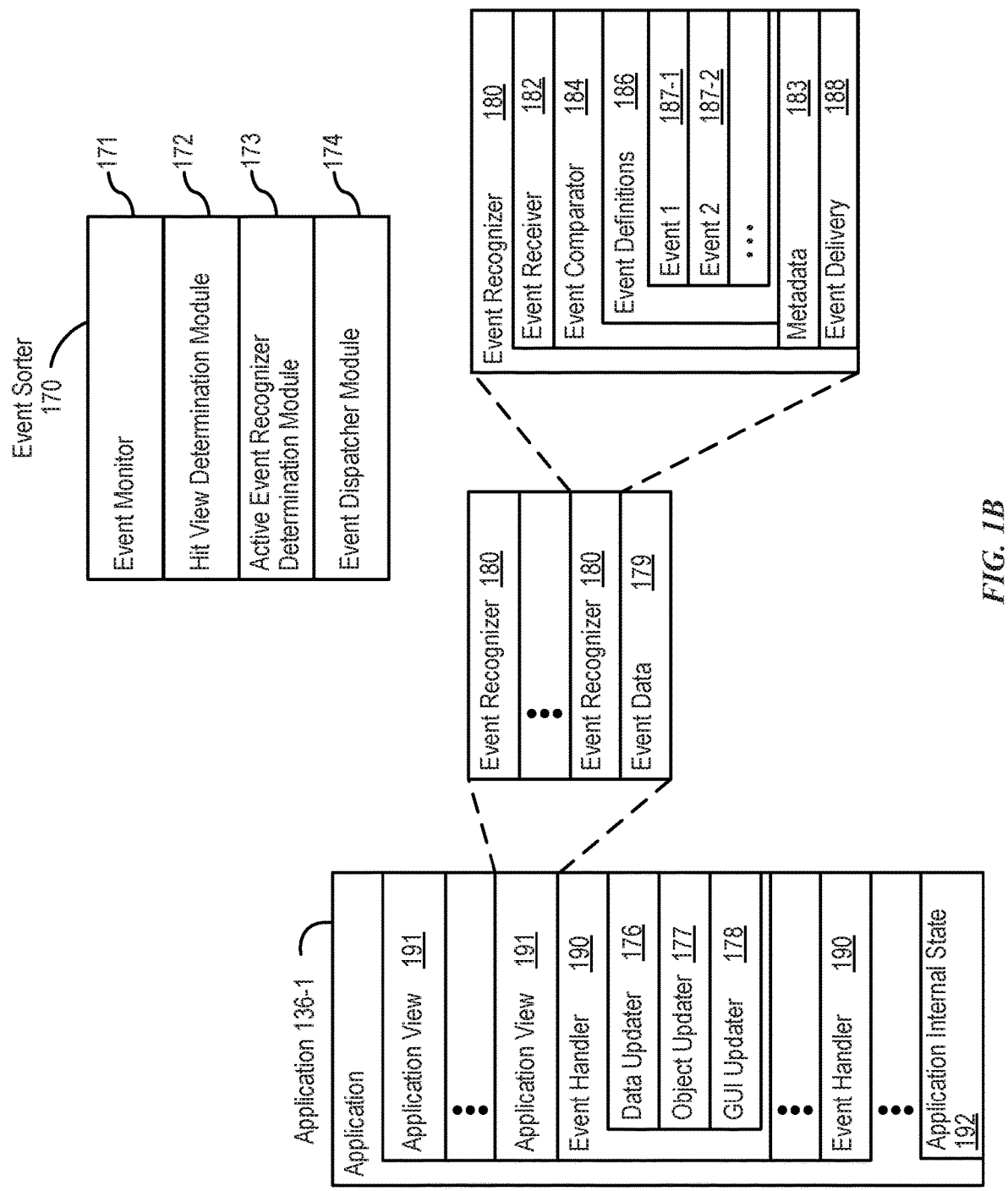
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
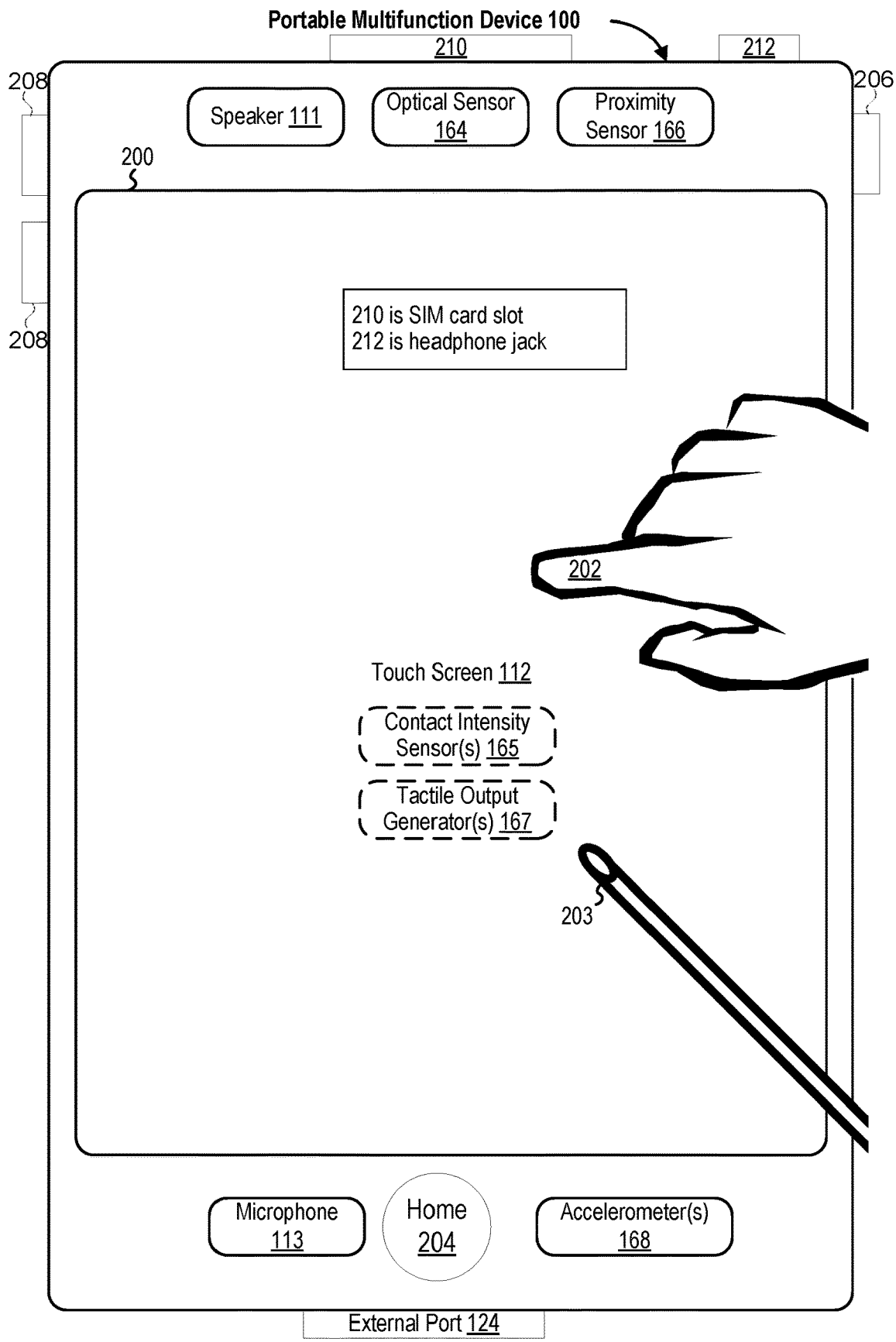
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
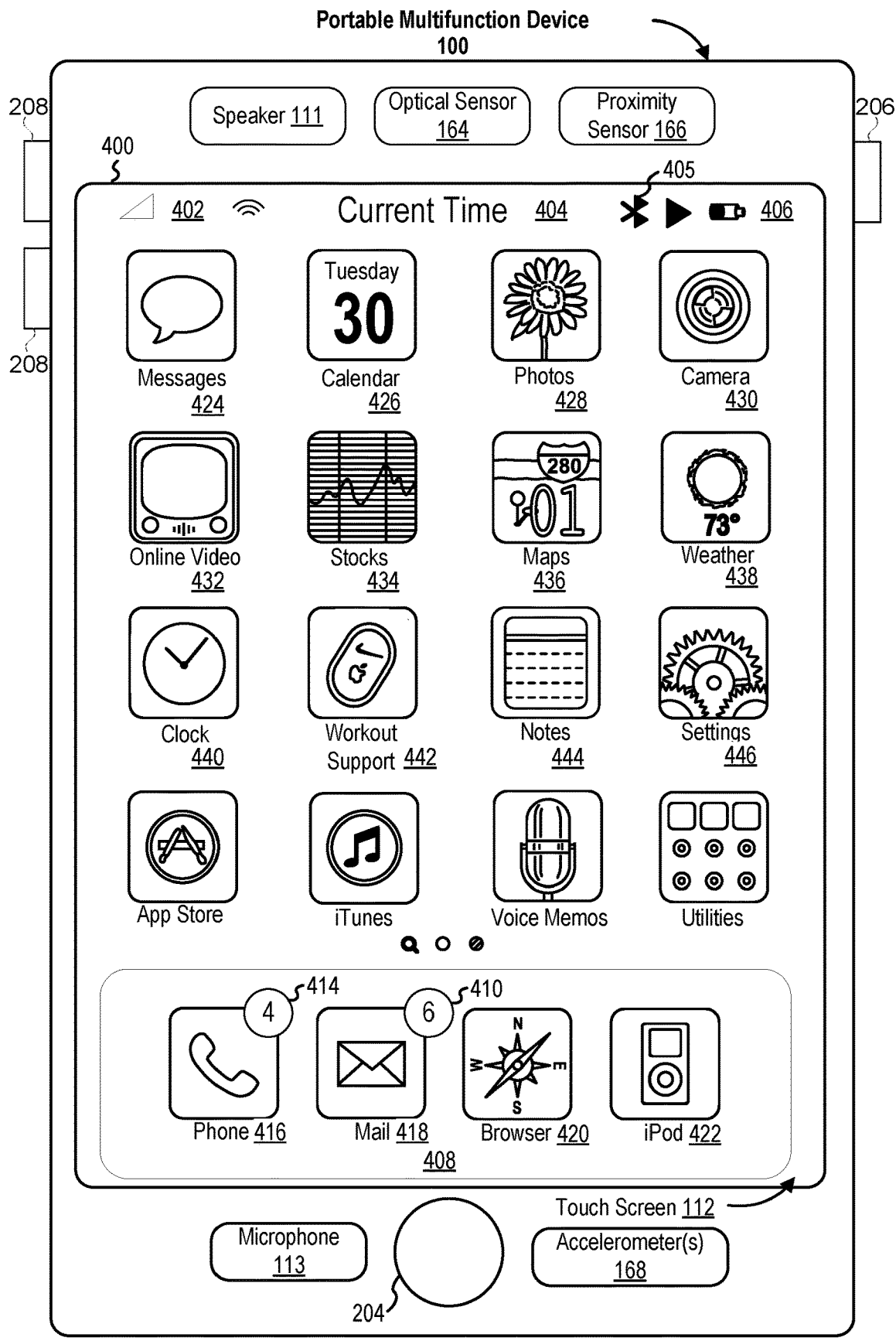
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
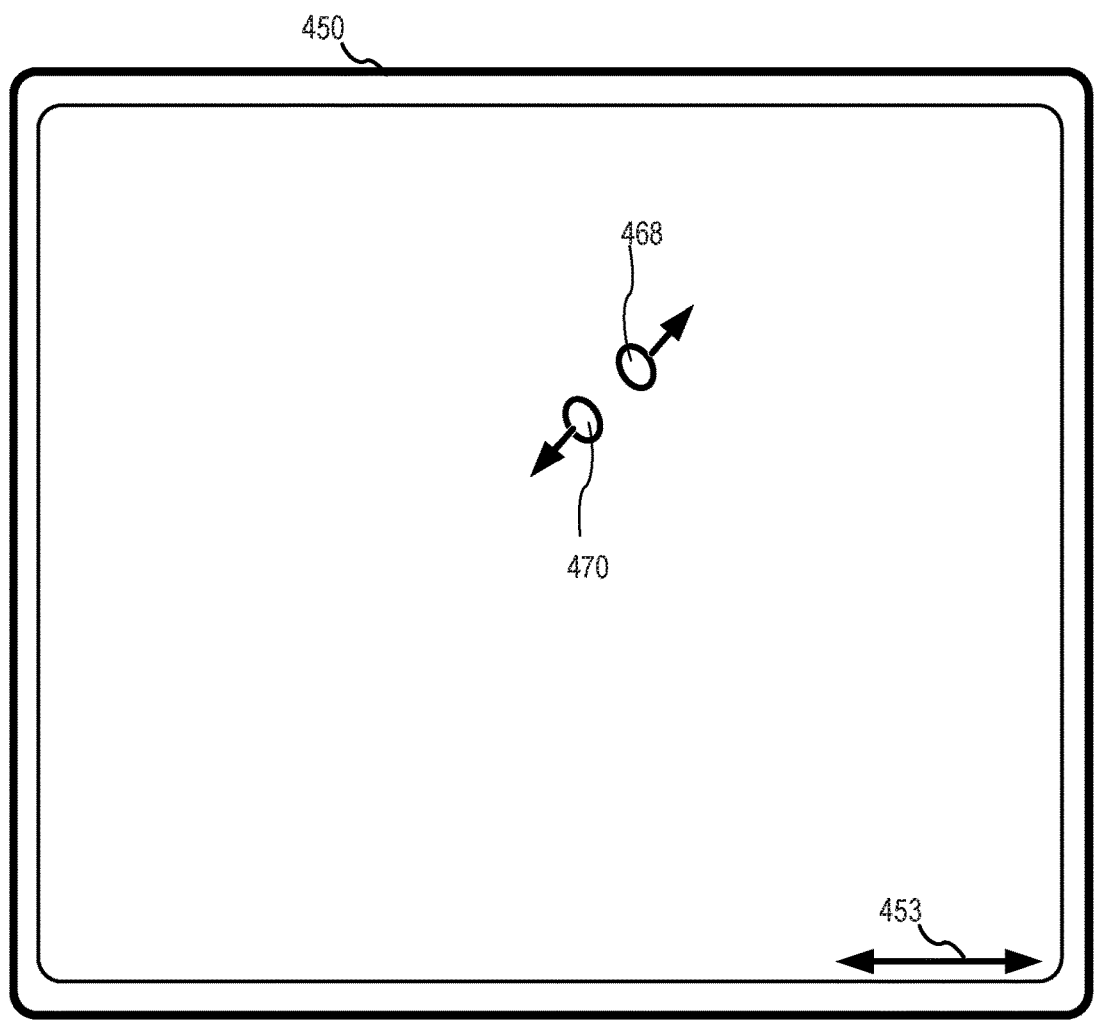
FIG. 4B illustrates an exemplary user interface for a multifunction device with a touch-sensitive surface that is separate from the display in accordance with some embodiments.
Figure 4B:
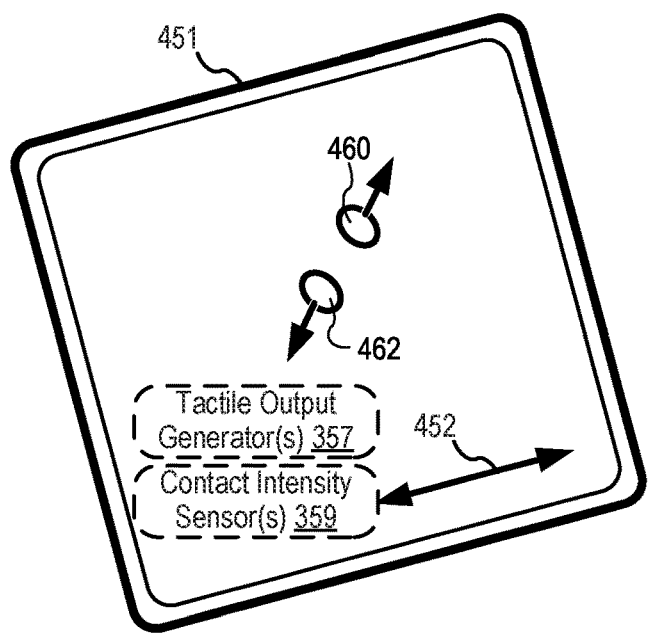

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
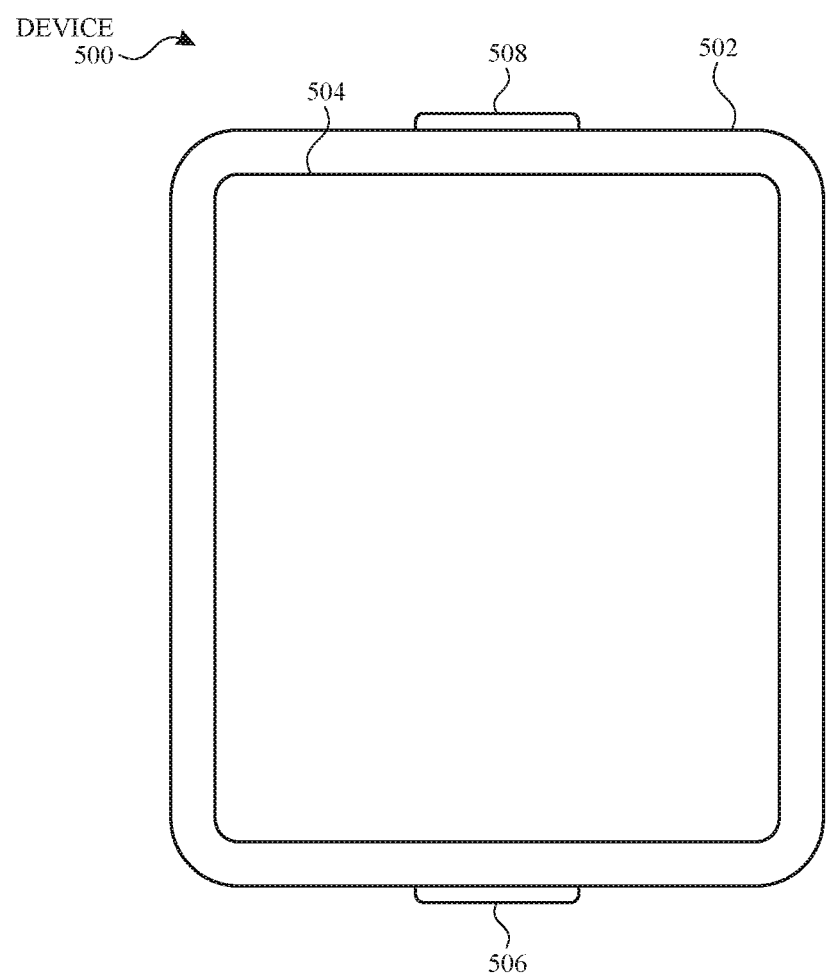
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
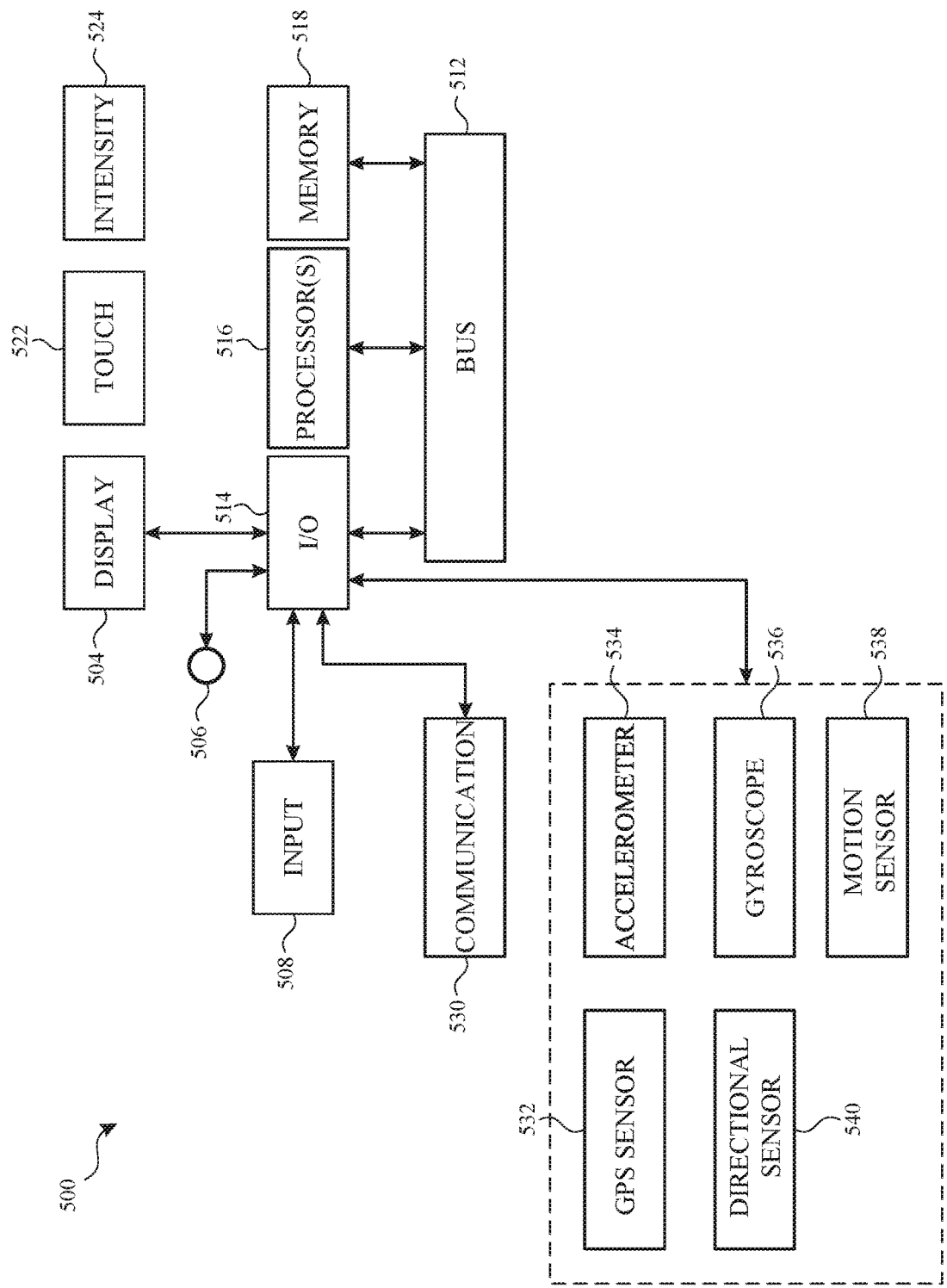
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including method 700 (FIGS. 7A-7B). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
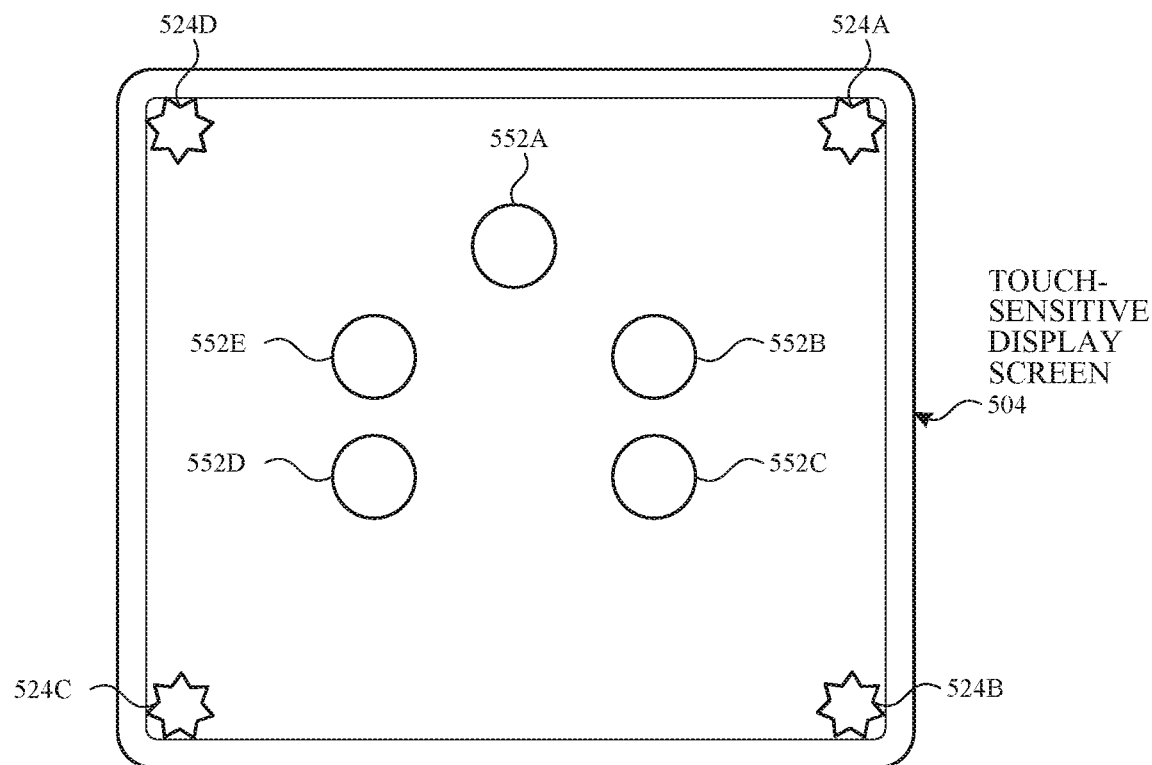
FIGS. 5C-5D illustrate exemplary components of a personal electronic device having a touch-sensitive display and intensity sensors in accordance with some embodiments.
Figure 5C:
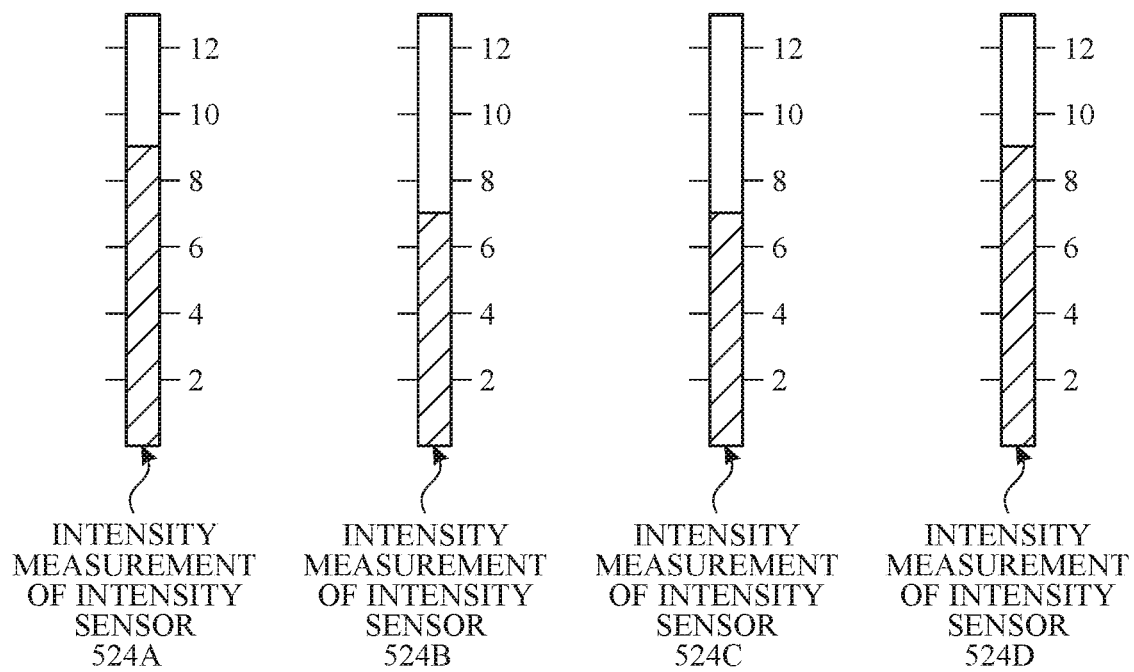
Figure 5D:
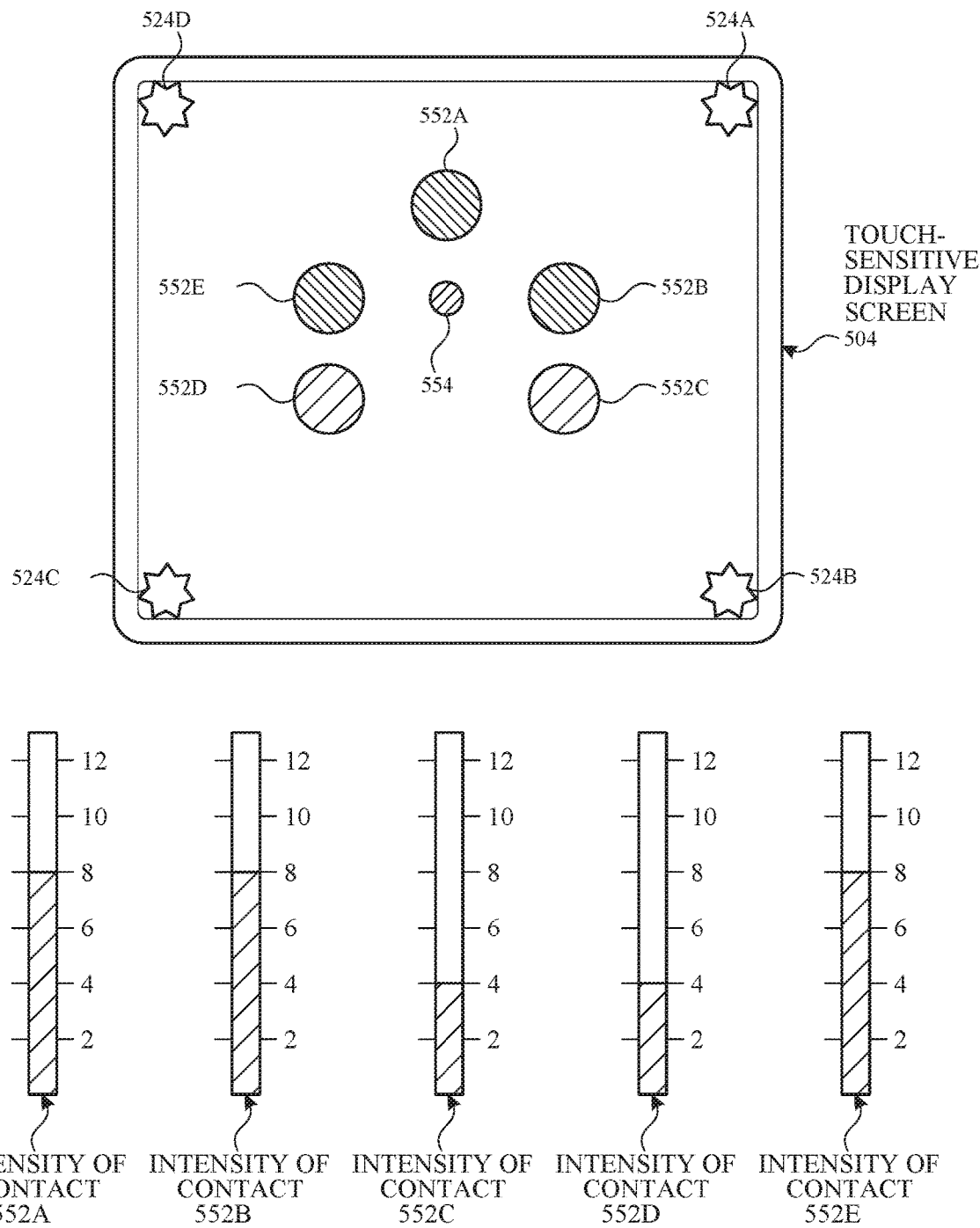

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
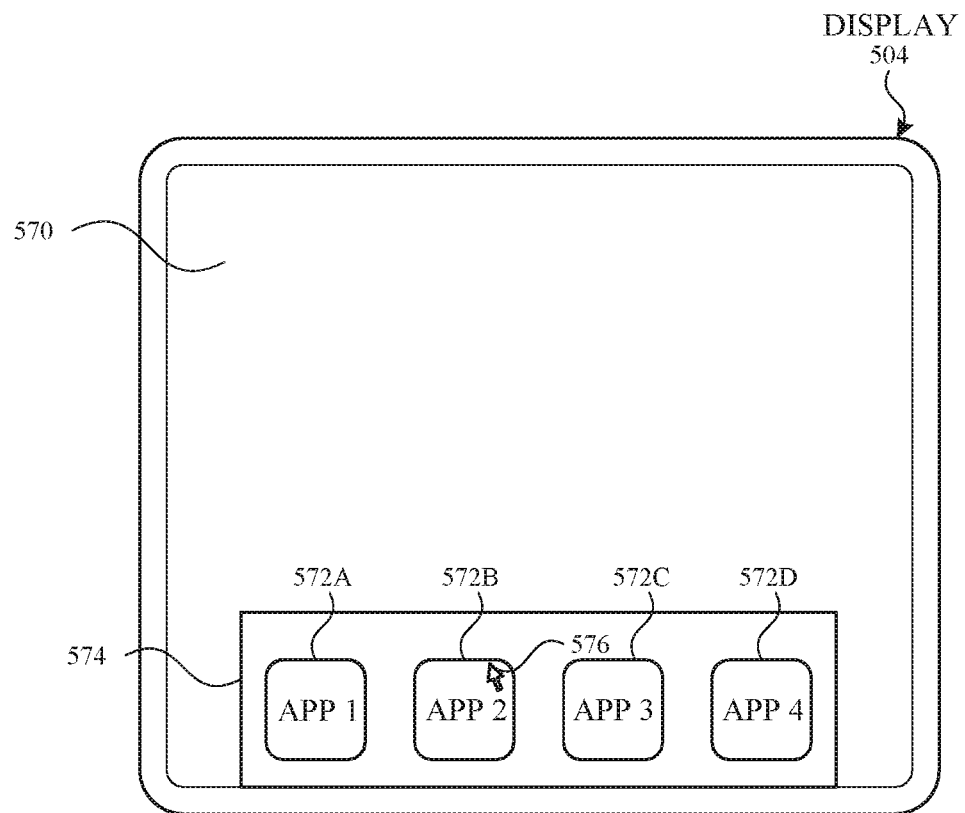
FIGS. 5E-5H illustrate exemplary components and user interfaces of a personal electronic device in accordance with some embodiments.
Figure 5E:
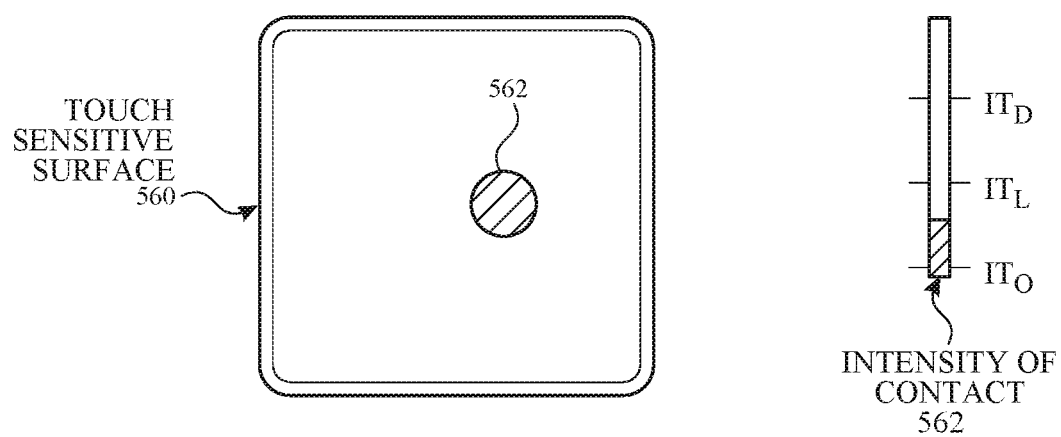
Figure 5F:
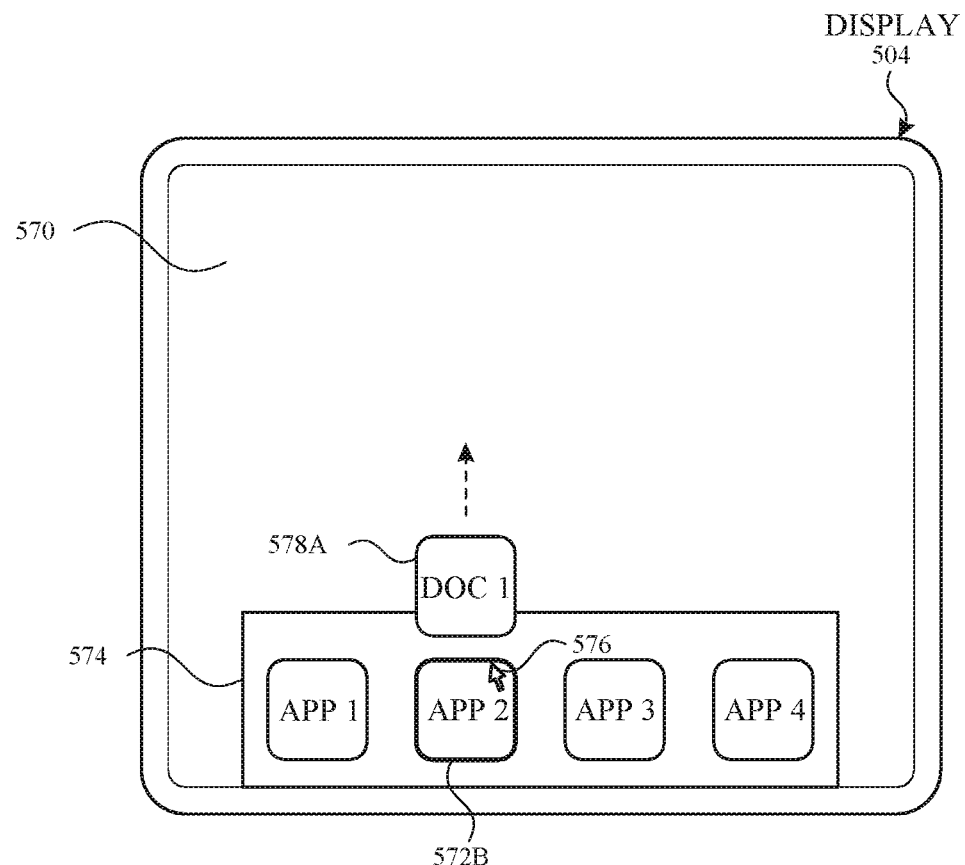
Figure 5F:
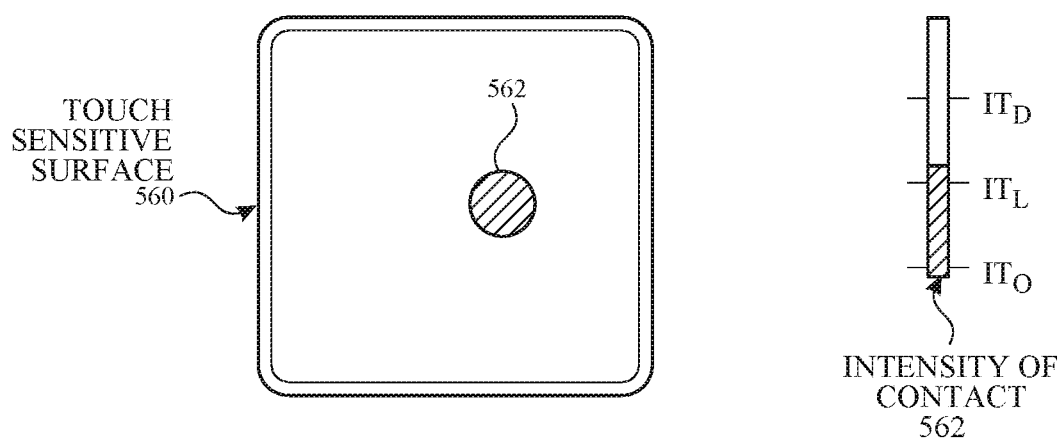
Figure 5G:
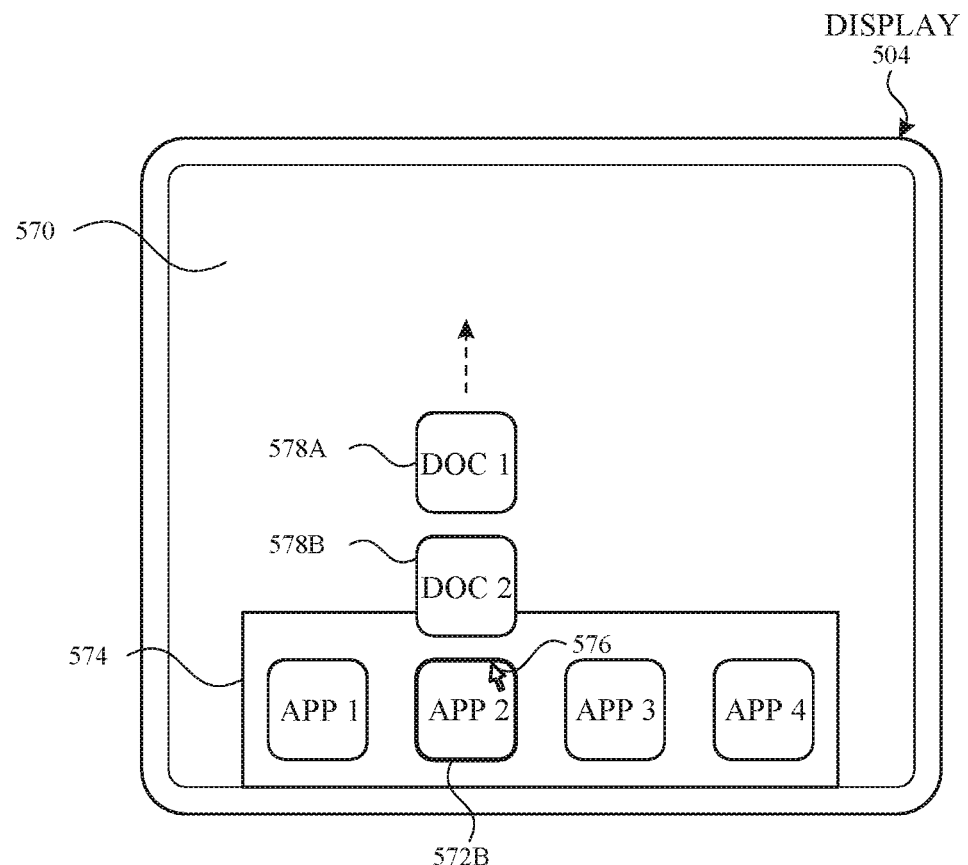
Figure 5G:
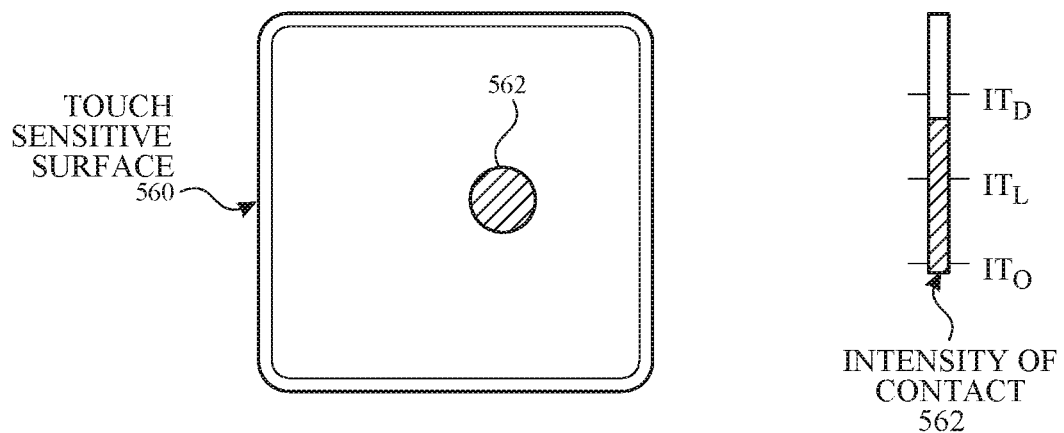
Figure 5H:
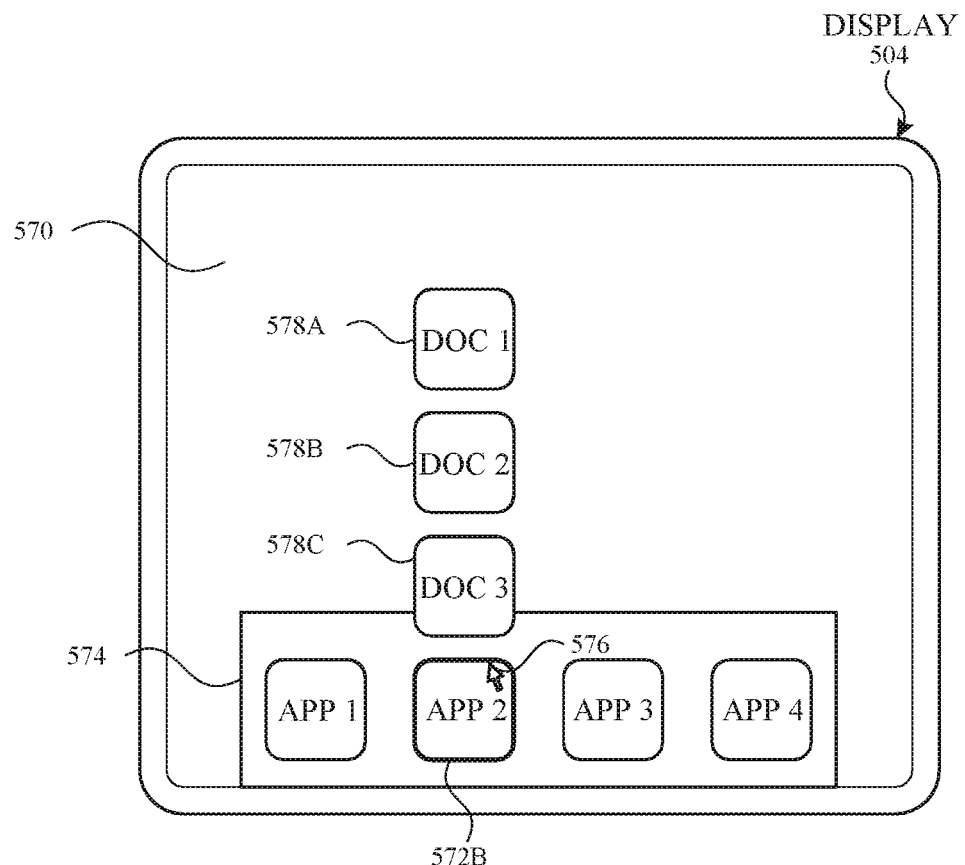
Figure 5H:
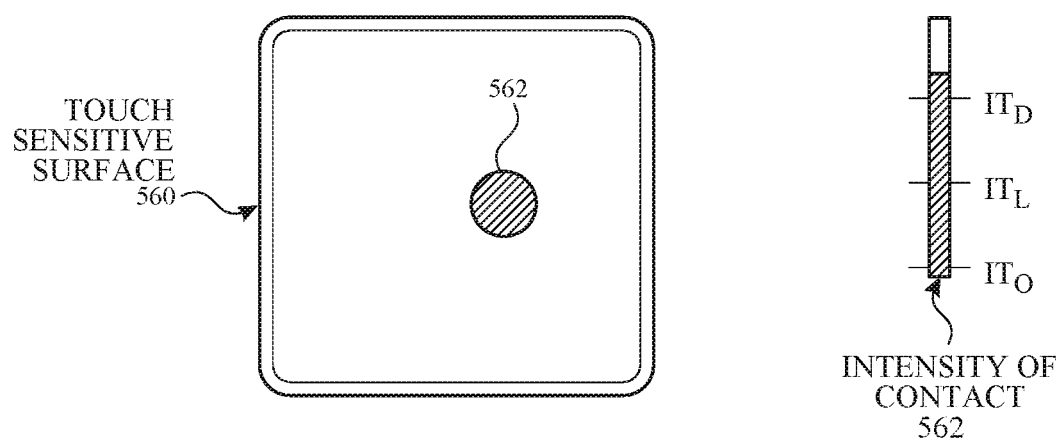

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6AC illustrate exemplary user interfaces for widgets, in accordance with some embodiments. The user interfaces in these figures are used to illustrate the processes described below, including the processes in FIGS. 7A-7B.

FIG. 6A depicts electronic device 600, which is a tablet computer with display 602, hardware button 604, and biometric sensor 606. In some embodiments, electronic device 600 is, or includes one or more features of, electronic device 100, 300, or 500.

At FIG. 6A, electronic device 600 displays home screen 608 while the device in an unlocked state and in a landscape orientation. The electronic device detects that the device is in the landscape orientation and provides the user interfaces for a landscape view. In some embodiments, a home screen is a displayed user interface that serves as a starting point for navigating the contents and functions of a device. As the user explores the home screen, the home screen can be modified to include new user interface objects (e.g., application icons, widgets) or modified to remove existing user interface objects.

In FIG. 6A, home screen 608 includes a first page of application (app) icons and dock region 610. The first page of app icons includes app icons 612A-612Z organized in a grid layout of rows and columns. Dock region 610 includes app icons 614A-614F organized in a single row. Immediately above dock region 610, electronic device 600 displays page indicator 616. Page indicator 616 provides an indication of the number of pages that exist, and also which page in the sequence of pages is currently being displayed.

As depicted in FIG. 6A, page indicator 616 includes three dots in a row, with the second dot filled in. This provides an indication that three pages exist, and that the second page in the sequence of pages is currently being displayed. As a result, page indicator 616 also provides an indication that pages exist to the left and right of the currently displayed page (e.g., the first page of app icons). In some embodiments, the contents of the page to the left is accessible via a left-to-right swipe gesture, while the contents of the page to the right is accessible via a right-to-left swipe gesture. As further described below, the page to the left is a page of widget(s), and the page to the right is a second page of app icons.

At FIG. 6A, electronic device 600 displays app icons 612A-612Z that, when selected, result in launching (or displaying) an application corresponding to the selected app icon. By launching the application, a user can access content from that application. However, suppose a user wishes to instead access content from an application via a widget. A displayed widget typically includes information from an application. The information is usually useful while being glanceable. To access the widget, the user performs a swipe gesture (e.g., swipe 618) with movement in the left-to-right direction on display 602.

As a result, while in a landscape orientation and while displaying app icons 612A-612Z, electronic device 600 detects swipe gesture 618 in a region corresponding to (e.g., occupied by) app icons 612A-612Z. In some embodiments, the region corresponding to app icons 612A-612Z does not include dock region 610 and/or the region occupied by status bar 620.

In some embodiments, upon detecting swipe gesture 618, electronic device 600 determines the direction of the movement in swipe gesture 618. As depicted in FIG. 6B-6C, upon determining that the direction of the movement in swipe gesture 618 is left-to-right, electronic device 600 modifies the display of home screen 608 by merging the page of widget(s) onto home screen 608.

Merging the page of widget(s) onto home screen 608 includes sliding widget 622A onto home screen 608 (e.g., from the left side of the display), and resizing the spacing between app icons 612A-612Z in order to accommodate the display of widget 622A on home screen 608. That is, the horizontal spacing between the app icons uniformly decreases. For example, the horizontal spacing between app icon 612A and app icon 612B decreases. Similarly, the horizontal spacing between app icon 612C and app icon 612D decreases by the same amount. In contrast, the vertical spacing between the app icons remains the same.

Moreover, as depicted in FIGS. 6B-6C, upon determining that the direction of the movement in swipe gesture 618 is left-to-right, electronic device 600 horizontally shifts to the right the location at which app icons 612A-612Z are displayed. For example, app icon 612A in FIG. 6C is displayed at a location that is to the right of the location at which app icon 612A is displayed in FIG. 6A. The reduction in horizontal spacing of the app icons and the shifting of the app icons to the right provide additional space on home screen 608 to accommodate the display of widget 622A. While app icons 612A-612Z undergo visual changes as discussed above, app icons 614A-614F in dock region 610 remain unchanged in response to swipe gesture 618. For example, the horizontal spacing between app icon 614A and app icon 614B in dock region 610 remains unchanged.

At FIG. 6C, upon determining that the direction of the movement in swipe gesture 618 is left-to-right, electronic device 600 concurrently displays widget 622A and app icons 612A-612Z on home screen 608. Widget 622A is a calendar widget that shows glanceable information from a calendar application. In some embodiments, widget 622A is of a particular category known as "pinned". Other categories can include "favorites" and "library". In some embodiments, electronic device 600 uses the categories to determine which widgets are to be displayed. For example, in some embodiments, upon determining that the direction of the movement in swipe gesture 618 is left-to-right, electronic device concurrently displays app icons 612A-612Z and only the "pinned" widgets (e.g., 622A). Thus, in some embodiments, widgets in the "favorites" and "library" categories would not be displayed. Widgets can be reorganized in the different categories in the edit mode, as further described below with respect to FIG. 6P.

As a result of merging the page of widget(s) onto home screen 608, electronic device 600 updates page indicator 616 to reflect that the total number of pages has been reduced from three to two. Additionally, as a result of merging the page of widget(s) onto home screen 608, time indicator 624 and date indicator 626 moves from status bar 620 to widget region 628 (further described below).

It is noted that the above described result in FIGS. 6B-6C occurs as a result of detecting a swipe gesture with movement in the left-to-right direction. For the result that occurs due to detecting a swipe gesture with movement in the right-to-left direction, refer to the description below with respect to FIGS. 6Z-6AA.

As discussed above, upon determining that the direction of the movement in swipe gesture 618 is left-to-right, electronic device 600 concurrently displays widget 622A and app icons 612A-612Z on home screen 608. As depicted in FIG. 6C, electronic device 600 also generates two adjacent, non-overlapping regions for displaying the widget(s) and app icons. These two regions are widget region 628, a region occupied by (e.g., corresponding to) widget(s), and app region 630, a region occupied by (e.g., corresponding to) app icons. Boundary line 632 marks the boundary between widget region 628 and app region 630. FIG. 6C depicts boundary line 632 for illustrative purposes, as electronic device 600 does not actually display boundary line 632.

As shown in FIG. 6C, electronic device 600 displays widget(s) (e.g., 622A) in widget region 628, and displays app icons in app region 630. Widget region 628 is adjacent to and does not overlap with app region 630. Moreover, in some embodiments, both widget region 628 and app region 630 do not include dock region 610 and the region occupied by status bar 620.

Figure 6D:
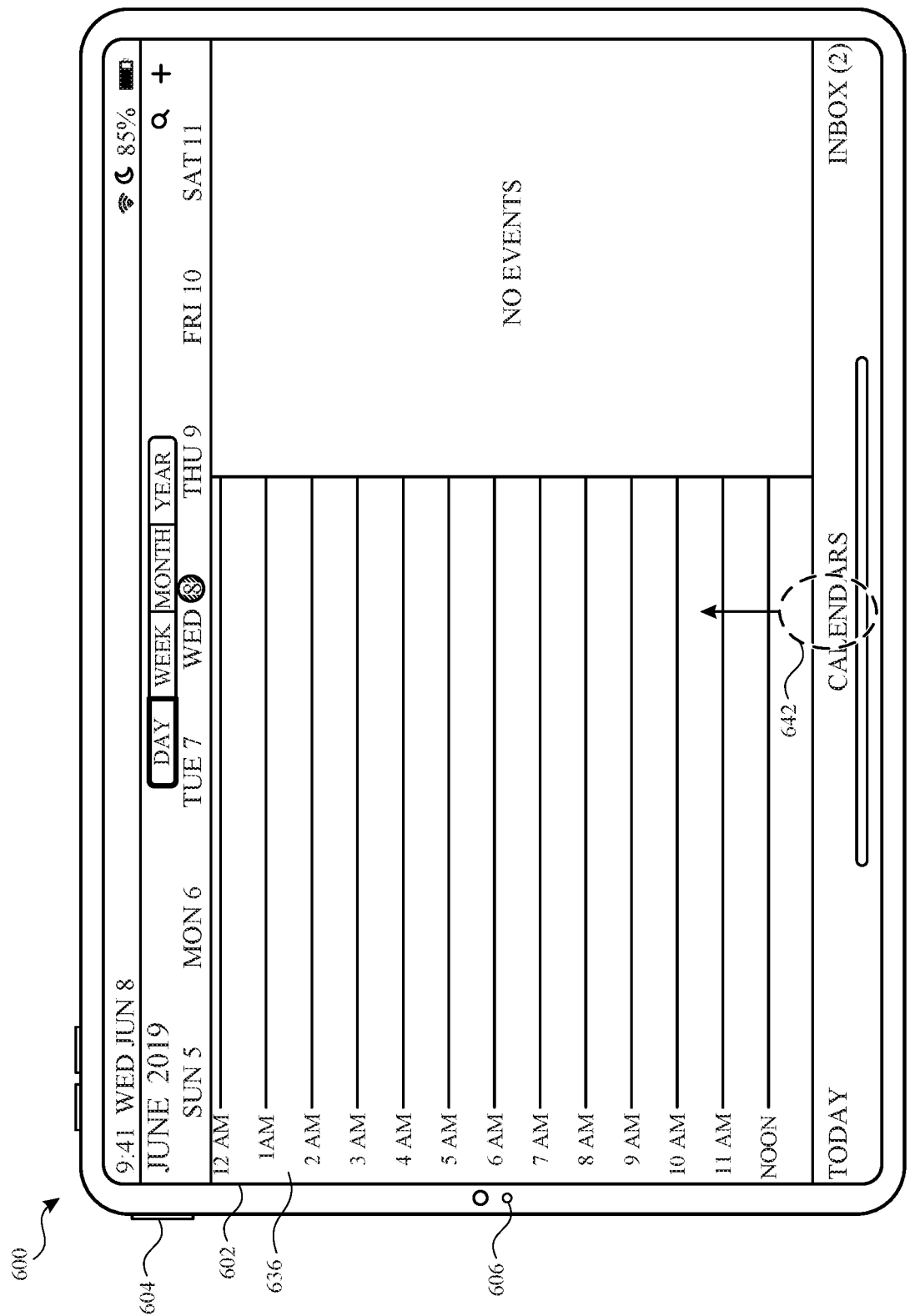

At FIG. 6C, while concurrently displaying widget 622A and app icons 612A-612Z, electronic device 600 detects tap gesture 634 at app icon 612I. Upon detecting tap gesture 634, electronic device 600 launches a calendar application and replaces display of home screen 608 with display of user interface 636 of the calendar application, as depicted in FIG. 6D. In some embodiments, instead of detecting tap gesture 634, electronic device 600 detects tap gesture 638 at widget icon 640. Widget icon 640 is a reduced size version of app icon 612I. In some embodiments, upon detecting tap gesture 638, electronic device 600 launches a calendar application and replaces display of home screen 608 with display of user interface 636 of the calendar application, as depicted in FIG. 6D. Thus, in some embodiments, detecting a tap gesture at app icon 612I causes the same application to be displayed as detecting a tap gesture at widget icon 640.

Figure 6E:
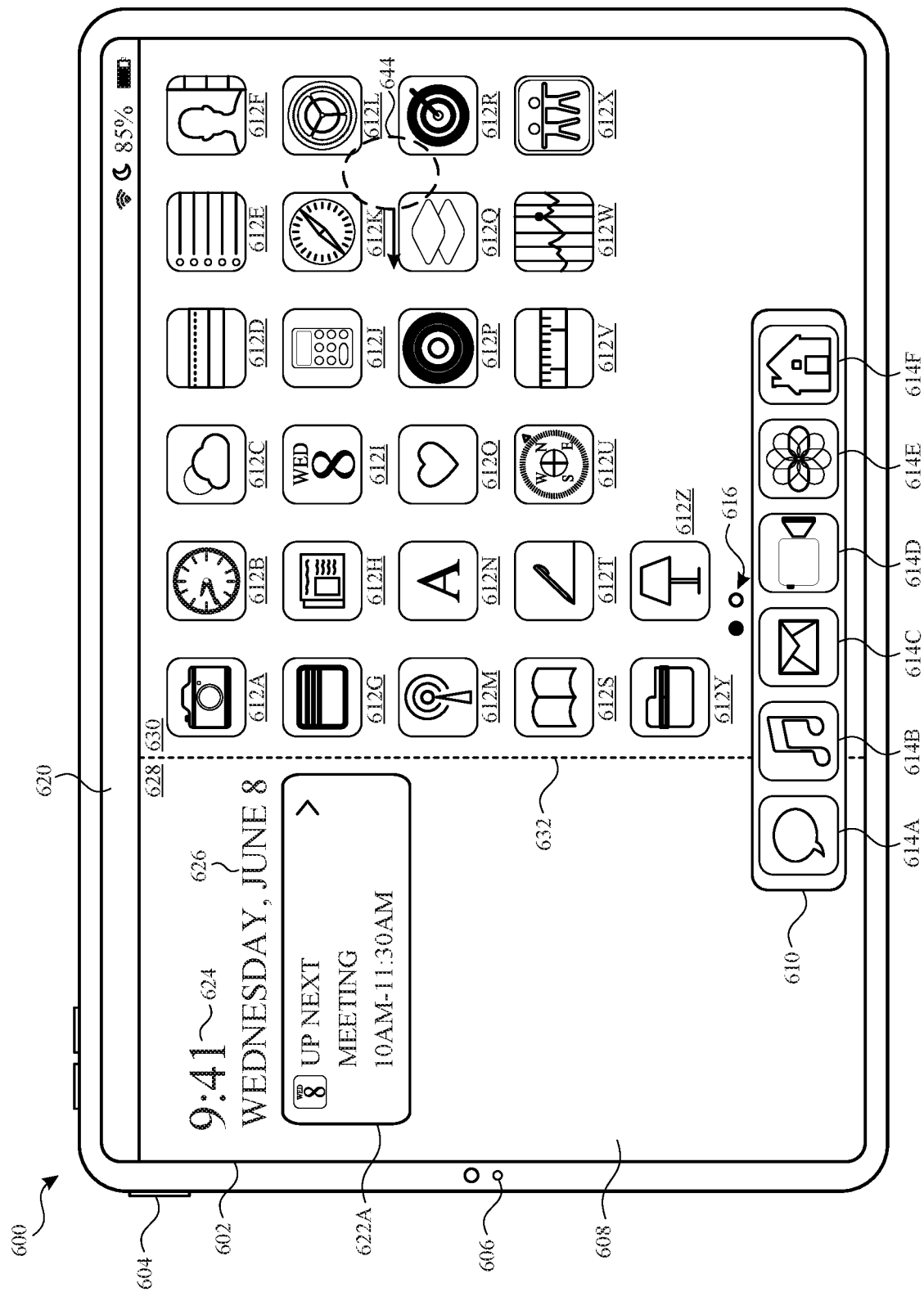

At FIG. 6D, the user performs a swipe gesture to navigate back to home screen 608. As a result, while displaying user interface 636 of the calendar application, electronic device 600 detects swipe gesture 642 starting near the bottom edge of display 602 with movement in an upward direction. Upon detecting swipe gesture 642, electronic device 600 replaces display of user interface 636 with display of home screen 608. The previous state of home screen 608 persists despite the intervening display of user interface 636 of the calendar application. Specifically, as shown in FIG. 6E, upon detecting swipe gesture 642, electronic device 600 again concurrently displays widget 622A and app icons 612A-612Z on home screen 608. In some embodiments, instead of concurrently displaying widget 622A and app icons 612A-612Z upon detecting swipe gesture 642, electronic device 600 returns to the home screen depicted in FIG. 6A. Specifically, electronic device 600 displays app icons 612A-612Z without widget 622A.

Figure 6F:
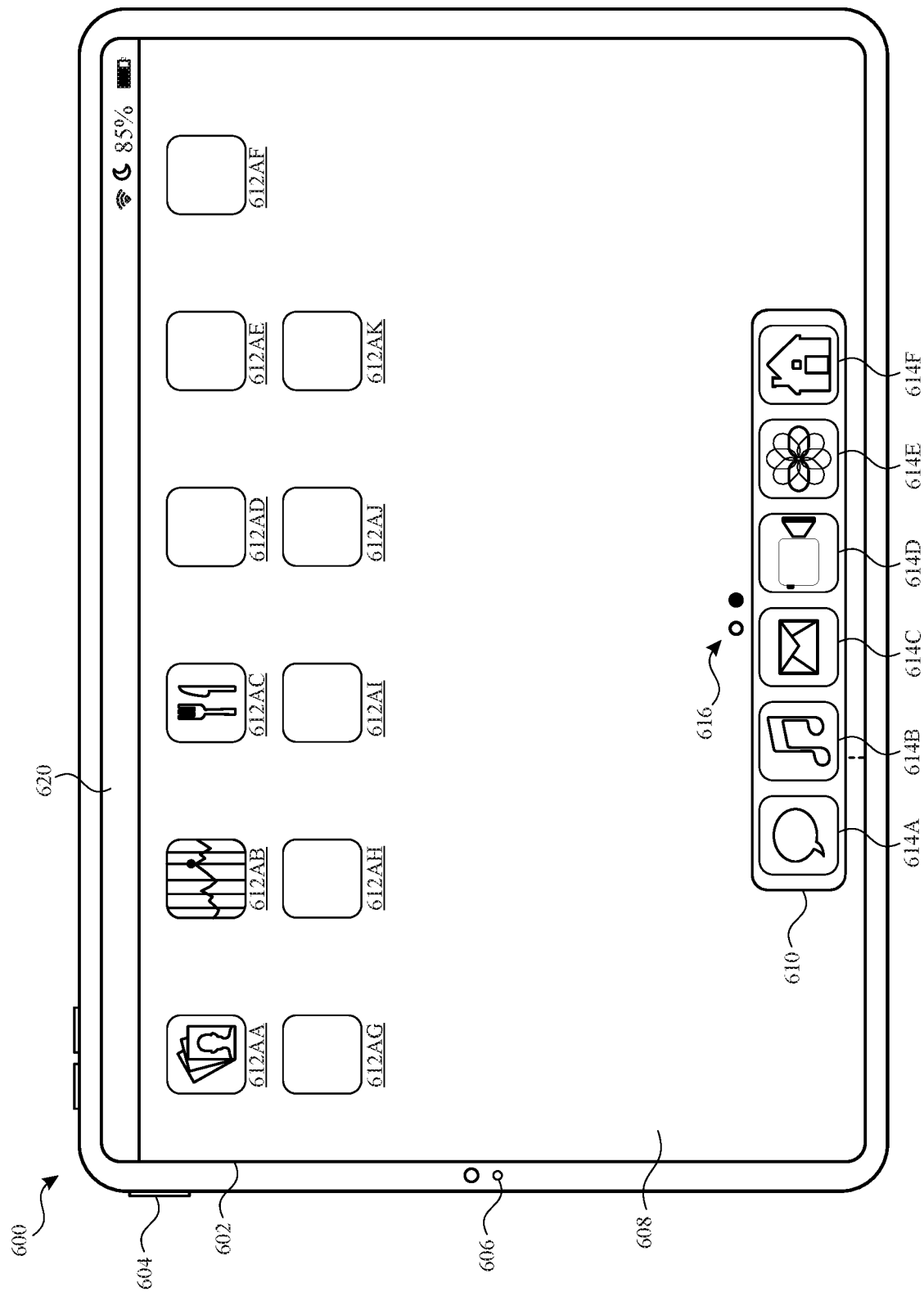

At FIG. 6E, the user performs a swipe gesture to navigate to the second page of app icons. As a result, while concurrently displaying widget 622A and app icons 612A-612Z, electronic device 600 detects swipe gesture 644 in app region 630. In some embodiments, upon detecting swipe gesture 644 in app region 630, electronic device 600 determines the direction of the movement in swipe gesture 644. Upon determining that the direction of the movement in swipe gesture 644 is right-to-left, electronic device 600 replaces display of the widget(s) and the first page of app icons with display of the second page of app icons. Specifically, electronic device 600 replaces display of widget 622A and app icons 612A-612Z with display of app icons 612AA-612AK, as shown in FIG. 6F. In some embodiments, upon determining that the direction of the movement in swipe gesture 644 is right-to-left, electronic device 600 replaces display of app icons 612A-612Z with app icons 612AA-AK, while maintaining display of the widget 622A.

It is noted that the above described result in FIG. 6E occurs as a result of detecting a swipe gesture in app region 630 with movement in the right-to-left direction, while electronic device 600 concurrently displays widget(s) and the first page of app icons. For the result that occurs due to detecting a swipe gesture in app region 630 with movement in the left-to-right direction, refer to the description below with respect to FIG. 6AC. For the result that occurs due to detecting a swipe gesture in widget region 628 with movement in the right-to-left direction, refer to the description below with respect to FIGS. 6Y-6Z.

Figure 6G:
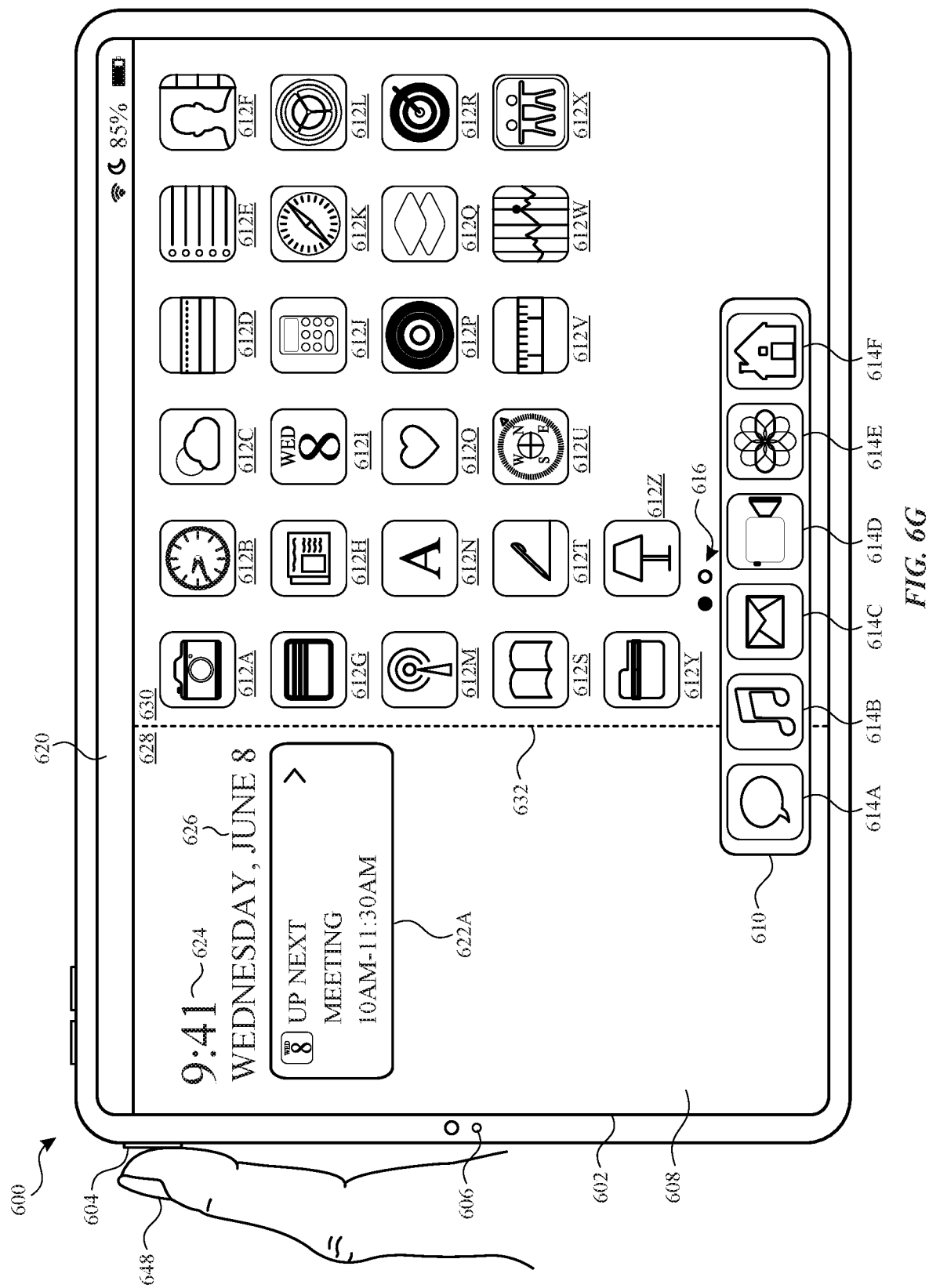

At FIG. 6F, the user performs a swipe gesture to navigate back to the first page of app icons. As a result, while concurrently displaying widget 622A and app icons 612AA-612AK, electronic device 600 detects swipe gesture 646 in app region 630 with movement in the left-to-right direction. Upon detecting swipe gesture 646, electronic device 600 replaces the second page of app icons with the first page of app icons. Specifically, electronic device 600 replaces display of app icons 612AA-612AK with app icons 612A-612Z, while maintaining display of widget 622A, as shown in FIG. 6G.

With reference to FIGS. 6A-6G, electronic device 600 has been in an unlocked state. At FIG. 6G, the user presses the hardware button to lock electronic device 600. As a result, while concurrently displaying widget 622A and app icons 612A-612Z, electronic device 600 detects input 648 at hardware button 604. Upon detecting input 648, electronic device 600 transitions from an unlocked state to a locked state, as depicted in FIG. 6H.

Figure 6H:
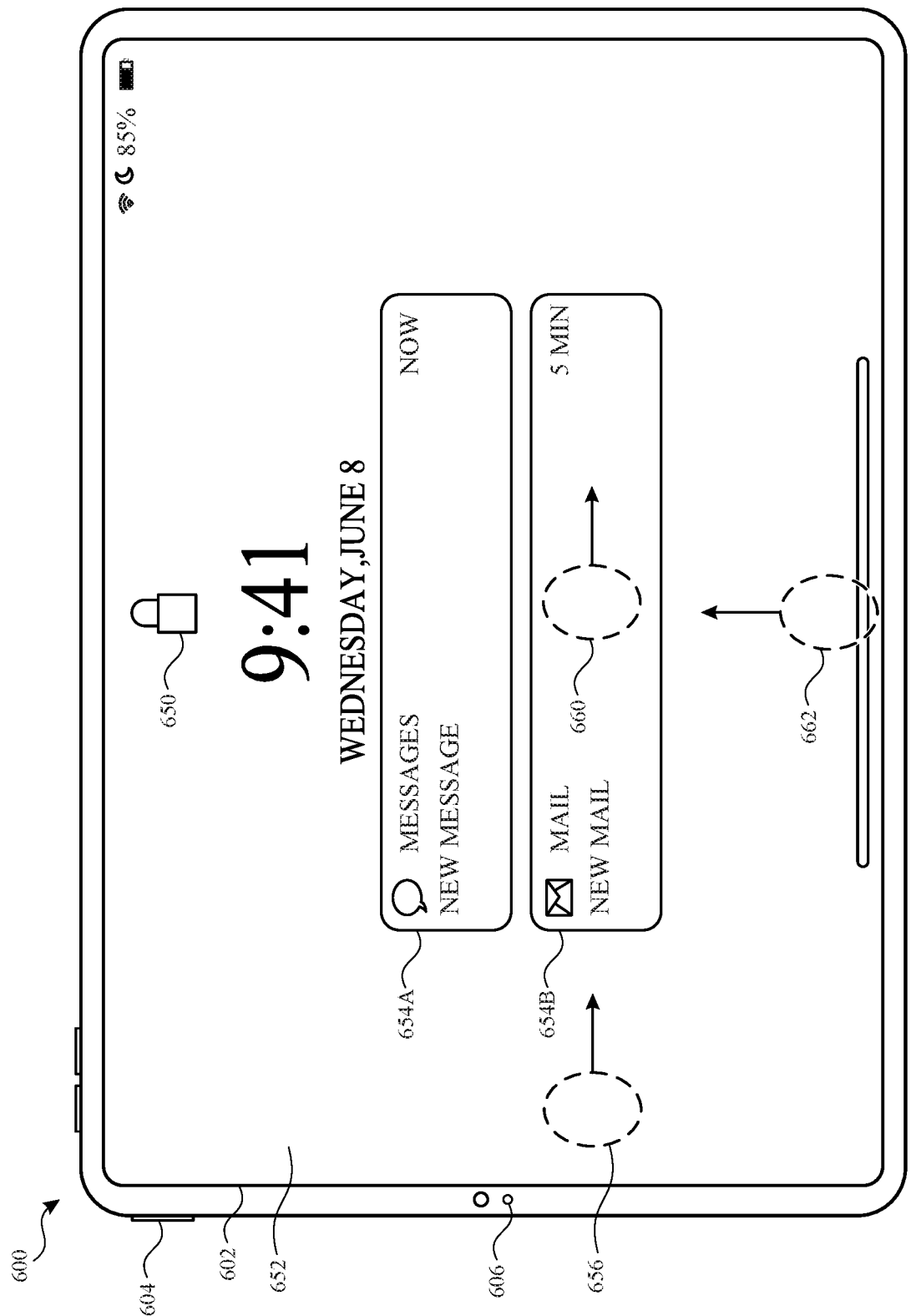
Figure 6I:
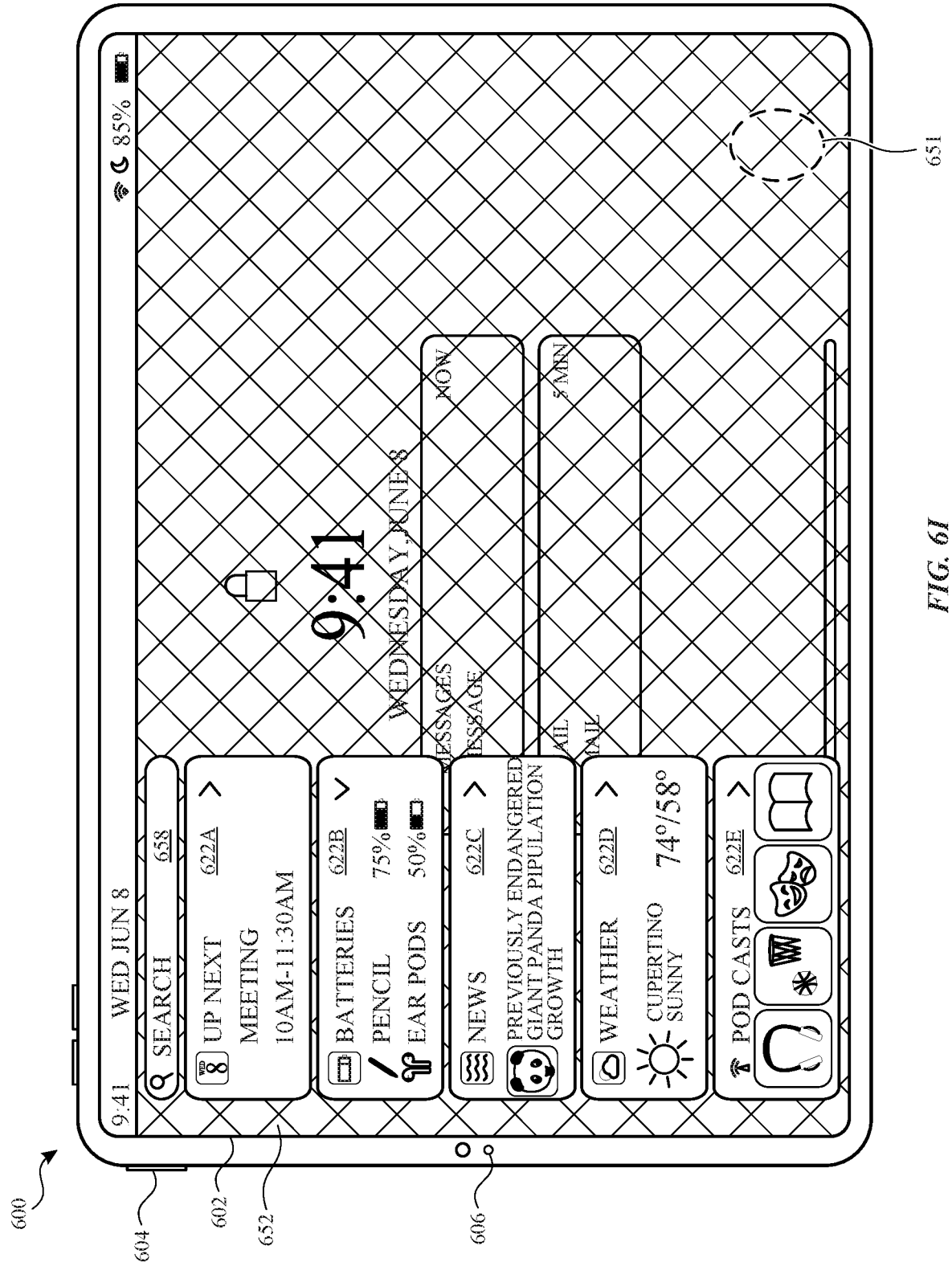

At FIG. 6H, electronic device 600 is in a locked state, as indicated by lock icon 650. While in a locked state, electronic device 600 displays user interface 652 with notifications 654A-654B. The user performs a swipe gesture on user interface 652 to access the widgets. As a result, while displaying user interface 652, electronic device 600 detects swipe gesture 656. Upon detecting swipe gesture 656, electronic device 600 slides widgets 622A-622E over user interface 652 such that the display of widgets 622A-622E is overlaid on top of user interface 652, as shown in FIG. 6I. Moreover, electronic device 600 displays search bar 658 above widget 622A, where search bar 658 enables a user to search the contents of electronic device 600 and/or perform a web search. Further, electronic device 600 blurs a portion of the display outside of widgets 622A-622E and search bar 658, as indicated by the crosshatching in FIG. 6I. It is noted that swipe gesture 656 can cause the above described result when electronic device 600 is in an unlocked state as well.

In some embodiments, instead of detecting swipe gesture 656, electronic device 600 detects swipe gesture 660 at notification 654B, as shown in FIG. 6H. In some embodiments, upon detecting swipe gesture 660, electronic device does not slide widgets 622A-622E over user interface 652, and instead attempts to launch (or display) the application that corresponds to notification 654B.

After viewing widgets 622A-622E, the user navigates back to user interface 652 of FIG. 6H by tapping in a region outside of the widgets. As a result, electronic device returns to displaying user interface 652 of FIG. 6H in response to detecting tap gesture 651 in a region outside of widgets 622A-622E and, optionally, search bar 658.

At FIG. 6H, the user performs a swipe gesture navigate to the home screen. As a result, while displaying user interface 652, electronic device 600 detects swipe gesture 662 starting near the bottom edge of display 602 with movement in the upward direction. Upon detecting swipe gesture 662, electronic device 600 attempts to biometrically authenticate the user using biometric sensor 606. Upon successful authentication, electronic device 600 replaces display of user interface 652 with home screen 608 of FIG. 6J. In particular, electronic device 600 concurrently displays widget 622A and app icons 612A-612Z.

Figure 6J:
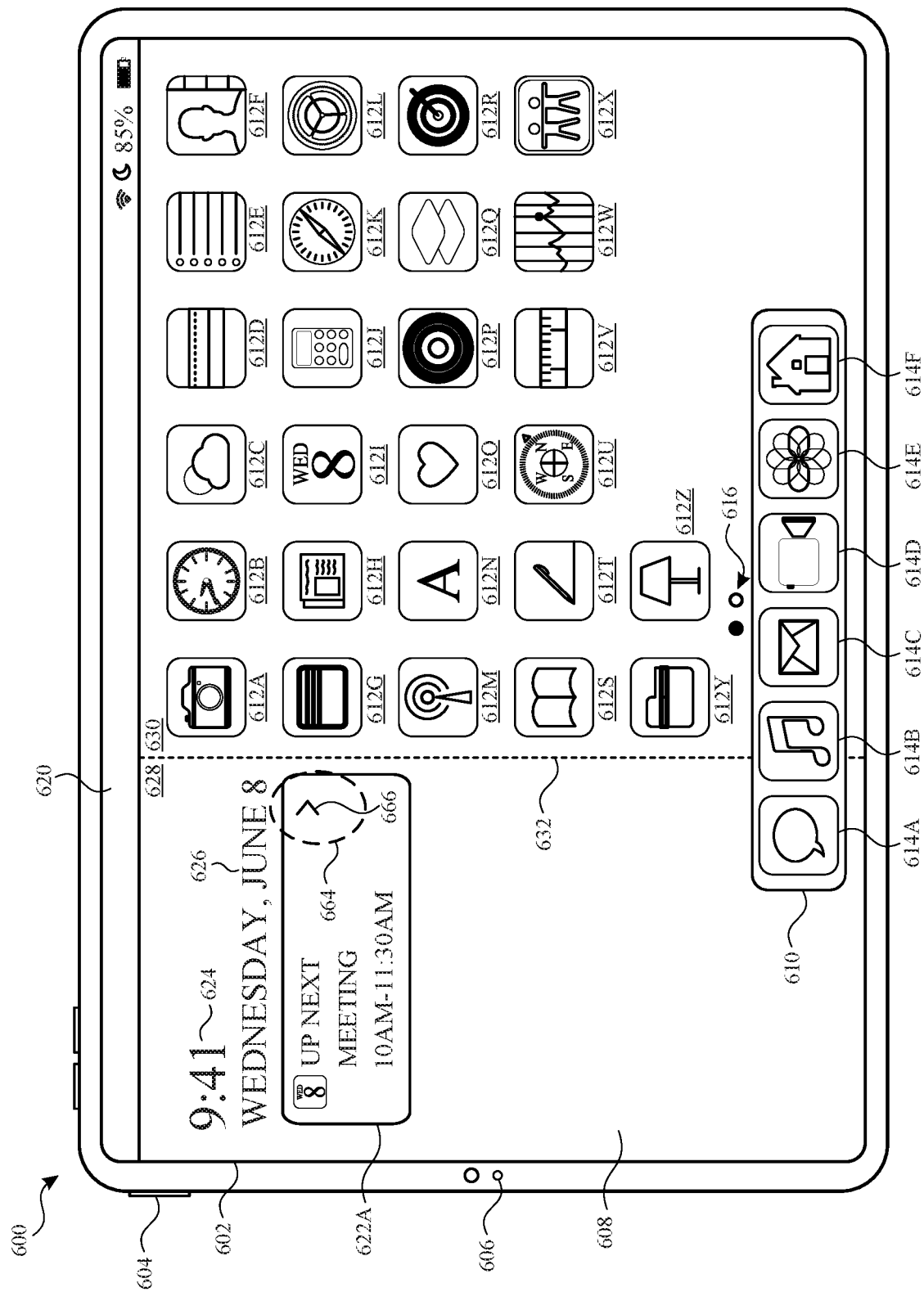

At FIG. 6J, the user performs a tap gesture to expand widget 622A and see additional information from the calendar application. As a result, while concurrently displaying widget 622A and app icons 612A-612Z, electronic device 600 detects tap gesture 664 at expand chevron 666. In some embodiments, upon detecting tap gesture 664, electronic device 600 determines whether expansion criteria is met. In particular, electronic device 600 determines whether the widget selected for expansion can expand downward to a fully expanded size without causing a portion of the widget to fail to display. Upon determining that the expansion criteria is met (e.g., no portion would fail to display due to expansion), electronic device 600 expands the size of widget 622A to show more information from the calendar application, as illustrated in FIG. 6K.

Figure 6K:
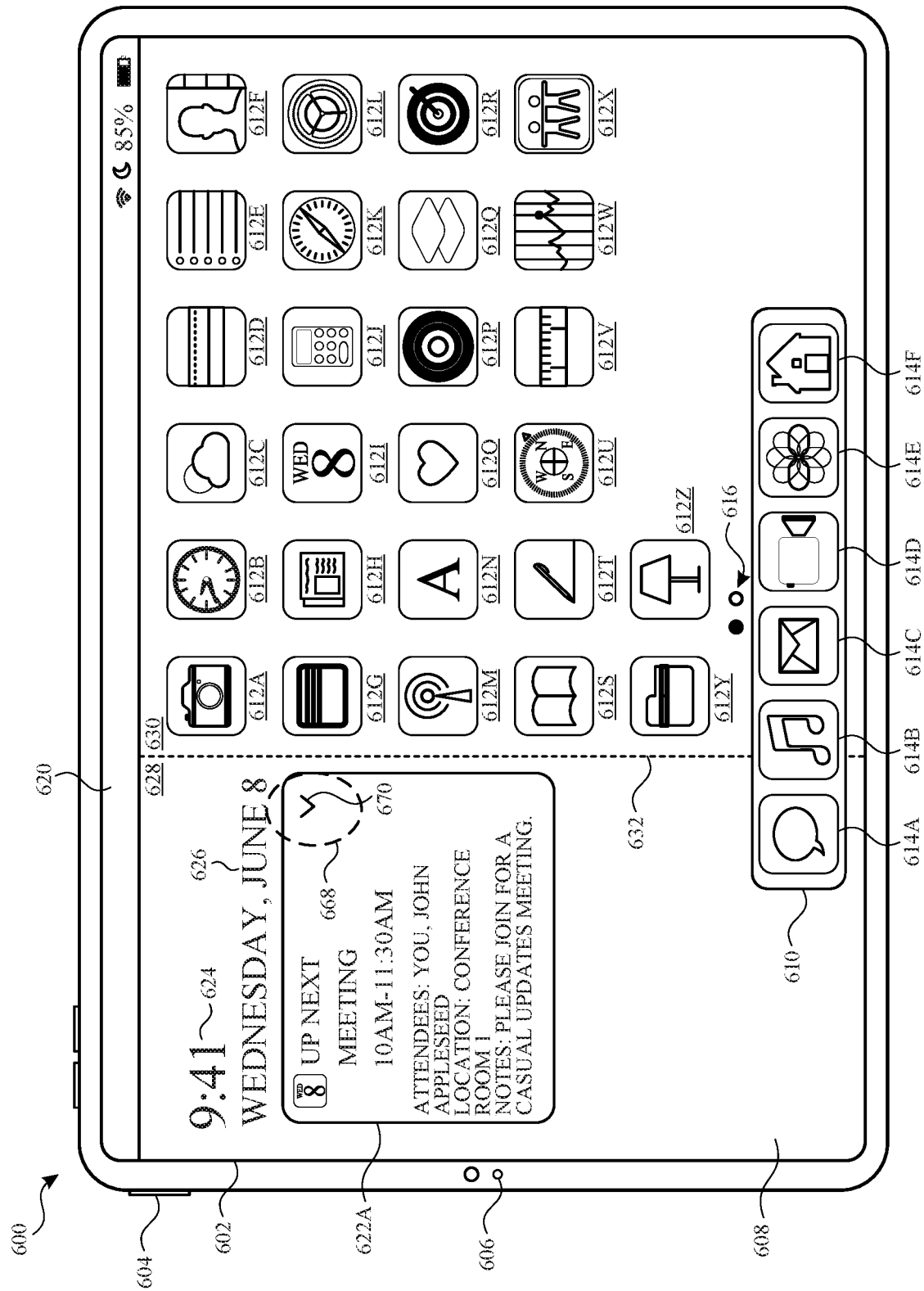

At FIG. 6K, electronic device 600 displays widget 622A in an expanded state. The user performs another tap gesture to collapse widget 622A back to its original state. As a result, while displaying the expanded version of widget 622A, electronic device 600 detects tap gesture 668 at collapse chevron 670. Upon detecting tap gesture 668, electronic device 600 collapses the expanded version of widget 622A, as shown in FIG. 6L.

It is noted that electronic device 600 displays a single widget (e.g., 622A) in FIG. 6L. In some embodiments, widget 622A is a "pinned" widget, as discussed above. In some embodiments, a user can scroll the widgets to see additional widgets that are in the "favorites" category, but not widgets that are in the "library" category.

Figure 6N:
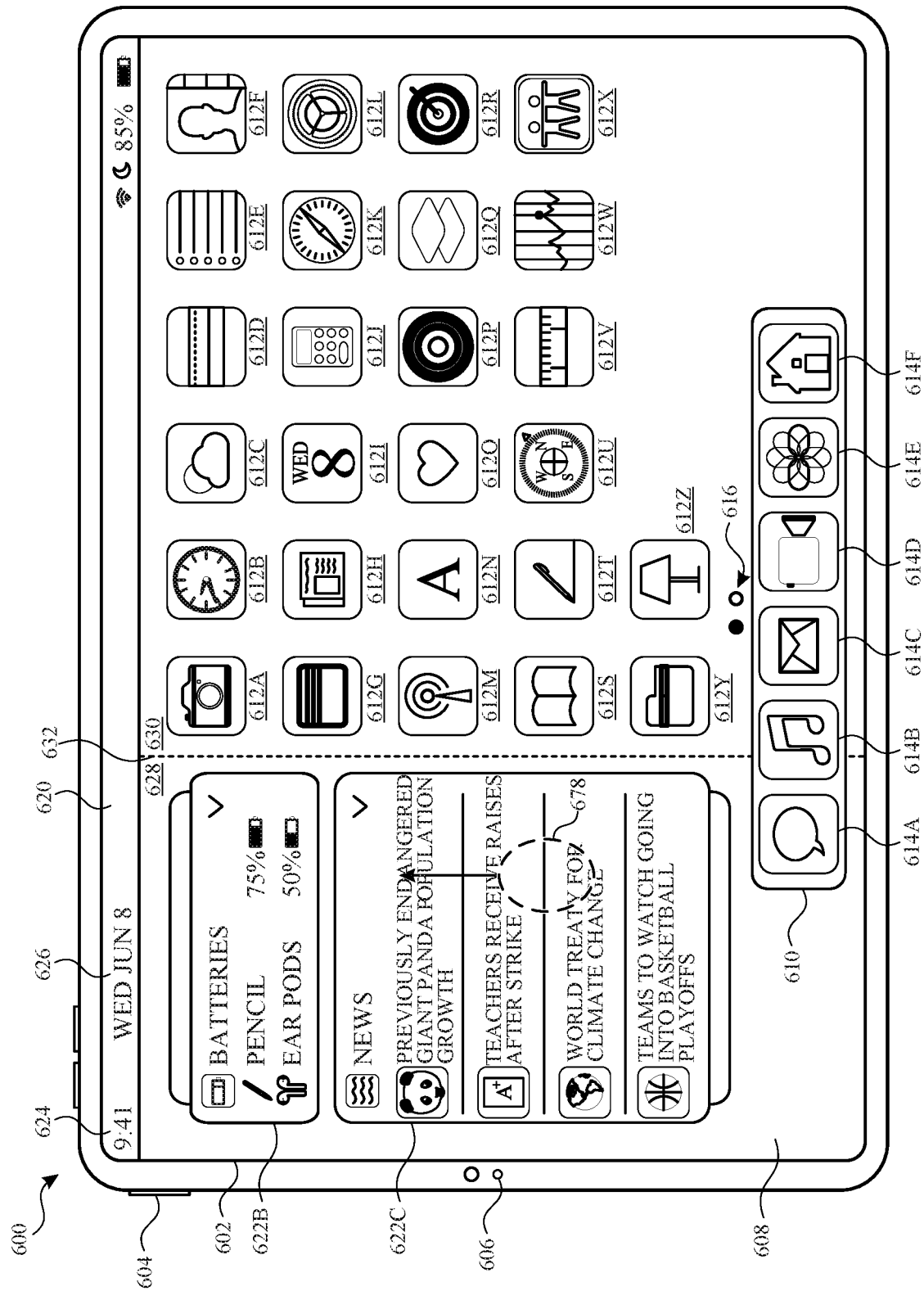
Figure 6P:
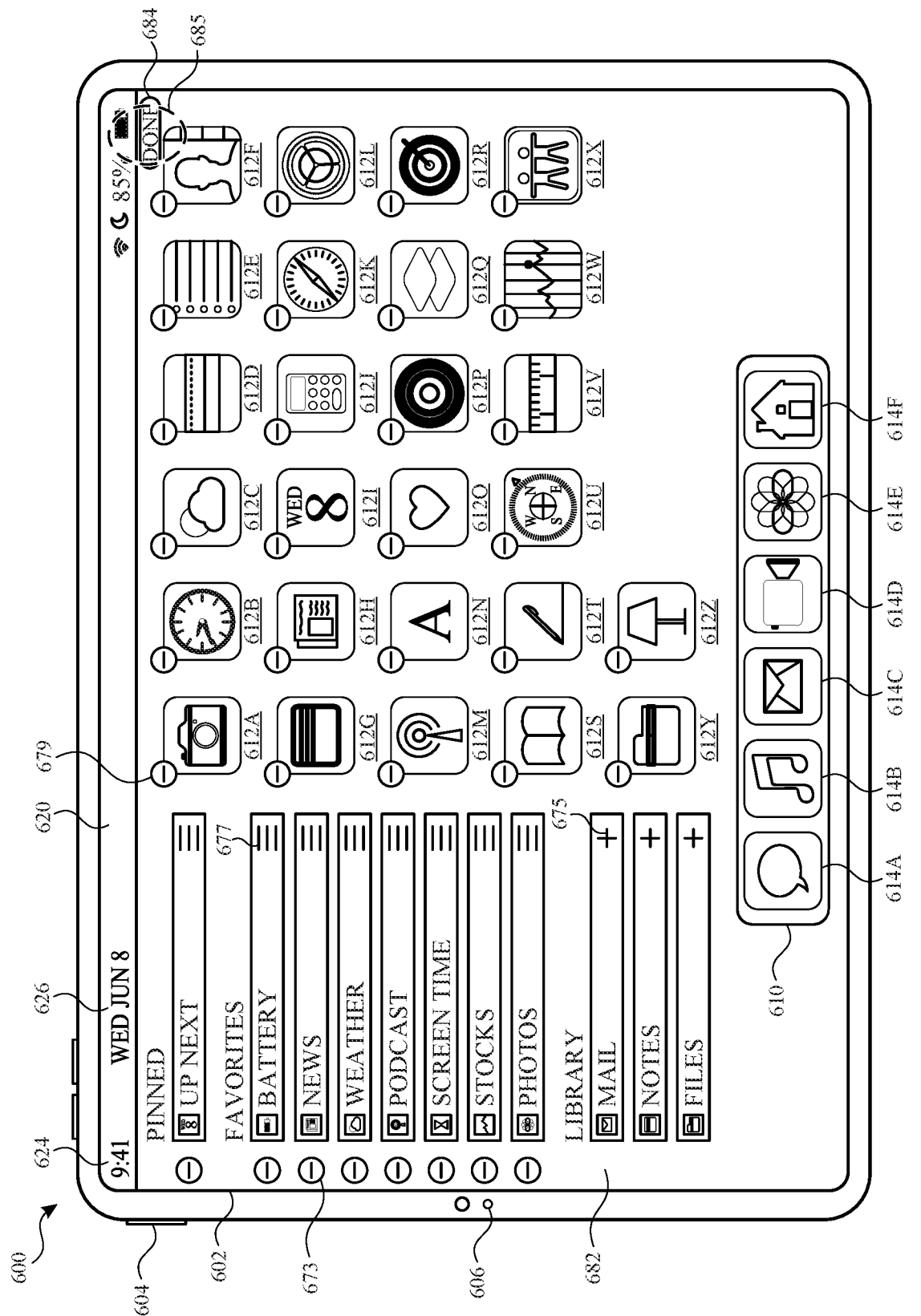

At FIG. 6L, the user scrolls the widgets to view additional widgets. As a result, while concurrently displaying widget 622A and app icons 612A-612Z, electronic device 600 detects scroll gesture 672 in widget region 628. Upon detecting scroll gesture 672, electronic device 600 determines the direction of the movement in scroll gesture 672. Upon determining that the direction of the movement in scroll gesture 672 is upward, electronic device 600 displays widgets 622B-622C, as shown in FIG. 6M. As depicted in FIG. 6P, widgets 622B-622C are the first two widgets listed in the "favorites" category. Accordingly, in some embodiments, electronic device 600 selects widgets 622B-622C for display upon determining that the direction of the movement in scroll gesture 672 is upward.

At FIG. 6M, the user performs a tap gesture to expand widget 622C and see additional information from the news application. As a result, while displaying widget 622C, electronic device 600 detects tap gesture 674 at expand chevron 676. In some embodiments, upon detecting tap gesture 674, electronic device 600 determines whether expansion criteria is met. In particular, electronic device 600 determines whether the widget selected for expansion can expand downward to a fully expanded size without causing a portion of the widget to fail to display. Upon determining that the expansion criteria is not met (e.g., a portion of the widget would fail to display due to expansion), electronic device 600 expands the size of widget 622C while also scrolling widgets 622A-622C upward to accommodate the additional space needed to display widget 622C at its expanded size. As a result of scrolling the widgets 622A-622C upward, electronic device 600 ceases to display widget 622A, while time indicator 624 and date indicator 626 moves from widget region 628 to status bar 620, as depicted in FIG. 6N. Notably, time indicator 624 and date indicator 626 become smaller when moved to the status bar 620.

At FIG. 6N, electronic device 600 displays an expanded version of widget 622C, which includes additional information from the news application. The user scrolls the widgets to see additional widgets. As a result, while concurrently displaying widgets 622B-622C and app icons 612A-612Z, electronic device 600 detects scroll gesture 678 in widget region 628. Upon detecting scroll gesture 678 (e.g., an upward swipe gesture), electronic device 600 determines the direction of the movement in scroll gesture 678. Upon determining that the direction of the movement in scroll gesture 678 is upward, electronic device 600 scrolls the widgets such that widgets 622B-622C cease to display and widgets 622F-622H are displayed, as depicted in FIG. 6O.

At FIG. 6O, the user has reached the end of the scrolled widgets, where edit button 680 is provided. As depicted in FIG. 6P, widgets 622F-622H are the last three widgets listed in the "favorites" category. Accordingly, in some embodiments, electronic device 600 selects widgets 622F-622H for display upon determining that the direction of the movement in scroll gesture 678 is upward.

Having reached the end of the scrolled widgets, the user performs a tap gesture on edit button 680 to enter an edit mode, as illustrated in FIG. 6O. As a result, while concurrently displaying widgets 622F-622H and app icons 612A-612Z, electronic device 600 detects tap gesture 681 at edit button 680. Upon detecting tap gesture 681, electronic device 600 displays edit user interface 682 and causes widgets and app icons to enter an edit mode, as shown in FIG. 6P. In some embodiments, instead of detecting tap gesture 681 at edit button 680, electronic device 600 detects long press gesture 683 at app icon 612H. In some embodiments, upon detecting long press gesture 683, electronic device 600 displays edit user interface 682 and causes widgets and app icons to enter an edit mode, as shown in FIG. 6P. Thus, a user can enter the edit mode by either tapping on edit button 680 or performing a long press on one of app icons 612A-612Z.

In the edit mode, the user can perform a variety of functions pertaining to the widgets or app icons. These functions can include reordering the widgets, moving widgets from one category (e.g., pinned, favorites, library) to another category, removing app icons from the home screen, and reorganizing app icons by changing the placement of app icons on the home screen. For example, in response to detecting a tap gesture at delete icon 673, electronic device 600 moves the widget (e.g., 622C) corresponding to delete icon 673 from the "favorites" category to the "library" category. As another example, in response to detecting a tap gesture at add icon 675, electronic device 600 moves the widget corresponding to add icon 675 from the "library" category to the "pinned" category or, in some embodiments, the "favorites" category. As yet another example, in response to detecting a drag gesture at icon 677, electronic device 600 moves the widget (e.g., 622B) corresponding to icon 677 to a different location in the list of widgets in accordance with the movement of the drag gesture. As yet another example, in response to detecting a tap gesture at icon 679, electronic device 600 initiates a process for deleting the application corresponding to app icon 612, thereby resulting in removal of app icon 612A from home screen 608.

At FIG. 6P, the user exits the edit mode by performing a tap gesture on done button 684. As a result, while displaying edit user interface 682, electronic device 600 detects tap gesture 685 at done button 684. Upon detecting tap gesture 685, electronic device 600 exits the edit mode and returns to the home screen, as depicted in FIG. 6Q.

Figure 6Q:
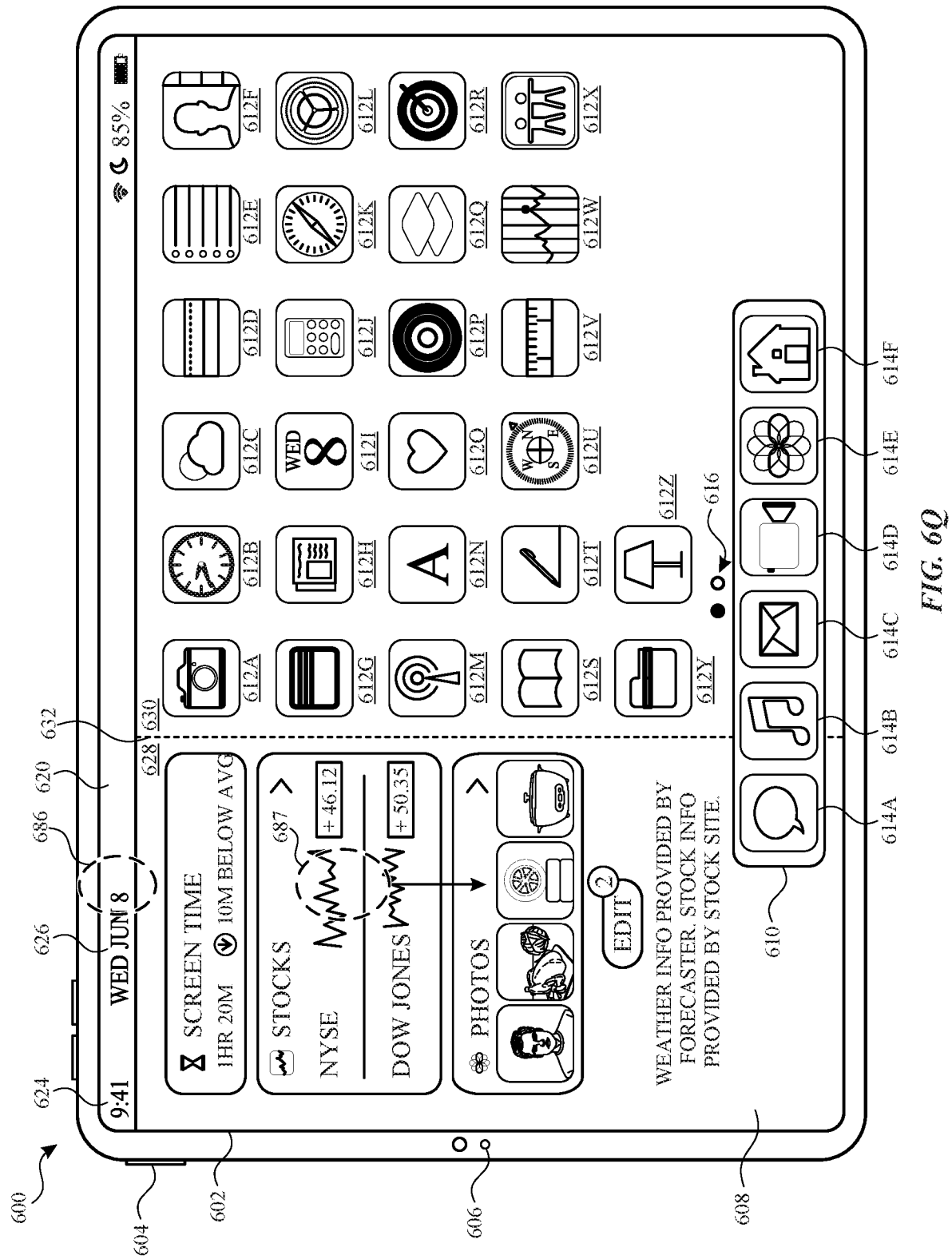
Figure 6R:
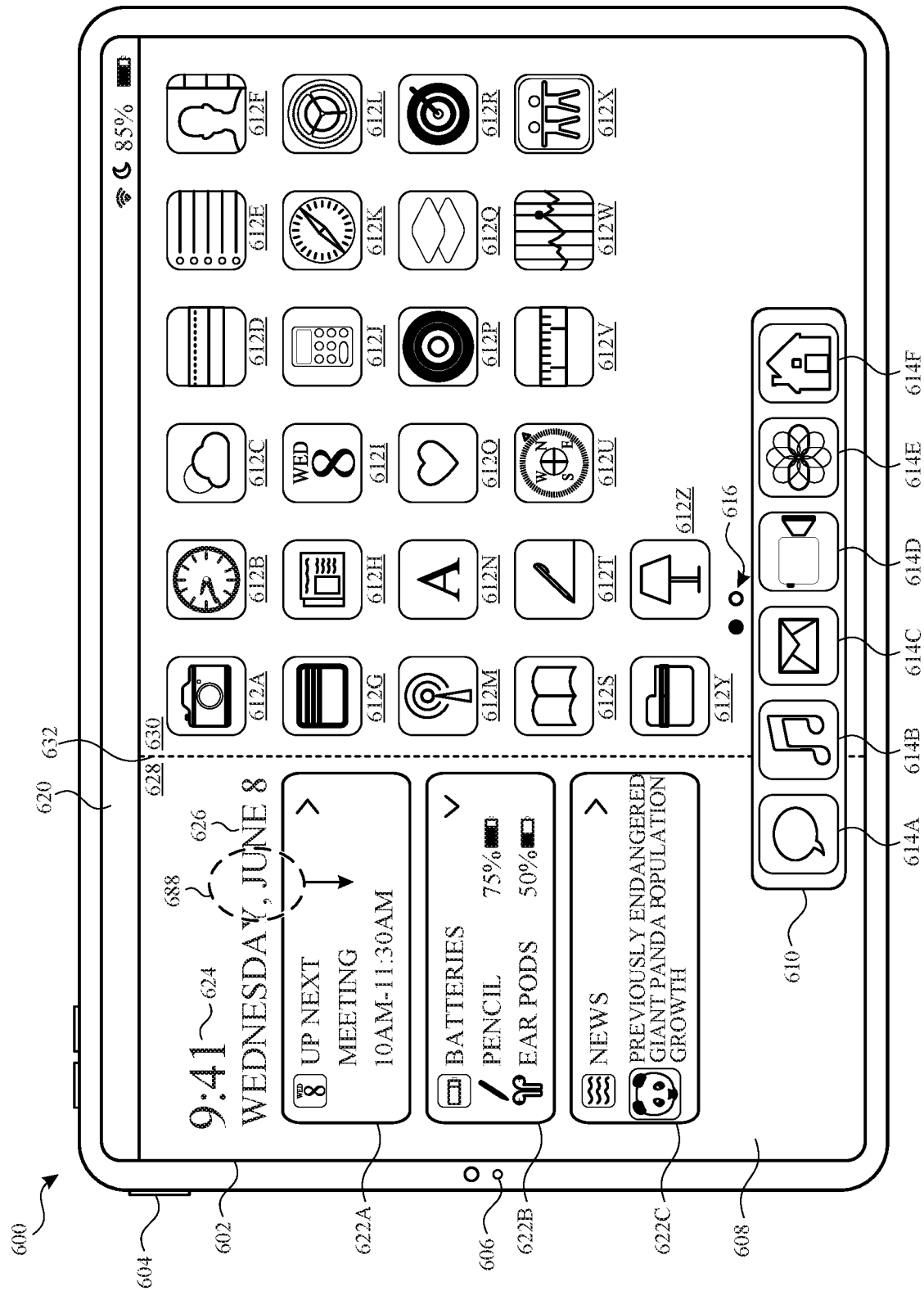

At FIG. 6Q, the user performs a tap gesture to navigate to the beginning of the scrolled widgets. As a result, while concurrently displaying widgets 622F-622H and app icons 612A-612Z, electronic device 600 detects tap gesture 686 at a location above widget region 628 and on status bar 620. Upon detecting tap gesture 686, electronic device 600 scrolls to the beginning of the scrolled widgets, as depicted in FIG. 6R. In some embodiments, instead of detecting tap gesture 686, electronic device 600 detects scroll gesture 687 with movement in a downward direction. In some embodiments, upon detecting scroll gesture 687, electronic device 600 scrolls the widgets downward. Thus, the user can navigate to the beginning of the scrolled widgets using one or more downward scroll gestures or by tapping on status bar 620 above the widgets.

At FIG. 6R, electronic device 600 displays the widgets at the beginning of the scrolled widgets, which includes widgets from the "pinned" category (e.g., 622A) and "favorites" category (e.g., 622B-622C). The user performs a scroll gesture to remove "favorites" widgets from being displayed. As a result, while concurrently displaying widgets 622A-622C and app icons 612A-612Z, electronic device 600 detects scroll gesture 688 in widget region 628. Upon detecting scroll gesture 688, electronic device 600 determines the direction of the movement in scroll gesture 688. Upon determining that the direction of the movement in scroll gesture 688 is downward, electronic device 600 maintains display of widget 622A while ceasing the display of widgets 622B-622C, as depicted in FIG. 6S. In some embodiments, while only pinned widget(s) (e.g., 622A) are displayed, electronic device detects a scroll gesture (e.g., a downward swipe gesture) in widget region 628 with movement in the downward direction. In some embodiments, upon detecting the scroll gesture, electronic device displays a search bar (e.g., 658 in FIG. 6I) in widget region 628, where the search bar enables a user to search the contents of electronic device 600 and/or perform a web search.

Figure 6T:
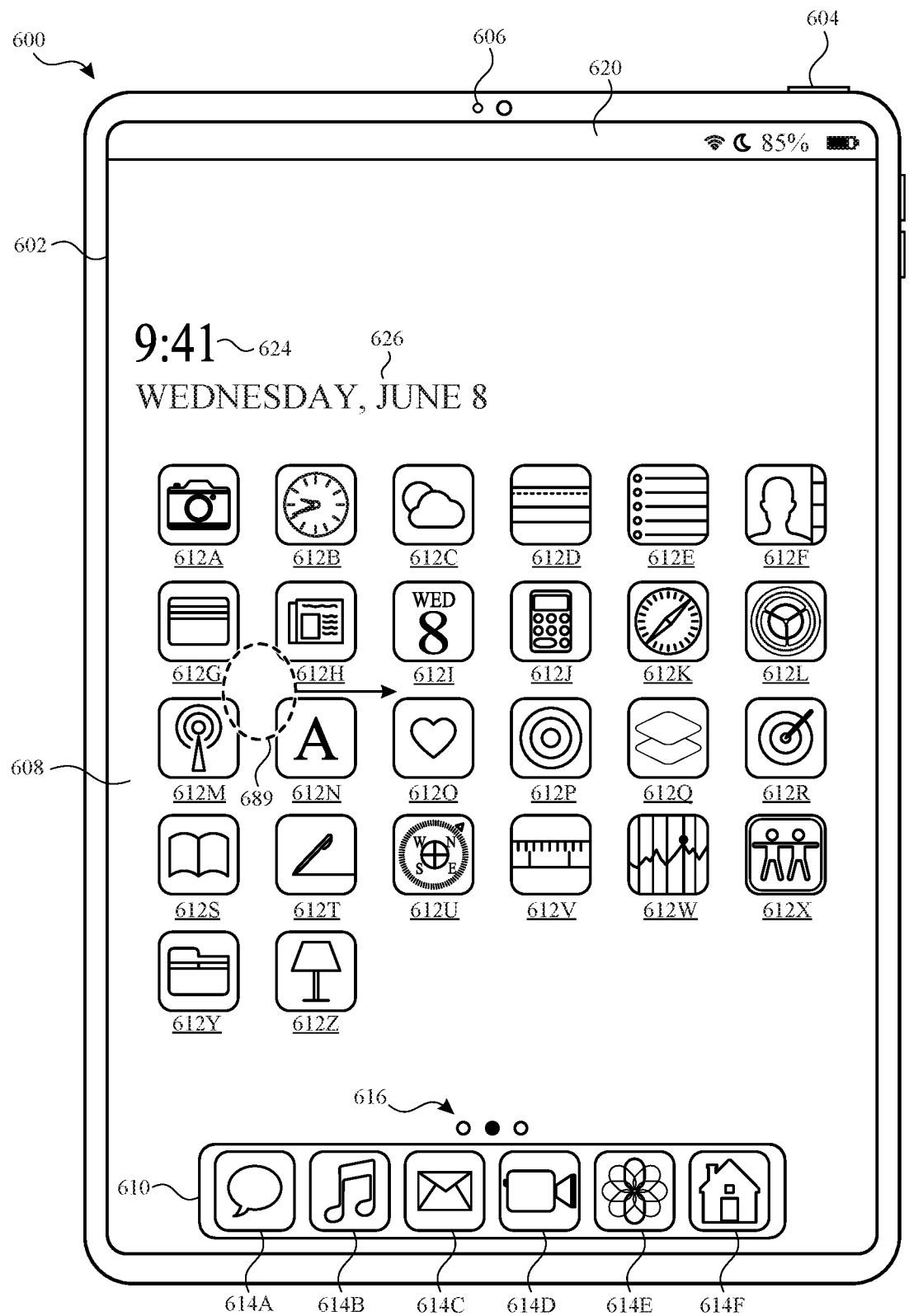

At FIG. 6S, electronic device 600 is operated by the user while the device is in a landscape orientation (and thus providing user interfaces for a landscape view). The user then rotates electronic device 600 clockwise (with respect to the user) so the user can use the device in a portrait orientation. As a result, while concurrently displaying widget 622A and app icons 612A-612Z, electronic device 600 detects a change in orientation of the device to a portrait orientation (and thus provides user interfaces for a portrait view). Upon detecting the change in orientation, electronic device 600 removes widgets from home screen 608 and reverts to displaying the first page of app icons. As a result, electronic device 600 ceases to display widget 622A but continues to display app icons 612A-612Z, as shown in FIG. 6T. Due to the change in orientation of the device, app icons 612A-612Z are displayed in new locations on display 602 and in new orientations relative to the device.

At FIG. 6T, electronic device 600 displays app icons 612A-612Z while the device is in a portrait orientation. While displaying app icons 612A-612Z without widget(s), electronic device 600 detects swipe gesture 689 in a region corresponding to (e.g., occupied by) app icons 612A-612Z. Upon detecting swipe gesture 689, electronic device 600 determines the direction of the movement in swipe gesture 689. Upon determining that the direction of the movement in swipe gesture 689 is left-to-right, electronic device 600 replaces display of the first page of app icons with display of the page of widget(s). As a result, electronic device 600 replaces display of app icons 612A-612Z with display of widgets 622A-622G, as depicted in FIG. 6U.

Figure 6U:
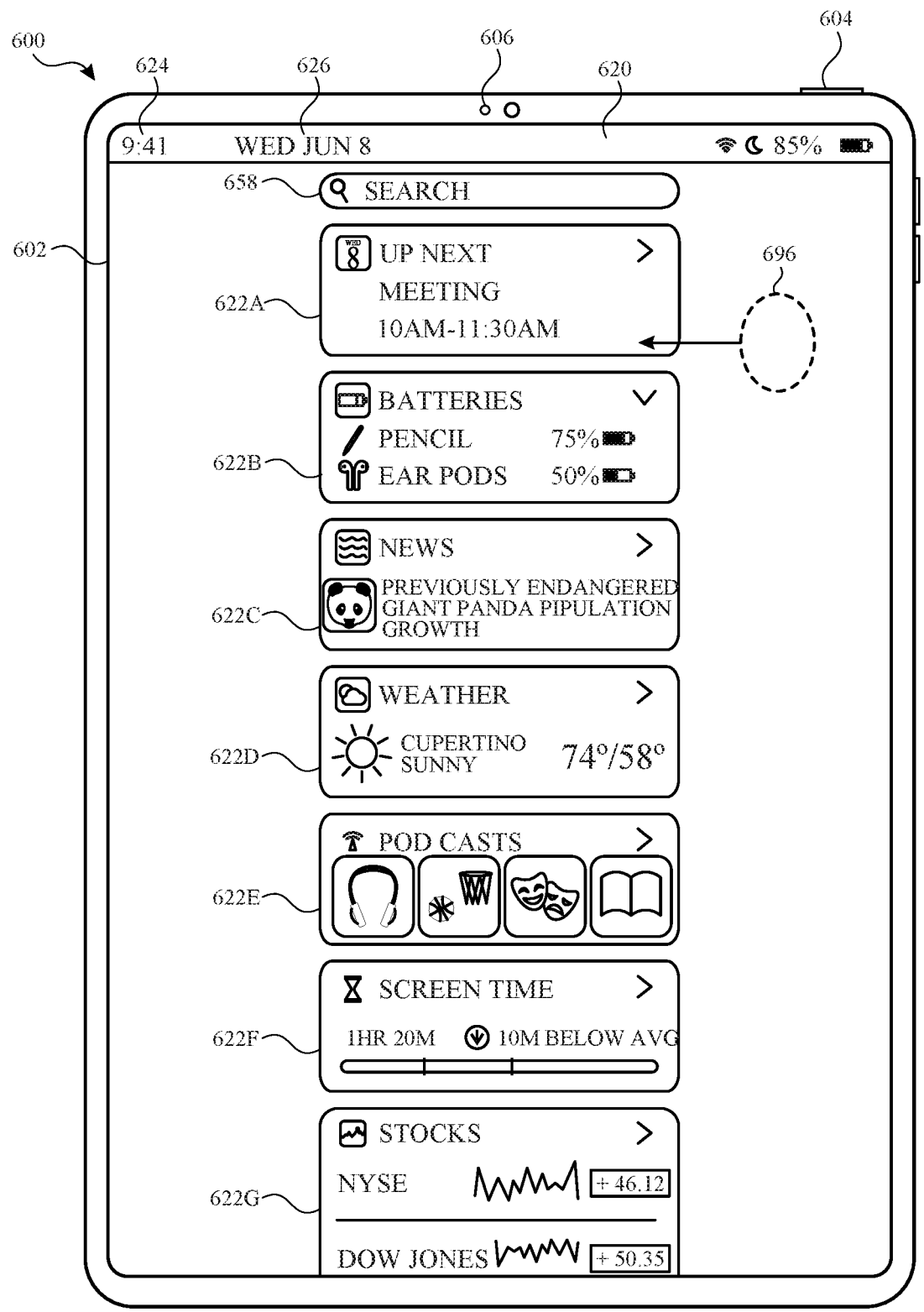
Figure 6V:
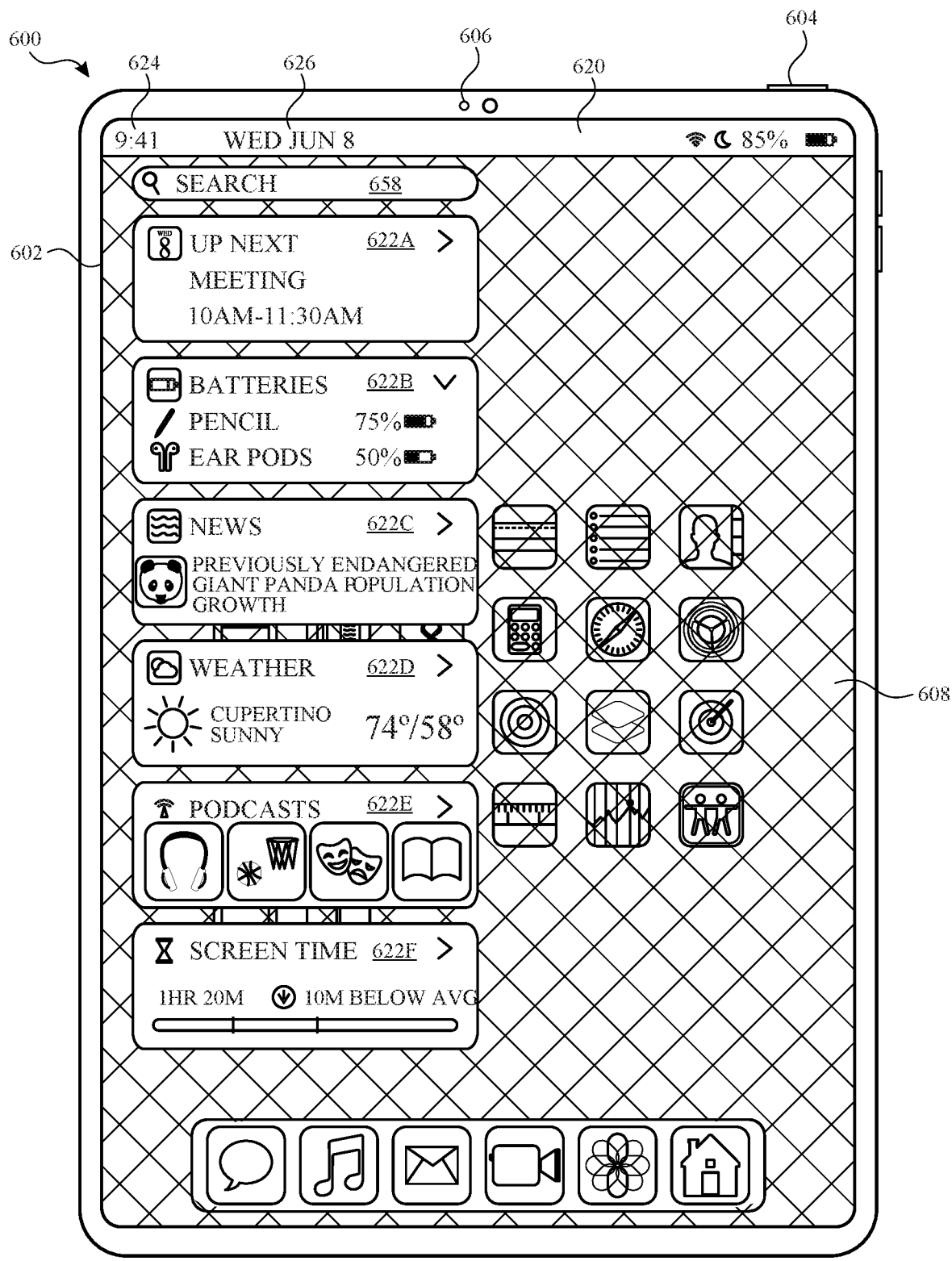

FIG. 6V depicts an alternative embodiment for displaying widgets while the device is in a portrait orientation. Referring back to FIG. 6T, electronic device 600 detects swipe gesture 689 in a region corresponding to app icons 612A-612Z while the device is in a portrait orientation. Upon determining that the direction of the movement in swipe gesture 689 is left-to-right, electronic device 600 replaces display of the first page of app icons with display of the page of widget(s), as depicted in FIG. 6U. In some embodiments, instead of replacing display of the first page of app icons, electronic device 600 overlays the display of the widget(s) on top of the first page of app icons, as depicted in FIG. 6V. As a result, electronic device 600 displays widgets 622A-622F overlaid on top of app icons 612A-612Z. In some embodiments, displaying the widgets on top of the app icons includes reducing the displayed size of app icons 612A-612Z.

At FIG. 6U, the user navigates back to the first page of app icons via a right-to-left swipe gesture. As a result, electronic device 600 detects swipe gesture 696 and, in response, replaces display of the page of widget(s) with the first page of app icons, as depicted in FIG. 6W.

Figure 6W:
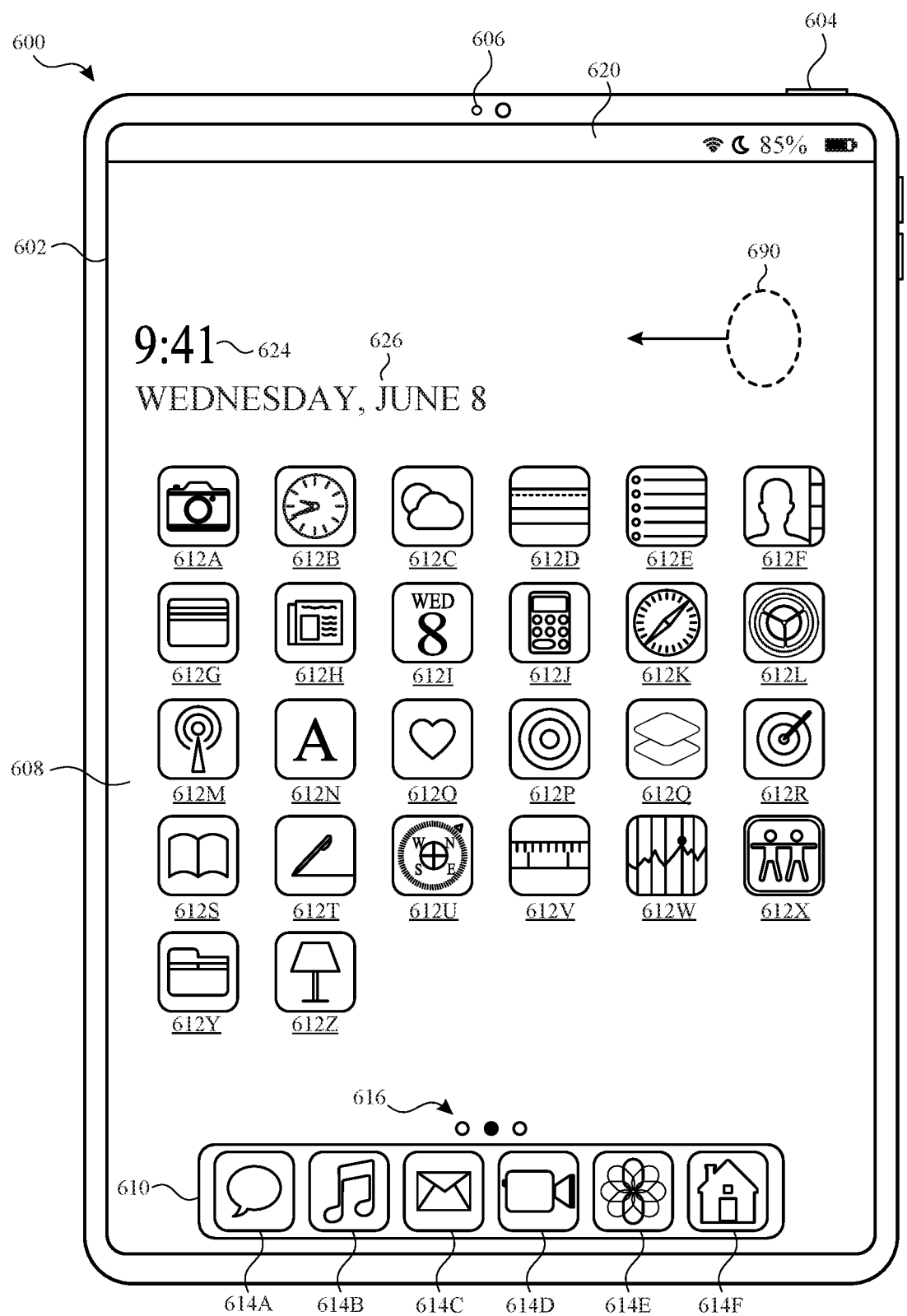
Figure 6X:
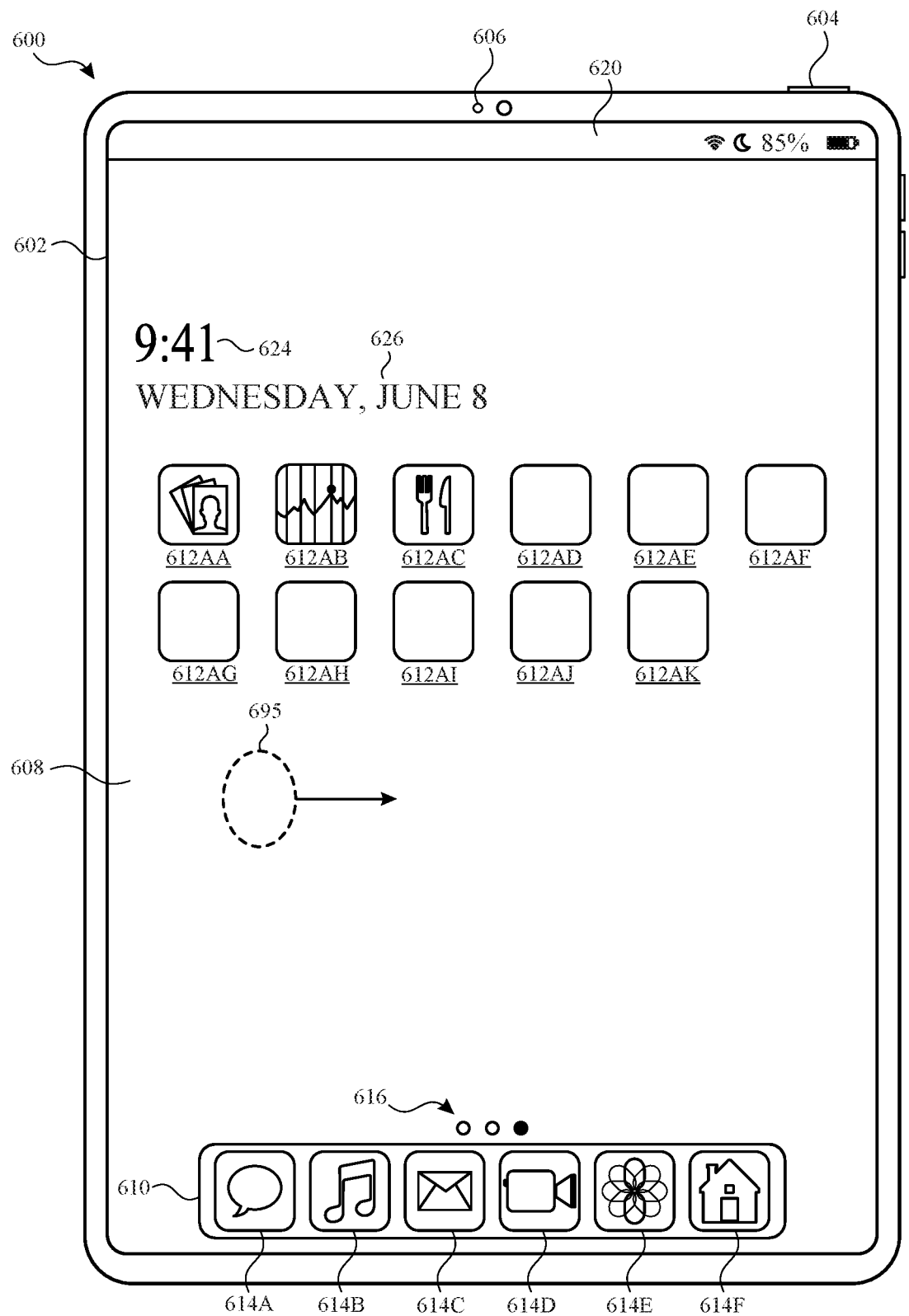

At FIG. 6W, the user performs a swipe gesture to navigate to the second page of app icons. As a result, while displaying app icons 612A-612Z without widget(s), electronic device 600 detects swipe gesture 690 in a region corresponding to (e.g., occupied by) app icons 612A-612Z. Upon detecting swipe gesture 690, electronic device 600 determines the direction of the movement in swipe gesture 690. Upon determining that the direction of the movement in swipe gesture 690 is right-to-left, electronic device 600 replaces display of the first page of app icons with the second page of app icons. As a result, the display of app icons 612A-612Z is replaced with the display of app icons 612AA-612AK, as shown in FIG. 6X. At FIG. 6X, the user then navigates back to the first page of app icons by performing a left-to-right swipe gesture. As a result, electronic device 600 detects swipe gesture 695, and in response, replaces display of the second page of app icons with the first page of app icons, as shown in FIG. 6W.

At FIG. 6W, electronic device 600 is operated by the user while the device is in a portrait orientation. The user rotates the device counterclockwise to return the device back to a landscape orientation. As a result, while displaying app icons 612A-612Z without widget(s), electronic device 600 detects a change in orientation of the device from portrait orientation to landscape orientation. Upon detecting the change in orientation, electronic device 600 again merges the page of widget(s) onto home screen 608, as discussed above with respect to FIG. 6B-6C. As a result, electronic device 600 concurrently displays widget 622A and app icons 612A-612Z, as depicted in FIG. 6Y. Thus, the previous state of the home screen in the landscape orientation persists despite the intervening display of the home screen in a portrait orientation. In some embodiments, instead of concurrently displaying widget 622A and app icons 612A-612Z upon detecting the change in orientation, electronic device 600 returns to the home screen depicted in FIG. 6A. Specifically, electronic device 600 displays app icons 612A-612Z without widget 622A.

Figure 6Z:
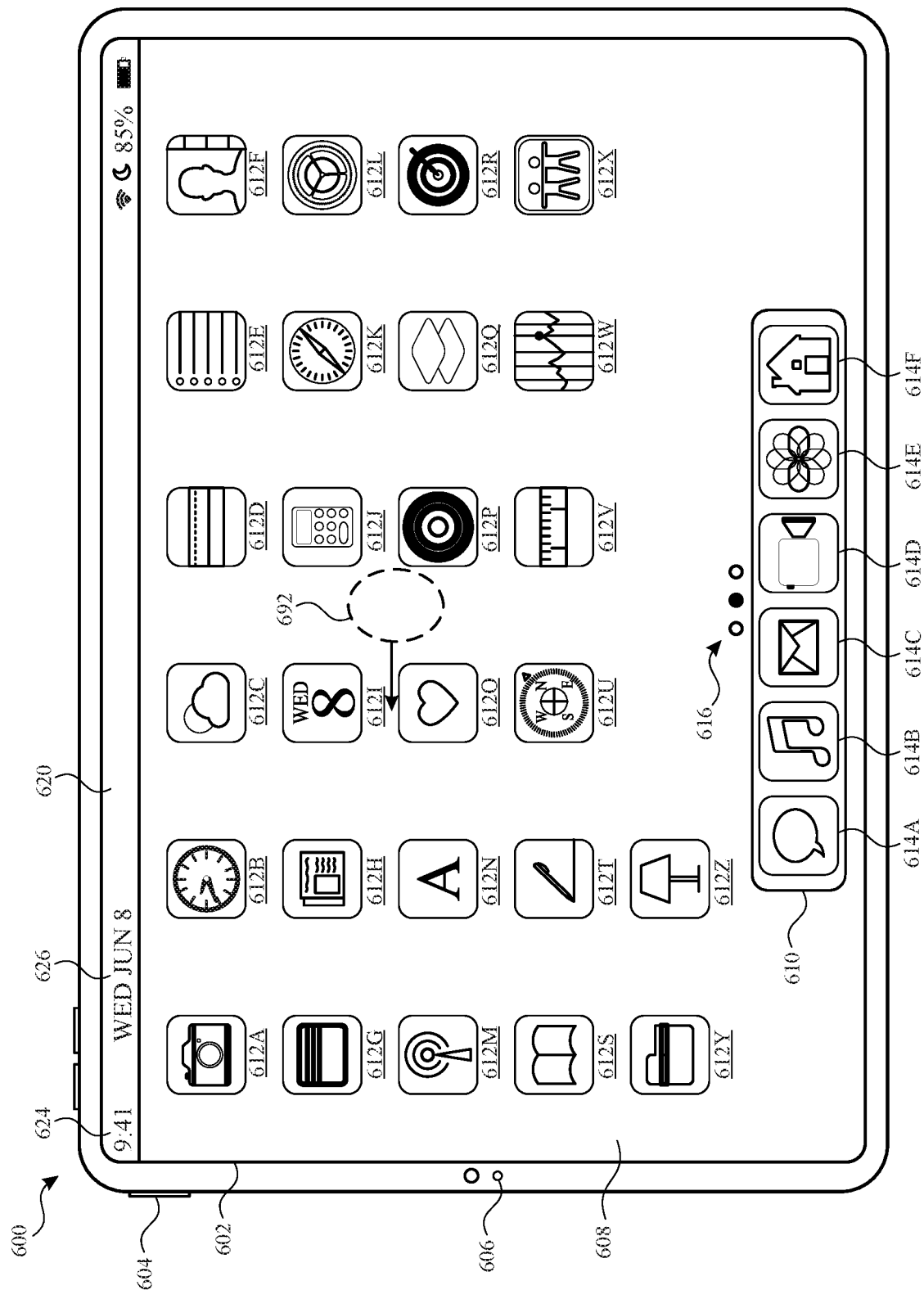
Figure 6A:
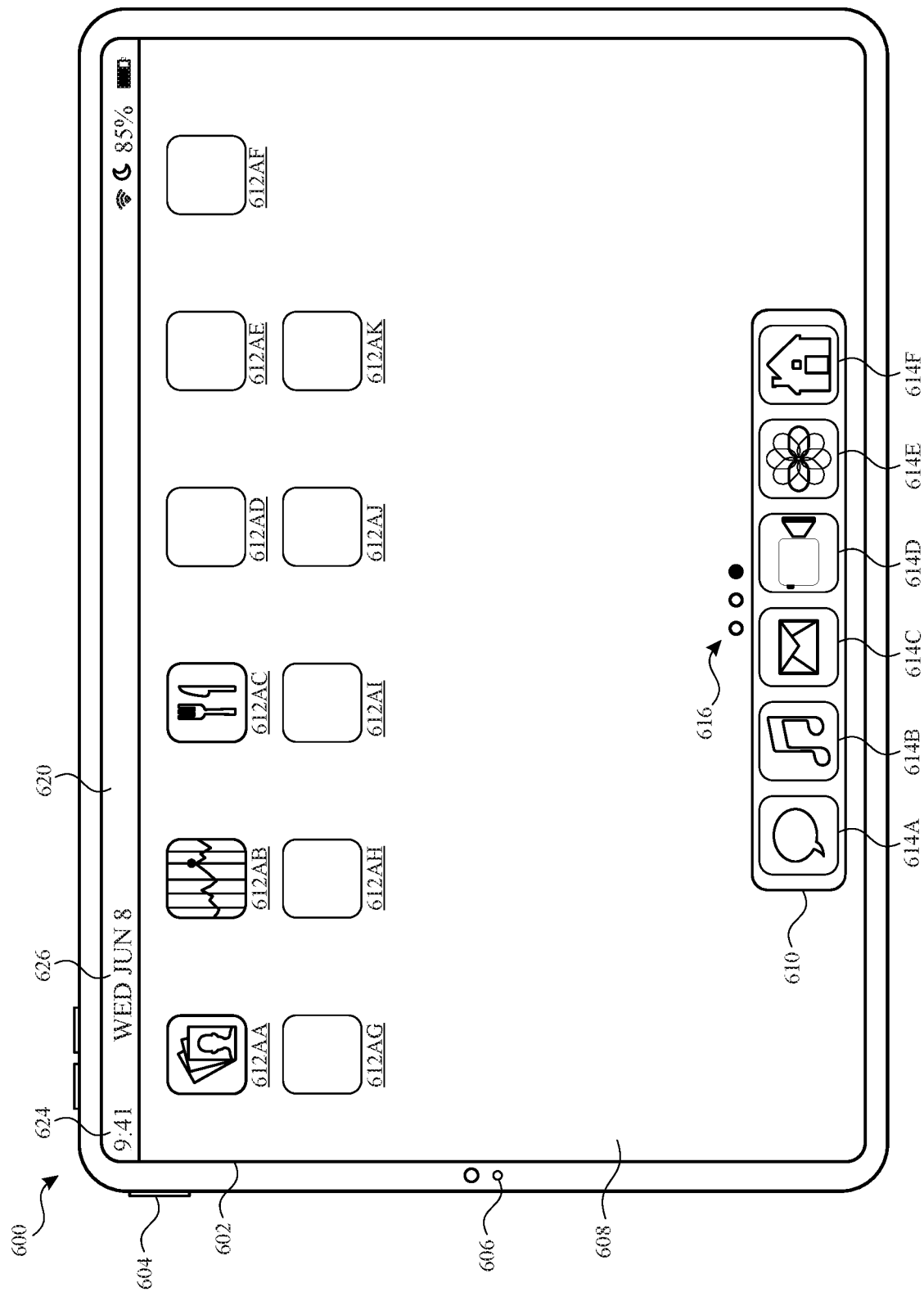
Figure 6A:
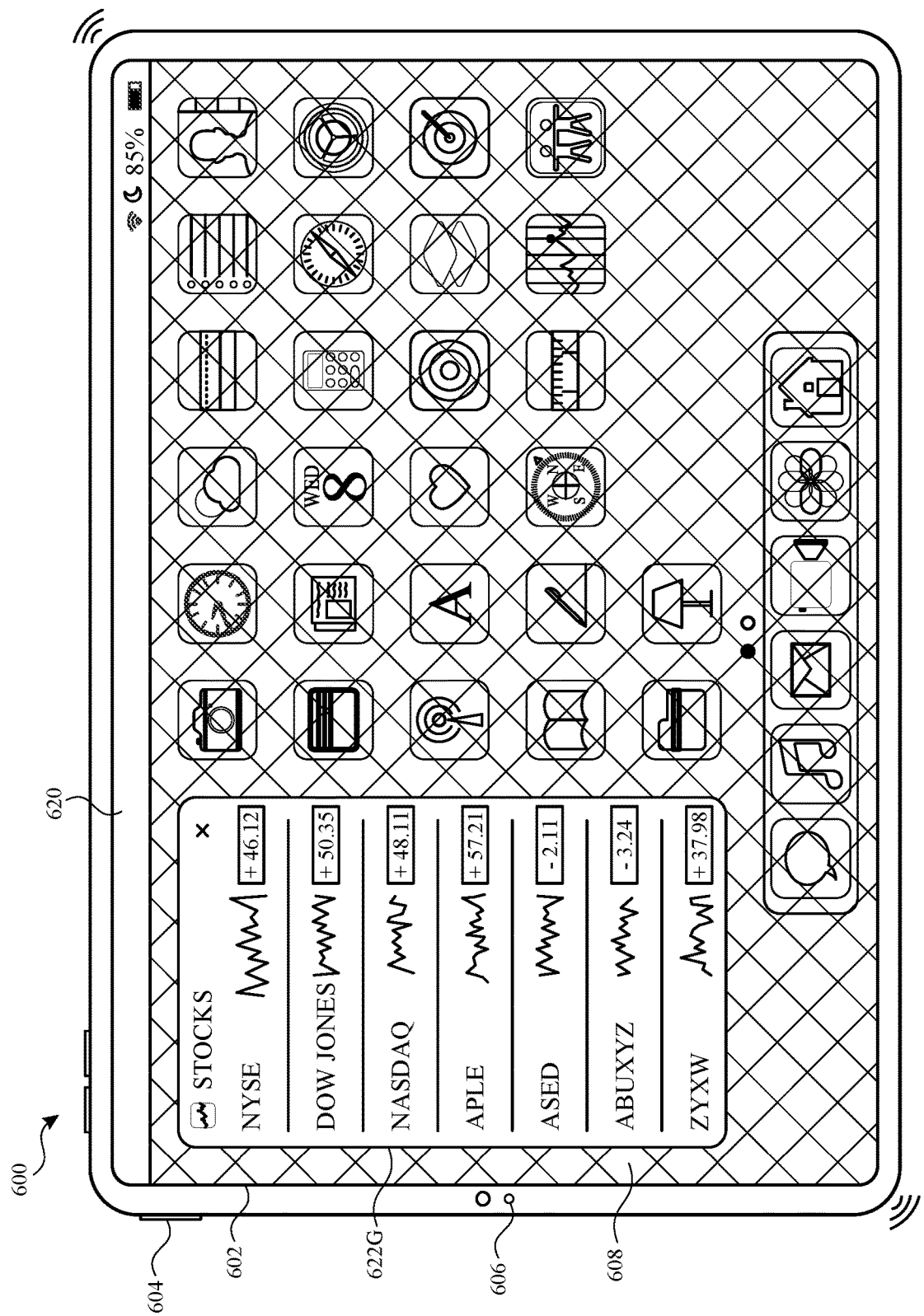

At FIG. 6Y, the user performs a swipe gesture to remove the widgets from the home screen. As a result, while concurrently displaying widget 622A and app icons 612A-612Z on home screen 608, electronic device 600 detects swipe gesture 691 with movement in the right-to-left direction. In some embodiments, upon detecting swipe gesture 691, electronic device 600 determines the region in which swipe gesture 691 was detected. Upon determining that swipe gesture 691 was detected in widget region 628, electronic device 600 collapses widget region 628 and removes widgets from home screen 608. As a result, electronic device 600 ceases display of widget 622A, and expands the region that app icons 612A-612Z occupy, as depicted in FIG. 6Z. As a result, the spacing between the app icons in app icons 612A-612Z increases.

It is noted that the above described result in FIG. 6Z occurs as a result of detecting a right-to-left swipe gesture in widget region 628. For the result that occurs due to detecting a right-to-left swipe gesture in app region 630, refer to the description above with respect to FIGS. 6E-6F. For the result that occurs due to detecting a left-to-right swipe gesture in widget region 628, refer to the description below with respect to FIG. 6AC.

At FIG. 6Z, electronic device 600 displays the first page of app icons without widget(s). The user performs a swipe gesture to navigate to the second page of app icons. As a result, while displaying app icons 612A-612Z without widget(s), electronic device 600 detects swipe gesture 692 in a region corresponding to (e.g., occupied by) app icons 612A-612Z. Upon detecting swipe gesture 692, electronic device 600 determines the direction of the movement in swipe gesture 692. Upon determining that the direction of the movement in swipe gesture 692 is right-to-left, electronic device 600 replaces display of the first page of app icons with the second page of app icons. As a result, display of app icons 612A-612Z is replaced with display of app icons 612AA-612AK, as shown in FIG. 6AA.

FIG. 6AB depicts an alternative embodiment for displaying a widget at an expanded size. With reference to FIG. 6O, electronic device 600 detects long press gesture 693 at widget 622G. Upon detecting long press gesture 693, electronic device 600 displays an expanded version of widget 622G, as illustrated in FIG. 6AB. In particular, electronic device 600 expands the size of widget 622G and displays additional information from the stock application. Further, upon detecting long press gesture 693, electronic device 600 blurs a portion of display 602 outside of the expanded version of widget 622G, as indicated by the crosshatching in FIG. 6AB, and generates a tactile output (e.g., haptic feedback). In some embodiments, the app icons also shrink in size upon detecting long press gesture 693. In some embodiments, a hard press gesture (e.g., a press that exceeds a threshold amount of contact intensity) triggers the same result as described above with respect to long press gesture 693.

FIG. 6AC illustrates the displayed result of detecting a swipe gesture with movement in the left-to-right direction while concurrently displaying widget(s) and the first page of app icons. With reference to FIG. 6C, electronic device 600 concurrently displays widget 622A and the first page of app icons. In some embodiments, electronic device 600 detects a swipe gesture in widget region 628 or app region 630 with movement in the left-to-right direction. Upon detecting the swipe gesture with movement in the left-to-right direction, electronic device 600 provides an indication that no content is available to the left of the currently displayed content. In particular, electronic device 600 shifts the display of widget 622A and app icons 612A-612Z to the right as shown in FIG. 6AC, followed by immediately shifting the display of widget 622A and app icons 612A-612Z back to the left to return widget 622A and app icons 612A-612Z back to their respective locations in FIG. 6C. Moreover, upon detecting the swipe gesture with movement in the left-to-right direction, electronic device 600 displays grabber indicator 694, which provides an indication to the user that widget region 628 can be interacted with via user gestures. For example, as illustrated in FIGS. 6X-6Y, the user can collapse widget region 628, thereby causing the widget(s) to cease to display.

FIGS. 7A-7B are a flow diagram illustrating a method for displaying widgets using an electronic device in accordance with some embodiments. Method 700 is performed at an electronic device (e.g., 100, 300, 500, 600) with a display device (e.g., 602). Some operations in method 700 are, optionally, combined, the orders of some operations are, optionally, changed, and some operations are, optionally, omitted.

As described below, method 700 provides an intuitive way for displaying widgets. The method reduces the cognitive burden on a user for displaying widgets, thereby creating a more efficient human-machine interface. For battery-operated computing devices, enabling a user to display widgets faster and more efficiently conserves power and increases the time between battery charges.

An electronic device (e.g., 100, 300, 500, 700) displays (702), via the display device (e.g., 602), a first plurality of application icons (e.g., 612A-612Z) (e.g., a plurality of icons on a first page) without displaying a first set of one or more user interface elements (e.g., 622A) (e.g., without displaying widgets), wherein the application icons are selectable to display application user interfaces (e.g., 636) for corresponding applications (e.g., by the device detecting, on a touch-sensitive surface (e.g., of display 602), a tap gesture (e.g., 634) at a location (on the touch-sensitive surface) corresponding to a displayed location of the respective application icon (e.g., 612I)). In some embodiments, the first plurality of application icons (e.g., 612A-612Z) are displayed on a home screen (e.g., 608). In some embodiments, the first plurality of application icons are displayed without displaying a second plurality of application icons (e.g., 612AA-612AK) that are different from the first plurality of application icons.

While displaying, via the display device (e.g., 602), the first plurality of application icons (e.g., 612A-612Z), the electronic device detects (704) a first user input (e.g., 618, 692) (e.g., a user gesture, swipe, drag). In some embodiments, the first user input is detected in a region occupied by the first plurality of application icons.

In response (706) to detecting the first user input (e.g., 618, 692): in accordance (708) with a determination that the first user input includes movement in a first direction (e.g., left, right, up, down) (e.g., the direction is relative to the displayed user interface (e.g., 608)) (e.g., a determination that a first set of criteria is met, including a requirement that the first user input includes movement in a first direction and, optionally, that the orientation of the electronic device is in a first orientation): the electronic device ceases (710) display of the first plurality of application icons (e.g., 612A-612Z) (e.g., by sliding the first plurality of application icons off the display device (e.g., 602) in the first direction), and displays (712) (e.g., initially displays), via the display device, a second plurality of application icons (e.g., 612AA-612AK) that are different from the first plurality of application icons (e.g., without displaying widget(s) (e.g., 622A-622H) (e.g., user interface elements)), wherein the application icons are selectable to display application user interfaces for corresponding applications. Thus, the technique replaces display of the first plurality of application icons (e.g., 612A-612Z) with display of the second plurality of application icons (e.g., 612AA-612AK). In some embodiments, the determination is made by the electronic device. In some embodiments, the determination is made by a device external to the electronic device.

In response (706) to detecting the first user input (e.g., 618, 692): in accordance (714) with a determination that the first user input includes movement in a second direction (e.g., left, right, up, down) (e.g., the direction is relative to the displayed user interface (e.g., 608)) that is different from (e.g., substantially opposite to) the first direction (e.g., a determination that a second set of criteria is met, including a requirement that the first user input includes movement in a second direction and, optionally, that the orientation of the electronic device is in the first orientation): the electronic device modifies (716) (e.g., resizes) display of the first plurality of application icons (e.g., 612A-612Z) to change (e.g., to reduce) a distance between (e.g., the centers of, the edges of) a first application icon (e.g., 612A) of the first plurality of application icons and a second application icon (e.g., 612B) of the first plurality of application icons, and concurrently displays (718), via the display device, the modified first plurality of application icons (e.g., 612A-612Z) and the first set of one or more user interface elements (e.g., 622A) (e.g., without concurrently displaying the second plurality of application icons (e.g., 612AA-612AK)). Modifying display of the first plurality of application icons to change a distance between the first application icon and the second application icon enables concurrent display of the first plurality of application icons and the first set of one or more user interface elements. This is in contrast to ceasing display of the first plurality of application icons, which would necessitate additional user inputs to access the first plurality of application icons. Accordingly, modifying display of the first plurality of application icons to allow for concurrent display reduces the number of inputs needed for performing operations pertaining to the application icons and the user interface elements. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the distance that changes between the application icons (e.g., 612A-612Z) is a horizontal distance. In some embodiments, the vertical distance between the first application icon and the second application icon does not change. In some embodiments, horizontal and vertical is relative to the displayed user interface (e.g., 608) or the device itself. In some embodiments, a user interface element (e.g., 622A-622H) (e.g., of the one or more user interface elements includes displayed content related to or corresponding to an application. In some embodiments, the modified first plurality of application icons (e.g., 612A-612Z) are displayed adjacent to the first set of one or more user interface elements (e.g., 622A). In some embodiments, the modified first plurality of application icons and the first set of one or more user interface elements are displayed on the home screen (e.g., 608). In some embodiments, the first set of one or more user interface elements includes only the pinned user interface elements (e.g., 622A) (e.g., user interface elements that are designated as a special category) regardless of the last state at which the user interface elements were displayed. In some embodiments, the first set of one or more user interface elements are selected for display based on the last state. That is, the device displays one or more of (e.g., all of) the user interface elements (e.g., 622A-622H) that were displayed during the last state. In some embodiments, the determination is made by the electronic device. In some embodiments, the determination is made by a device external to the electronic device.

In some embodiments, while concurrently displaying, via the display device (e.g., 602), the modified first plurality of application icons (e.g., 612A-612Z) and the first set of one or more user interface elements (e.g., 622A), the electronic device detects a second user input (e.g., 634, 638) (e.g., a user gesture, tap). In some embodiments, in response to detecting the second user input: in accordance with a determination that the second user input corresponds to selection of an application icon (e.g., 612I) of the modified first plurality of application icons, the electronic device displays (e.g., initially displays), via the display device, a user interface (e.g., 636) of an application corresponding to the selected application icon.

In some embodiments, displaying the user interface (e.g., 636) of an application corresponding to the selected application icon (e.g., 612I) includes replacing concurrent display of the modified first plurality of application icons (e.g., 612A-612Z) and the first set of one or more user interface elements (e.g., 622A) with display of the user interface of the application corresponding to the selected application icon. In some embodiments, displaying the user interface of the application occurs as a result of launching the application corresponding to the selected application icon.

In some embodiments, the selected application icon (e.g., 612I) and a user interface element (e.g., 622A) of the first set of one or more user interface elements correspond to the same application. In some embodiments, in response to detecting the second user input (e.g., 634, 638): in accordance with a determination that the second user input corresponds to selection of the user interface element of the first set of one or more user interface elements (e.g., an app icon (e.g., 640) corresponding to the user interface element), the electronic device displays (e.g., initially displays), via the display device (e.g., 602), a user interface (e.g., 636) of an application corresponding to the selected user interface element, wherein the application corresponding to the selected user interface element is the same as the application corresponding to the selected application icon.

In some embodiments, the user interface (e.g., 636) of the application corresponding to the selected user interface element (e.g., 622A) is the same user interface as the user interface of the application corresponding to the selected application icon (e.g., 612I). In some embodiments, displaying the user interface (e.g., 636) of the application corresponding to the selected user interface element (e.g., 622A) includes replacing concurrent display of the modified first plurality of application icons (e.g., 612A-612Z) and the first set of one or more user interface elements (e.g., 622A) with display of the user interface of the application corresponding to the selected user interface element. In some embodiments, displaying the user interface (e.g., 636) of the application occurs as a result of launching the application corresponding to the selected user interface element (e.g., 622A). In some embodiments, the user interface element (e.g., 622A) includes displayed information received from an application corresponding to the user interface element.

In some embodiments, while displaying, via the display device (e.g., 602), the user interface (e.g., 636) of the application corresponding to the selected application icon, the electronic device detects a user request (e.g., 642) to navigate to a home screen (e.g., 608) (e.g., a user input (e.g., swipe in the up direction) starting at a location proximate to the bottom edge of the device or activation of a physical or virtual home button). In some embodiments, the home screen (e.g., 6-608) includes the first plurality of application icons (e.g., 612A-612Z). In some embodiments, the user interface (e.g., 636) of the application corresponding to the selected application is displayed without displaying the modified first plurality of application icons (e.g., 612A-612Z) and/or the first set of one or more user interface elements (e.g., 622A).

In response to detecting the user request (e.g., 642) to navigate to the home screen, the electronic device replaces display of the user interface (e.g., 636) of the application corresponding to the selected application with display of the home screen (e.g., 608), wherein displaying the home screen includes concurrently displaying, via the display device, the modified first plurality of application icons (e.g., 612A-612Z) and the first set of one or more user interface elements (e.g., 622A). Concurrently displaying the first plurality of application icons and the first set of one or more user interface elements after having displayed a user interface of an application enables a user to quickly regain access to the user interface elements. This is in contrast to ceasing display of the first set of one or more user interface elements after having displayed the user interface of the application, which would necessitate additional user inputs to access the user interface elements. Accordingly, concurrent display of the first plurality of application icons and the first set of one or more user interface elements in response to detecting the user request reduces the number of inputs needed for performing operations pertaining to the user interface elements. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while concurrently displaying, via the display device (e.g., 602), the modified first plurality of application icons (e.g., 612A-612Z) and the first set of one or more user interface elements (e.g., 622A), the electronic device detects a first paging input (e.g., 644) (e.g., that includes movement in the first direction such as a swipe gesture in the first direction). In some embodiments, the first paging input (e.g., 644) is detected in a region (e.g., 630) occupied by the modified first plurality of application icons (e.g., 612A-612Z). In some embodiments, the first paging input (e.g., 644) is detected in a region (e.g., 630) that does not correspond to (e.g., is not occupied by) the first set of one or more user interface elements (e.g., 622A), the status bar (e.g., 620), and the dock region (e.g., 610).

In some embodiments, in response to detecting the paging input (e.g., 644), the electronic device displays, via the display device (e.g., 602), the second plurality of application icons (e.g., 612AA-612AK) that are different from the first plurality of application icons (and, optionally ceases to display the modified first plurality of application icons (e.g., 612A-612Z) and the first set of one or more user interface elements (e.g., 622A)).

In some embodiments, while displaying, via the display device (e.g., 602), the second plurality of application icons (e.g., 612AA-612AK), the electronic device detects a second paging input (e.g., 646) (e.g., that includes movement in the second direction such as a swipe gesture in the second direction). In some embodiments, the second plurality of application icons are displayed without displaying the modified first plurality of application icons (e.g., 612A-612Z) and/or the first set of one or more user interface elements (e.g., 622A). In some embodiments, the second paging input (e.g., 646) is detected in a region (e.g., 630) occupied by the second plurality of application icons (e.g., 612AA-612AK). In some embodiments, the second paging input is detected in a region (e.g., 630) that does not correspond to (e.g., is not occupied by) the first set of one or more user interface elements (e.g., 622A), the status bar (e.g., 620), and the dock region (e.g., 610).

In some embodiments, in response to detecting the second paging input (e.g., 646), the electronic device replaces display of the second plurality of application icons (e.g., 612AA-612AK) with display of the modified first plurality of application icons (e.g., 612A-612Z) and the first set of one or more user interface elements (e.g., 622A). Concurrently displaying the first plurality of application icons and the first set of one or more user interface elements after having displayed the second plurality of application icons enables a user to quickly regain access to the user interface elements. This is in contrast to ceasing display of the first set of one or more user interface elements after having displayed the second page of application icons, which would necessitate additional user inputs to access the user interface elements. Accordingly, concurrent display of the first plurality of application icons and the first set of one or more user interface elements in response to detecting the second paging input reduces the number of inputs needed for performing operations pertaining to the user interface elements. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while concurrently displaying, via the display device (e.g., 602), the modified first plurality of application icons (e.g., 612A-612Z) and the first set of one or more user interface elements (e.g., 622A), the electronic device detects a user request (e.g., input 648 at hardware button 604) (while in an unlocked state) to transition the electronic device to a locked state. In some embodiments, in response to detecting the user request to transition the electronic device to the locked state: the electronic device transitions the electronic device from an unlocked state to the locked state, and ceases display of the modified first plurality of application icons (e.g., 612A-612Z) and the first set of one or more user interface elements (e.g., 622A) (e.g., including transitioning the display device to an inactive state (e.g., off, a state in which nothing is displayed) or displaying a wake screen user interface (e.g., 652)).

In some embodiments, while the electronic device is in the locked state, the electronic device detects one or more inputs (e.g., 662, biometric input) to transition the electronic device to an unlocked state and navigate to the home screen (e.g., 608) (e.g., detecting change in orientation of device, detecting user input (e.g., 662) at display device (e.g., 602) (e.g., tap gesture, swipe gesture starting near an edge of the display device, information corresponding to a biometric feature (e.g., fingerprint, face))). In some embodiments, in response to detecting the one or more inputs: the electronic device transitions the electronic device from the locked state to the unlocked state, and concurrently displays, via the display device (e.g., 602), the modified first plurality of application icons (e.g., 612A-612Z) and the first set of one or more user interface elements (e.g., 622A). In some embodiments, the electronic device maintains the state of what is displayed prior to locking of the device. Concurrently displaying the first plurality of application icons and the first set of one or more user interface elements after being in a locked state enables a user to quickly regain access to the user interface elements. This is in contrast to ceasing display of the first set of one or more user interface elements after being in a locked state, which would necessitate additional user inputs to access the user interface elements. Accordingly, concurrent display of the first plurality of application icons and the first set of one or more user interface elements in response to the one or more inputs reduces the number of inputs needed for performing operations pertaining to the user interface elements. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first user input (e.g., 618, 692) is detected while the electronic device (e.g., a displayed user interface (e.g., 608)) is in a first orientation (e.g., portrait orientation, landscape orientation). In some embodiments, ceasing display of the first plurality of application icons (e.g., 612A-612Z), displaying the second plurality of application icons (e.g., 612AA-612AK), modifying display of the first plurality of application icons, and/or concurrently displaying the modified first plurality of application icons and the first set of one or more user interface elements (e.g., 622A) occur while the electronic device is in the first orientation.

In some embodiments, while displaying, via the display device (e.g., 602), the first plurality of application icons (e.g., 612A-612Z), the electronic device detects a third user input (e.g., 689, 690) (e.g., a user gesture, swipe, drag) that is different from the first user input, wherein the third user input is detected while the electronic device (e.g., a displayed user interface) is in a second orientation (e.g., portrait orientation, landscape orientation) that is different from the first orientation.

In some embodiments, in response to detecting the third user input (e.g., 689, 690): in accordance with a determination that the detected third user input includes movement in a third direction (e.g., left, right, up, down) (e.g., the direction is relative to the displayed user interface (e.g., 608)) (e.g., a determination that a third set of criteria is met, including a requirement that the third user input includes movement in a third direction and, optionally, that the orientation of the electronic device is in the second orientation): the electronic device ceases display of the first plurality of application icons (e.g., 612A-612Z) (e.g., by sliding the first plurality of application icons off the display device (e.g., 602) in the third direction), and displays (e.g., initially displays), via the display device (e.g., 602), the second plurality of application icons (e.g., 612AA-612AK) that are different from the first plurality of application icons (e.g., without displaying widgets (e.g., 622A-622H)), wherein the application icons are selectable to display application user interfaces for corresponding applications. Thus, the technique replaces display of the first plurality of application icons (e.g., 612A-612Z) with display of the second plurality of application icons (e.g., 612AA-612AK). In some embodiments, the first direction and the third direction are in the same direction relative to the displayed user interface (e.g., 608).

In some embodiments, in response to detecting the third user input (e.g., 689, 690): in accordance with a determination that the detected third user input includes movement in a fourth direction (e.g., left, right, up, down) (e.g., the direction is relative to the displayed user interface (e.g., 608)) that is different from (e.g., substantially opposite to) the third direction (e.g., a determination that a fourth set of criteria is met, including a requirement that the third user input includes movement in a fourth direction and, optionally, that the orientation of the electronic device is in the second orientation): the electronic device ceases display of the first plurality of application icons (e.g., 612A-612Z) (e.g., by sliding the first plurality of application icons off the display device (e.g., 602) in the third direction), and displays (e.g., initially displays), via the display device (e.g., 602), the first set of one or more user interface elements (e.g., 622A) (e.g., without concurrently displaying the second plurality of application icons (e.g., 612AA-612AK) (or any application icons in the second plurality of application icons)). Thus, the technique replaces display of the first plurality of application icons (e.g., 612A-612Z) with display of the first set of one or more user interface elements (e.g., 622A). In some embodiments, the second direction and the fourth direction are in the same direction relative to the displayed user interface (e.g., 608).

In some embodiments, while displaying, via the display device (e.g., 602), the first plurality of application icons (e.g., 612A-612Z), the electronic device detects a third user input (e.g., 689, 690) (e.g., a user gesture, swipe, drag) that is different from the first user input, wherein the third user input is detected while the electronic device (e.g., a displayed user interface) is in a second orientation (e.g., portrait orientation, landscape orientation) that is different from the first orientation. In some embodiments, the third input is detected while the electronic device is in the first orientation. Thus, the user interface elements slide over the application icons regardless of the orientation of the electronic device.

In some embodiments, in response to detecting the third user input (e.g., 689, 690), the electronic device displays (e.g., initially displays), via the display device (e.g., 602), the first set of one or more user interface elements (e.g., 622A), wherein the first set of one or more user interface elements are overlaid on top of a portion of the first plurality of application icons (e.g., 612A-612Z). In some embodiments, displaying, via the display device (e.g., 602), the first set of one or more user interface elements (e.g., 622A) includes sliding the first set of one or more user interface elements onto the display device from an edge of the display device. In some embodiments, the edge of the display device (e.g., 602) is proximate to the location at which the third user input was detected. In some embodiments, maintaining display of the first plurality of application icons (e.g., 612A-612Z) includes reducing the size of the first plurality of application icons and/or blurring the first plurality of application icons.

In some embodiments, while concurrently displaying, via the display device (e.g., 602), the modified first plurality of application icons (e.g., 612A-612Z) and the first set of one or more user interface elements (e.g., 622A), the electronic device detects a user request (e.g., swipe, drag in the up/down direction) to vertically scroll the first set of one or more user interface elements. In some embodiments, the user request is a user request to scroll the user interface elements (e.g., 622A-622H). In some embodiments, the user request includes a gesture (e.g., swipe, drag) starting in a region (e.g., 628) corresponding to the user interface elements (e.g., 622A-622H) (e.g., a region that does not overlap with a region (e.g., 630) corresponding to the application icons (e.g., 612A-612AK)).

In some embodiments, in response to detecting the user request to vertically scroll the first set of one or more user interface elements (e.g., 622A), the electronic device vertically scrolls the first set of one or more user interface elements, wherein a portion of the first set of one or more user interface elements ceases to be displayed, and a portion of a second set of one or more user interface elements is displayed (e.g., 622B-622H) (e.g., initially displayed). In some embodiments, the first set of one or more user interface elements (e.g., 622A) ceases to display at the same time as when the portion of the second set of one or more user interface elements is displayed.

In some embodiments, while concurrently displaying, via the display device (e.g., 602), the modified first plurality of application icons (e.g., 612A-612Z) and the first set of one or more user interface elements (e.g., 622A), the electronic device detects (720) a fourth user input (e.g., 672) (e.g., user gesture, swipe, drag) in a predefined region (e.g., 628) corresponding to the first set of one or more user interface elements (e.g., the predefined region is occupied by the first set of one or more user interface elements, the predefined region is not occupied by the first plurality of application icons (e.g., 612A-612Z)), wherein the first set of one or more user interface elements includes a single user interface element (e.g., 622A) (e.g., displayed at a particular location on the display device (e.g., 602)).

In some embodiments, in response (722) to detecting the fourth user input (e.g., 672): in accordance (724) with a determination that the fourth user input includes movement in a fifth direction (e.g., up, down, left, right): the electronic device maintains (726) display of the single user interface element (e.g., 622A), and displays (728) (e.g., initially displays), via the display device (e.g., 602), a second set of one or more user interface elements (e.g., 622B-622C), wherein the single user interface element and the second set of one or more user interface elements are concurrently displayed. In some embodiments, the single user interface element (e.g., 622A) remains at the particular location on the display device (e.g., 602). In some embodiments, the second set of one or more user interface elements (e.g., 622B-622C) is displayed proximate to (e.g., below) the first set of one or more user interface elements (e.g., 622A). In some embodiments, in accordance with a determination that the fourth user input includes movement in a sixth direction that is different (e.g., substantially opposite to) from the fifth direction, the electronic device ceases display of the single user interface element (e.g., 622A) and displays a search bar (e.g., 658).

In some embodiments, while concurrently displaying, via the display device (e.g., 602), the single user interface element (e.g., 622A) and the second set of one or more user interface elements (e.g., 622B-622C), the electronic device detects a fifth user input (e.g., 688) (e.g., user gesture, swipe, drag (in an up/down direction)). In some embodiments, in response to detecting the fifth user input (e.g., 688): the electronic device ceases display of the second set of one or more user interface elements (e.g., 622B-622C), and maintains display of the single user interface element (e.g., 622A). In some embodiments, the fifth user input is detected in the predefined region (e.g., 628). In some embodiments, the single user interface element remains at the particular location on the display device (e.g., 602).

In some embodiments, while concurrently displaying, via the display device (e.g., 602), the modified first plurality of application icons (e.g., 612A-612Z) and a third set of one or more user interface elements (e.g., 622F-622H), the electronic device detects a user request (e.g., 681, 683) to enter an edit mode (e.g., corresponding to 682) at a location corresponding to an application icon (e.g., 612H) of the modified first plurality of application icons (e.g., 612A-612Z) (e.g., long press on an application icon). In some embodiments, the user request is detected in the app region (e.g., 630). In some embodiments, the third set is the same as the first set of one or more user interface elements (e.g., 622A). In some embodiments, the edit mode enables editing (e.g., moving, reordering, reorganizing) of the application icons (e.g., 612A-612AK) and user interface elements (e.g., 622A-622H). For example, the user interface elements can have hierarchical categories (e.g., pinned, favorites, library). In some embodiments, the edit mode enables reorganizing of the user interface elements into the different hierarchical categories. In some embodiments, entering the edit mode includes displaying delete affordances (e.g., 673, 679) for application icons and user interface elements. In some embodiments, entering the edit mode includes enabling reorganizing (e.g., movement from an original location to a new location) of application icons and user interface elements via (e.g., in response to) gestures (e.g., drag, tap). In some embodiments, the user request to enter the edit mode is detected while concurrently displaying the modified first plurality of application icons (e.g., 612A-612Z) and the first set of one or more user interface elements (e.g., 622A).

In some embodiments, in response to detecting the user request (e.g., 681, 683) to enter the edit mode, the electronic device causes one or more user interface elements (e.g., 622A-622H) (e.g., first set, second set, third set, or a combination thereof) and application icons (e.g., 612A-612AK) to enter an edit mode. In some embodiments, detecting the user request at a location corresponding to a user interface element (e.g., long press on the user interface element) also causes the user interface elements and application icons to enter an edit mode.

In some embodiments, while concurrently displaying, via the display device (e.g., 602), the modified first plurality of application icons (e.g., 612A-612Z) and a third set of one or more user interface elements (e.g., 622F-622H), the electronic device detects a user request (e.g., 681, 683) to enter an edit mode at a location corresponding to an edit affordance (e.g., 680) that is displayed proximate to the third set of user interface elements (e.g., tap gesture). In some embodiments, the user request is detected in the widget region (e.g., 628). In response to detecting the user request to enter the edit mode, the electronic device causes one or more user interface elements (e.g., 622A-622H) (e.g., first set, second set, third set, or a combination thereof) and application icons (e.g., 612A-612AK) to enter an edit mode.

In some embodiments, while concurrently displaying, via the display device (e.g., 602), the modified first plurality of application icons (e.g., 612A-612Z) and the first set of one or more user interface elements (e.g., 622A), the electronic device detects (730) a change in orientation of the electronic device from a first orientation (e.g., landscape orientation, portrait orientation) to a second orientation (e.g., portrait orientation, landscape orientation) that is different from the first orientation. In some embodiments, in response (732) to detecting the change in orientation of the electronic device from the first orientation to the second orientation, the electronic device displays (734) the first plurality of application icons (e.g., 612A-612Z) without displaying the first set of one or more user interface elements (e.g., 622A). In some embodiments, in response to detecting the change in orientation of the electronic device from the first orientation to the second orientation, changing (e.g., increasing) the distance between a first application icon (e.g., 612A) and a second application icon (e.g., 612B) of the first plurality of application icons (e.g., 612A-612Z). Automatically ceasing to display the first set of one or more user interface elements in response to detecting a change in orientation allows the device to maintain display of the first plurality of application icons in the new orientation. Performing an operation when a set of conditions has been met without requiring further user input enhances the operability of the device (e.g., maintains accessibility of the first plurality of application icons) and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the first plurality of application icons (e.g., 612A-612Z) without displaying the first set of one or more user interface elements (e.g., 622A), the electronic device detects a change in orientation of the electronic device from the second orientation to the first orientation. In some embodiments, in response to detecting the change in orientation of the electronic device from the second orientation to the first orientation, the electronic device concurrently displays, via the display device (e.g., 602), the modified first plurality of application icons (e.g., 612A-612Z) and the first set of one or more user interface elements (e.g., 622A). Concurrently displaying the first plurality of application icons and the first set of one or more user interface elements after reverting back to the device's previous orientation enables a user to quickly regain access to the user interface elements. This is in contrast to ceasing display of the first set of one or more user interface elements after a change in the orientation of the device, which would necessitate additional user inputs to access the user interface elements. Accordingly, concurrent display of the first plurality of application icons and the first set of one or more user interface elements in response to the change in orientation reduces the number of inputs needed for performing operations pertaining to the user interface elements. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a user interface element (e.g., 622A) of the first set of user interface elements includes a first set of information from an application corresponding to the user interface element. In some embodiments, while concurrently displaying, via the display device (e.g., 602), the modified first plurality of application icons (e.g., 612A-612Z) and the first set of one or more user interface elements (e.g., 622A), the electronic device detects a user request (e.g., 666, 674) to expand the user interface element, wherein a portion (e.g., top portion, bottom portion) of the user interface element is displayed at a first location on the display device (e.g., 602). In some embodiments, in response to detecting the user request (e.g., 666, 674) to expand the user interface element: in accordance with a determination that expansion criteria is met (e.g., expansion criteria includes a requirement that the displayed user interface element (e.g., 622A) does not get cropped due to expansion of the user interface element (e.g., no portion of the displayed user interface element ceases to display as a result of expanding the user interface element)): the electronic device expands the size of the user interface element (e.g., 622A) while maintaining the portion of the user interface element (e.g., 622A) at the first location on the display device (e.g., 602), and displays (e.g., initially displays), via the display device (e.g., 602), a second set of information from the application corresponding to the user interface element, wherein the second set of information is different from the first set of information. In some embodiments, the second set of information is concurrently displayed with the first set of information.

In some embodiments, further in response to detecting the user request (e.g., 666, 674) to expand the user interface element (e.g., 622C): in accordance with a determination that expansion criteria is not met: the electronic device expands the size of the user interface element, scrolls the user interface element, wherein scrolling the user interface element (e.g., 622C) causes the portion of the user interface element to be displayed at a second location on the display device (e.g., 602) that is different from the first location, and displays (e.g., initially displays), via the display device (e.g., 602), the second set of information from the application corresponding to the user interface element, wherein the second set of information is different from the first set of information. In some embodiments, the second set of information is concurrently displayed with the first set of information. Automatically scrolling the user interface element based on a determination that expansion criteria is not met allows the user to view the full contents of the user interface element. Otherwise, additional inputs would be required to further scroll the user interface element. Performing an operation when a set of conditions has been met without requiring further user input enhances the operability of the device (e.g., maintains accessibility of the first plurality of application icons) and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while concurrently displaying, via the display device (e.g., 602), the modified first plurality of application icons (e.g., 612A-612Z) and the first set of one or more user interface elements (e.g., 622A), the electronic device detects a sixth user input (e.g., 644, 691) (e.g., user gesture, swipe, drag) with movement in a seventh direction (e.g., left, right, up, down). In some embodiments, in response to detecting the sixth user input (e.g., 644, 691): in accordance with a determination that the sixth user input (e.g., the start of the user input, the end of the user input) with movement in the seventh direction is detected in a predefined region (e.g., 628) corresponding to the first set of one or more user interface elements (e.g., 622A) (e.g., the predefined region is occupied by the first set of one or more user interface elements, the predefined region is not occupied by the first plurality of application icons (e.g., 612A-612Z)): the electronic device displays, via the display device (e.g., 602), the first plurality of application icons (e.g., 612A-612Z), and ceases display of the first set of one or more user interface elements (e.g., 622A). In some embodiments, the distance between the first application icon and the second application icon of the first plurality of application icons is increased in response to detecting the sixth user input.

In some embodiments, in response to detecting the sixth user input (e.g., 644, 691): in accordance with a determination that the sixth user input (e.g., the start of the user input, the end of the user input) with movement in the seventh direction is detected in a predefined region (e.g., 630) corresponding to the modified first plurality of application icons (e.g., 612A-612Z) (e.g., the predefined region corresponding to the modified first plurality of application icons is adjacent to the predefined region (e.g., 628) corresponding to the first set of one or more user interface elements (e.g., 622A)), the electronic device replaces display of the modified first plurality of application icons (e.g., 612A-612Z) with display of the second plurality of application icons (e.g., 612AA-612AK), wherein the predefined region (e.g., 630) corresponding to the modified first plurality of application icons does not overlap with the predefined region (e.g., 628) corresponding to the first set of one or more user interface elements (e.g., 622A). Replacing display of the modified first plurality of application icons (e.g., 612A-612Z) includes ceasing display of the modified first plurality of application icons.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources for display in widgets. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide useful, glanceable information in widgets. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of displaying personal information data in widgets, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, widgets can show glanceable information from applications based on non-personal information data or a bare minimum amount of personal information.

What is claimed is:

1. An electronic device, comprising:
   a display device;
   one or more processors; and
   memory storing one or more programs configured to be executed by the one or more processors, the one or more programs including instructions for:
   displaying, via the display device, a first plurality of application icons without displaying a first set of one or more user interface elements, wherein the application icons are selectable to display application user interfaces for corresponding applications;
   while displaying, via the display device, the first plurality of application icons, detecting a first user input that starts at a first location; and
   in response to detecting the first user input that starts at the first location:
   in accordance with a determination that the first user input includes movement in a first direction:
   ceasing display of the first plurality of application icons; and
   displaying, via the display device, a second plurality of application icons that are different from the first plurality of application icons, wherein the application icons are selectable to display application user interfaces for corresponding applications; and
   in accordance with a determination that the first user input includes movement in a second direction that is different from the first direction:
   modifying display of the first plurality of application icons; and
   concurrently displaying, via the display device, the modified first plurality of application icons and the first set of one or more user interface elements without displaying the second plurality of application icons that are different from the first plurality of application icons.

2. The electronic device of claim 1, the one or more programs further including instructions for:
   while displaying, via the display device, a user interface of an application corresponding to a selected application icon, detecting a user request to navigate to a home screen; and
   in response to detecting the user request to navigate to the home screen, replacing display of the user interface of the application corresponding to the selected application with display of the home screen, wherein displaying the home screen includes concurrently displaying, via the display device, the modified first plurality of application icons and the first set of one or more user interface elements.

3. The electronic device of claim 1, the one or more programs further including instructions for:
   while concurrently displaying, via the display device, the modified first plurality of application icons and the first set of one or more user interface elements, detecting a first paging input;
   in response to detecting the paging input, displaying, via the display device, the second plurality of application icons that are different from the first plurality of application icons;
   while displaying, via the display device, the second plurality of application icons, detecting a second paging input; and
   in response to detecting the second paging input, replacing display of the second plurality of application icons with display of the modified first plurality of application icons and the first set of one or more user interface elements.

4. The electronic device of claim 1, the one or more programs further including instructions for:
   while concurrently displaying, via the display device, the modified first plurality of application icons and the first set of one or more user interface elements, detecting a user request to transition the electronic device to a locked state;
   in response to detecting the user request to transition the electronic device to the locked state:
   transitioning the electronic device from an unlocked state to the locked state; and
   ceasing display of the modified first plurality of application icons and the first set of one or more user interface elements;
   while the electronic device is in the locked state, detecting one or more inputs to transition the electronic device to an unlocked state and navigate to a home screen; and
   in response to detecting the one or more inputs:
   transitioning the electronic device from the locked state to the unlocked state; and
   concurrently displaying, via the display device, the modified first plurality of application icons and the first set of one or more user interface elements.

5. The electronic device of claim 1, wherein the first user input is detected while the electronic device is in a first orientation, the one or more programs further including instructions for:
   while displaying, via the display device, the first plurality of application icons, detecting a third user input that is different from the first user input, wherein the third user input is detected while the electronic device is in a second orientation that is different from the first orientation; and
   in response to detecting the third user input:
   in accordance with a determination that the detected third user input includes movement in a third direction:
   ceasing display of the first plurality of application icons; and
   displaying, via the display device, the second plurality of application icons that are different from the first plurality of application icons, wherein the application icons are selectable to display application user interfaces for corresponding applications; and in accordance with a determination that the detected third user input includes movement in a fourth direction that is different from the third direction:
ceasing display of the first plurality of application icons; and
displaying, via the display device, the first set of one or more user interface elements.

6. The electronic device of claim 5, the one or more programs further including instructions for:
while displaying, via the display device, the first plurality of application icons, detecting a third user input that is different from the first user input, wherein the third user input is detected while the electronic device is in a second orientation that is different from the first orientation; and
in response to detecting the third user input, displaying, via the display device, the first set of one or more user interface elements, wherein the first set of one or more user interface elements are overlaid on top of a portion of the first plurality of application icons.

7. The electronic device of claim 1, the one or more programs further including instructions for:
while concurrently displaying, via the display device, the modified first plurality of application icons and the first set of one or more user interface elements, detecting a user request to vertically scroll the first set of one or more user interface elements; and
in response to detecting the user request to vertically scroll the first set of one or more user interface elements, vertically scroll the first set of one or more user interface elements, wherein a portion of the first set of one or more user interface elements ceases to be displayed, and a portion of a second set of one or more user interface elements is displayed.

8. The electronic device of claim 1, the one or more programs further including instructions for:
while concurrently displaying, via the display device, the modified first plurality of application icons and the first set of one or more user interface elements, detecting a fourth user input in a predefined region corresponding to the first set of one or more user interface elements, wherein the first set of one or more user interface elements includes a single user interface element; and
in response to detecting the fourth user input:
in accordance with a determination that the fourth user input includes movement in a fifth direction:
maintaining display of the single user interface element; and
displaying, via the display device, a second set of one or more user interface elements, wherein the single user interface element and the second set of one or more user interface elements are concurrently displayed.

9. The electronic device of claim 1, the one or more programs further including instructions for:
while concurrently displaying, via the display device, the modified first plurality of application icons and a third set of one or more user interface elements, detecting a user request to enter an edit mode at a location corresponding to an application icon of the modified first plurality of application icons; and in response to detecting the user request to enter the edit mode, causing one or more user interface elements and application icons to enter an edit mode.

10. The electronic device of claim 1, the one or more programs further including instructions for:
while concurrently displaying, via the display device, the modified first plurality of application icons and the first set of one or more user interface elements, detecting a change in orientation of the electronic device from a first orientation to a second orientation that is different from the first orientation; and
in response to detecting the change in orientation of the electronic device from the first orientation to the second orientation, displaying the first plurality of application icons without displaying the first set of one or more user interface elements.

11. The electronic device of claim 10, the one or more programs further including instructions for:
while displaying the first plurality of application icons without displaying the first set of one or more user interface elements, detecting a change in orientation of the electronic device from the second orientation to the first orientation; and
in response to detecting the change in orientation of the electronic device from the second orientation to the first orientation, concurrently displaying, via the display device, the modified first plurality of application icons and the first set of one or more user interface elements.

12. The electronic device of claim 1, the one or more programs further including instructions for:
while concurrently displaying, via the display device, the modified first plurality of application icons and the first set of one or more user interface elements, detecting a sixth user input with movement in a seventh direction; and
in response to detecting the sixth user input:
in accordance with a determination that the sixth user input with movement in the seventh direction is detected in a predefined region corresponding to the first set of one or more user interface elements:
displaying, via the display device, the first plurality of application icons; and
ceasing display of the first set of one or more user interface elements; and
in accordance with a determination that the sixth user input with movement in the seventh direction is detected in a predefined region corresponding to the modified first plurality of application icons, replacing display of the modified first plurality of application icons with display of the second plurality of application icons, wherein the predefined region corresponding to the modified first plurality of application icons does not overlap with the predefined region corresponding to the first set of one or more user interface elements.

13. The electronic device of claim 1, wherein the first set of one or more user interface elements includes a plurality of user interface elements corresponding to different applications.

14. A non-transitory computer-readable storage medium storing one or more programs configured to be executed by one or more processors of an electronic device with a display device, the one or more programs including instructions for:
displaying, via the display device, a first plurality of application icons without displaying a first set of one or more user interface elements, wherein the application icons are selectable to display application user interfaces for corresponding applications;

while displaying, via the display device, the first plurality of application icons, detecting a first user input that starts at a first location; and in response to detecting the first user input that starts at the first location:
- in accordance with a determination that the first user input includes movement in a first direction:
  - ceasing display of the first plurality of application icons; and
  - displaying, via the display device, a second plurality of application icons that are different from the first plurality of application icons, wherein the application icons are selectable to display application user interfaces for corresponding applications; and
- in accordance with a determination that the first user input includes movement in a second direction that is different from the first direction:
  - modifying display of the first plurality of application icons; and
  - concurrently displaying, via the display device, the modified first plurality of application icons and the first set of one or more user interface elements without displaying the second plurality of application icons that are different from the first plurality of application icons.

15. The computer-readable storage medium of claim 14, the one or more programs further including instructions for:
while displaying, via the display device, a user interface of an application corresponding to a selected application icon, detecting a user request to navigate to a home screen; and
in response to detecting the user request to navigate to the home screen, replacing display of the user interface of the application corresponding to the selected application with display of the home screen, wherein displaying the home screen includes concurrently displaying, via the display device, the modified first plurality of application icons and the first set of one or more user interface elements.

16. The computer-readable storage medium of claim 14, the one or more programs further including instructions for:
while concurrently displaying, via the display device, the modified first plurality of application icons and the first set of one or more user interface elements, detecting a first paging input;
in response to detecting the paging input, displaying, via the display device, the second plurality of application icons that are different from the first plurality of application icons;
while displaying, via the display device, the second plurality of application icons, detecting a second paging input; and
in response to detecting the second paging input, replacing display of the second plurality of application icons with display of the modified first plurality of application icons and the first set of one or more user interface elements.

17. The computer-readable storage medium of claim 14, the one or more programs further including instructions for:
while concurrently displaying, via the display device, the modified first plurality of application icons and the first set of one or more user interface elements, detecting a user request to transition the electronic device to a locked state;
in response to detecting the user request to transition the electronic device to the locked state:
- transitioning the electronic device from an unlocked state to the locked state; and
- ceasing display of the modified first plurality of application icons and the first set of one or more user interface elements;

while the electronic device is in the locked state, detecting one or more inputs to transition the electronic device to an unlocked state and navigate to a home screen; and
in response to detecting the one or more inputs:
- transitioning the electronic device from the locked state to the unlocked state; and
- concurrently displaying, via the display device, the modified first plurality of application icons and the first set of one or more user interface elements.

18. The computer-readable storage medium of claim 14, wherein the first user input is detected while the electronic device is in a first orientation, the one or more programs further including instructions for:
while displaying, via the display device, the first plurality of application icons, detecting a third user input that is different from the first user input, wherein the third user input is detected while the electronic device is in a second orientation that is different from the first orientation; and
in response to detecting the third user input:
- in accordance with a determination that the detected third user input includes movement in a third direction:
  - ceasing display of the first plurality of application icons; and
  - displaying, via the display device, the second plurality of application icons that are different from the first plurality of application icons, wherein the application icons are selectable to display application user interfaces for corresponding applications; and
- in accordance with a determination that the detected third user input includes movement in a fourth direction that is different from the third direction:
  - ceasing display of the first plurality of application icons; and
  - displaying, via the display device, the first set of one or more user interface elements.

19. The computer-readable storage medium of claim 18, the one or more programs further including instructions for:
while displaying, via the display device, the first plurality of application icons, detecting a third user input that is different from the first user input, wherein the third user input is detected while the electronic device is in a second orientation that is different from the first orientation; and
in response to detecting the third user input, displaying, via the display device, the first set of one or more user interface elements, wherein the first set of one or more user interface elements are overlaid on top of a portion of the first plurality of application icons.

20. The computer-readable storage medium of claim 14, the one or more programs further including instructions for:
while concurrently displaying, via the display device, the modified first plurality of application icons and the first set of one or more user interface elements, detecting a user request to vertically scroll the first set of one or more user interface elements; and
in response to detecting the user request to vertically scroll the first set of one or more user interface elements, vertically scroll the first set of one or more user interface elements, wherein a portion of the first set of one or more user interface elements ceases to be displayed, and a portion of a second set of one or more user interface elements is displayed.

21. The computer-readable storage medium of claim 14, the one or more programs further including instructions for:
while concurrently displaying, via the display device, the modified first plurality of application icons and the first set of one or more user interface elements, detecting a fourth user input in a predefined region corresponding to the first set of one or more user interface elements, wherein the first set of one or more user interface elements includes a single user interface element; and
in response to detecting the fourth user input:
in accordance with a determination that the fourth user input includes movement in a fifth direction:
maintaining display of the single user interface element; and
displaying, via the display device, a second set of one or more user interface elements, wherein the single user interface element and the second set of one or more user interface elements are concurrently displayed.

22. The computer-readable storage medium of claim 14, the one or more programs further including instructions for:
while concurrently displaying, via the display device, the modified first plurality of application icons and a third set of one or more user interface elements, detecting a user request to enter an edit mode at a location corresponding to an application icon of the modified first plurality of application icons; and
in response to detecting the user request to enter the edit mode, causing one or more user interface elements and application icons to enter an edit mode.

23. The computer-readable storage medium of claim 14, the one or more programs further including instructions for:
while concurrently displaying, via the display device, the modified first plurality of application icons and the first set of one or more user interface elements, detecting a change in orientation of the electronic device from a first orientation to a second orientation that is different from the first orientation; and
in response to detecting the change in orientation of the electronic device from the first orientation to the second orientation, displaying the first plurality of application icons without displaying the first set of one or more user interface elements.

24. The computer-readable storage medium of claim 23, the one or more programs further including instructions for:
while displaying the first plurality of application icons without displaying the first set of one or more user interface elements, detecting a change in orientation of the electronic device from the second orientation to the first orientation; and
in response to detecting the change in orientation of the electronic device from the second orientation to the first orientation, concurrently displaying, via the display device, the modified first plurality of application icons and the first set of one or more user interface elements.

25. The computer-readable storage medium of claim 14, the one or more programs further including instructions for:
while concurrently displaying, via the display device, the modified first plurality of application icons and the first set of one or more user interface elements, detecting a sixth user input with movement in a seventh direction; and in response to detecting the sixth user input:
in accordance with a determination that the sixth user input with movement in the seventh direction is detected in a predefined region corresponding to the first set of one or more user interface elements:
displaying, via the display device, the first plurality of application icons; and
ceasing display of the first set of one or more user interface elements; and
in accordance with a determination that the sixth user input with movement in the seventh direction is detected in a predefined region corresponding to the modified first plurality of application icons, replacing display of the modified first plurality of application icons with display of the second plurality of application icons, wherein the predefined region corresponding to the modified first plurality of application icons does not overlap with the predefined region corresponding to the first set of one or more user interface elements.

26. The computer-readable storage medium of claim 14, wherein the first set of one or more user interface elements includes a plurality of user interface elements corresponding to different applications.

27. A method, comprising:
at an electronic device with a display device:
displaying, via the display device, a first plurality of application icons without displaying a first set of one or more user interface elements, wherein the application icons are selectable to display application user interfaces for corresponding applications;
while displaying, via the display device, the first plurality of application icons, detecting a first user input that starts at a first location; and
in response to detecting the first user input that starts at the first location:
in accordance with a determination that the first user input includes movement in a first direction:
ceasing display of the first plurality of application icons; and
displaying, via the display device, a second plurality of application icons that are different from the first plurality of application icons, wherein the application icons are selectable to display application user interfaces for corresponding applications; and
in accordance with a determination that the first user input includes movement in a second direction that is different from the first direction:
modifying display of the first plurality of application icons; and
concurrently displaying, via the display device, the modified first plurality of application icons and the first set of one or more user interface elements without displaying the second plurality of application icons that are different from the first plurality of application icons.

28. The method of claim 27, further comprising:
while displaying, via the display device, a user interface of an application corresponding to a selected application icon, detecting a user request to navigate to a home screen; and
in response to detecting the user request to navigate to the home screen, replacing display of the user interface of the application corresponding to the selected application with display of the home screen, wherein displaying the home screen includes concurrently displaying, via the display device, the modified first plurality of application icons and the first set of one or more user interface elements.

29. The method of claim 27, further comprising:
while concurrently displaying, via the display device, the modified first plurality of application icons and the first set of one or more user interface elements, detecting a first paging input;
in response to detecting the paging input, displaying, via the display device, the second plurality of application icons that are different from the first plurality of application icons;
while displaying, via the display device, the second plurality of application icons, detecting a second paging input; and
in response to detecting the second paging input, replacing display of the second plurality of application icons with display of the modified first plurality of application icons and the first set of one or more user interface elements.

30. The method of claim 27, further comprising:
while concurrently displaying, via the display device, the modified first plurality of application icons and the first set of one or more user interface elements, detecting a user request to transition the electronic device to a locked state;
in response to detecting the user request to transition the electronic device to the locked state:
transitioning the electronic device from an unlocked state to the locked state; and
ceasing display of the modified first plurality of application icons and the first set of one or more user interface elements;
while the electronic device is in the locked state, detecting one or more inputs to transition the electronic device to an unlocked state and navigate to a home screen; and
in response to detecting the one or more inputs:
transitioning the electronic device from the locked state to the unlocked state; and
concurrently displaying, via the display device, the modified first plurality of application icons and the first set of one or more user interface elements.

31. The method of claim 27, wherein the first user input is detected while the electronic device is in a first orientation, the method further comprising:
while displaying, via the display device, the first plurality of application icons, detecting a third user input that is different from the first user input, wherein the third user input is detected while the electronic device is in a second orientation that is different from the first orientation; and
in response to detecting the third user input:
in accordance with a determination that the detected third user input includes movement in a third direction:
ceasing display of the first plurality of application icons; and
displaying, via the display device, the second plurality of application icons that are different from the first plurality of application icons, wherein the application icons are selectable to display application user interfaces for corresponding applications; and
in accordance with a determination that the detected third user input includes movement in a fourth direction that is different from the third direction:
ceasing display of the first plurality of application icons; and
displaying, via the display device, the first set of one or more user interface elements.

32. The method of claim 31, further comprising:
while displaying, via the display device, the first plurality of application icons, detecting a third user input that is different from the first user input, wherein the third user input is detected while the electronic device is in a second orientation that is different from the first orientation; and
in response to detecting the third user input, displaying, via the display device, the first set of one or more user interface elements, wherein the first set of one or more user interface elements are overlaid on top of a portion of the first plurality of application icons.

33. The method of claim 27, further comprising:
while concurrently displaying, via the display device, the modified first plurality of application icons and the first set of one or more user interface elements, detecting a user request to vertically scroll the first set of one or more user interface elements; and
in response to detecting the user request to vertically scroll the first set of one or more user interface elements, vertically scroll the first set of one or more user interface elements, wherein a portion of the first set of one or more user interface elements ceases to be displayed, and a portion of a second set of one or more user interface elements is displayed.

34. The method of claim 27, further comprising:
while concurrently displaying, via the display device, the modified first plurality of application icons and the first set of one or more user interface elements, detecting a fourth user input in a predefined region corresponding to the first set of one or more user interface elements, wherein the first set of one or more user interface elements includes a single user interface element; and
in response to detecting the fourth user input:
in accordance with a determination that the fourth user input includes movement in a fifth direction:
maintaining display of the single user interface element; and
displaying, via the display device, a second set of one or more user interface elements, wherein the single user interface element and the second set of one or more user interface elements are concurrently displayed.

35. The method of claim 27, further comprising:
while concurrently displaying, via the display device, the modified first plurality of application icons and a third set of one or more user interface elements, detecting a user request to enter an edit mode at a location corresponding to an application icon of the modified first plurality of application icons; and
in response to detecting the user request to enter the edit mode, causing one or more user interface elements and application icons to enter an edit mode.

36. The method of claim 27, further comprising:
while concurrently displaying, via the display device, the modified first plurality of application icons and the first set of one or more user interface elements, detecting a change in orientation of the electronic device from a first orientation to a second orientation that is different from the first orientation; and
in response to detecting the change in orientation of the electronic device from the first orientation to the second orientation, displaying the first plurality of application icons without displaying the first set of one or more user interface elements.

37. The method of claim 36, further comprising:
while displaying the first plurality of application icons without displaying the first set of one or more user interface elements, detecting a change in orientation of the electronic device from the second orientation to the first orientation; and
in response to detecting the change in orientation of the electronic device from the second orientation to the first orientation, concurrently displaying, via the display device, the modified first plurality of application icons and the first set of one or more user interface elements.

38. The method of claim 27, further comprising:
while concurrently displaying, via the display device, the modified first plurality of application icons and the first set of one or more user interface elements, detecting a sixth user input with movement in a seventh direction; and
in response to detecting the sixth user input:
 in accordance with a determination that the sixth user input with movement in the seventh direction is detected in a predefined region corresponding to the first set of one or more user interface elements:
  displaying, via the display device, the first plurality of application icons; and
  ceasing display of the first set of one or more user interface elements; and
 in accordance with a determination that the sixth user input with movement in the seventh direction is detected in a predefined region corresponding to the modified first plurality of application icons, replacing display of the modified first plurality of application icons with display of the second plurality of application icons, wherein the predefined region corresponding to the modified first plurality of application icons does not overlap with the predefined region corresponding to the first set of one or more user interface elements.

39. The method of claim 27, wherein the first set of one or more user interface elements includes a plurality of user interface elements corresponding to different applications.

* * * * *